US012797802B2

(12) United States Patent
Osuji et al.

(10) Patent No.: US 12,797,802 B2
(45) Date of Patent: Nov. 17, 2026

(54) POLYMERIC COMPOSITES HAVING ORIENTED NANOPORES AND METHODS OF MAKING THE SAME

(71) Applicants: YALE UNIVERSITY, New Haven, CT (US); The Trustees of the University of Pennsylvania, Philadelphia, PA (US)

(72) Inventors: Chinedum Osuji, Norwalk, CT (US); Xunda Feng, New Haven, CT (US)

(73) Assignees: Yale University, New Haven, CT (US); The Trustees of the University of Pennsylvania, Philadelphia, PA (US)

(*) Notice: Subject to any disclaimer, the term of this patent is extended or adjusted under 35 U.S.C. 154(b) by 0 days.

(21) Appl. No.: 18/614,093

(22) Filed: Mar. 22, 2024

(65) Prior Publication Data

US 2025/0083109 A1 Mar. 13, 2025

Related U.S. Application Data

(63) Continuation of application No. 16/077,132, filed as application No. PCT/US2017/021617 on Mar. 9, 2017, now abandoned.

(Continued)

(51) Int. Cl.
*B01D 67/00* (2006.01)
*B01D 61/02* (2006.01)

(Continued)

(52) U.S. Cl.
CPC ....... *B01D 67/0034* (2013.01); *B01D 61/027* (2013.01); *B01D 69/02* (2013.01); *B01D 69/1214* (2022.08); *B01D 69/125* (2013.01); *B01D 71/401* (2022.08); *B01D 71/701* (2022.08); *B05D 1/00* (2013.01); *B05D 3/007* (2013.01); *B05D 3/046* (2013.01); *B05D 3/061* (2013.01); *B32B 17/10798* (2013.01); *B32B 27/08* (2013.01); *B32B 27/283* (2013.01); *B01D 61/025* (2013.01); *B01D 2323/219* (2022.08);

(Continued)

(58) Field of Classification Search
CPC .......... B05D 1/00; B05D 3/007; B05D 3/046; B05D 3/061
See application file for complete search history.

(56) References Cited

U.S. PATENT DOCUMENTS 5,849,215 A * 12/1998 Gin ........................ B01D 69/02 252/299.01
7,521,003 B2 4/2009 Gin (Continued)

OTHER PUBLICATIONS

Chen, Y., et al., (2014). Humidity-Modulated Phase Control and Nanoscopic Transport in Supramolecular Assemblies. The Journal of Physical Chemistry B, 118(11), 3207-3217.

(Continued)

*Primary Examiner* — Dah-Wei D. Yuan
*Assistant Examiner* — Kristen A Dagenais
(74) *Attorney, Agent, or Firm* — Riverside Law LLP

(57) ABSTRACT

The present invention relates to the development and fabrication of thin-film polymer composite materials containing vertically aligned nanopores. The present invention provides methods of aligning nanopores in a polymeric film. The present invention also provides composite materials and methods of fabricating composite materials containing vertically aligned nanopores.

10 Claims, 34 Drawing Sheets

Related U.S. Application Data

(60) Provisional application No. 62/305,695, filed on Mar. 9, 2016.

(51) Int. Cl.

| | |
|---|---|
| ***B01D 69/02*** | (2006.01) |
| ***B01D 69/12*** | (2006.01) |
| ***B01D 71/40*** | (2006.01) |
| ***B01D 71/70*** | (2006.01) |
| ***B05D 1/00*** | (2006.01) |
| ***B05D 3/00*** | (2006.01) |
| ***B05D 3/04*** | (2006.01) |
| ***B05D 3/06*** | (2006.01) |
| ***B32B 17/10*** | (2006.01) |
| ***B32B 27/08*** | (2006.01) |
| ***B32B 27/28*** | (2006.01) |

(52) U.S. Cl.

CPC .... *B01D 2323/30* (2013.01); *B01D 2323/345* (2013.01); *B32B 2255/10* (2013.01); *B32B 2255/26* (2013.01)

(56) References Cited

U.S. PATENT DOCUMENTS

| | | | | |
|---|---|---|---|---|
| 7,625,497 | B2 * | 12/2009 | Iverson | G02F 1/0054 252/299.01 |
| 2004/0211939 | A1 | 10/2004 | Elliott | |
| 2006/0096922 | A1 | 5/2006 | Gin | |
| 2006/0147677 | A1 | 7/2006 | Miyata | |
| 2006/0262401 | A1 * | 11/2006 | Takahashi | G02B 5/3066 359/493.01 |
| 2014/0173893 | A1 | 6/2014 | Nagao | |
| 2015/0047968 | A1 * | 2/2015 | Elimelech | C08K 7/00 522/120 |
| 2015/0344638 | A1 | 12/2015 | Aamer | |
| 2019/0016909 | A1 * | 1/2019 | Phillip | C09D 11/106 |

OTHER PUBLICATIONS

Deng, H., Gin, D. L., & Smith, R. C. (1998). Polymerizable Lyotropic Liquid Crystals Containing Transition-Metal and Lanthanide Ions: Architectural Control and Introduction of New Properties into Nanostructured Polymers. Journal of the American Chemical Society, 120(14), 3522-3523.

Dorin, R. M., Phillip, W. A., Sai, H., Werner, J., Elimelech, M., & Wiesner, U. (2014). Designing block copolymer architectures for targeted membrane performance. Polymer, 55(1), 347-353.

Feng et al., 2014, ACS Nano 8:11977-11986.

Feng, X., Tousley, M. E., Cowan, M. G., Wiesenauer, B. R., Nejati, S., Choo, Y., . . . Osuji, C. O. (2014). Scalable Fabrication of Polymer Membranes with Vertically Aligned 1 nm Pores by Magnetic Field Directed Self-Assembly. ACS Nano, 8(12), 11977-11986.

Gin, D. L., Lu, X., Nemade, P. R., Pecinovsky, C. S., Xu, Y., & Zhou, M. (2006). Recent Advances in the Design of Polymerizable Lyotropic Liquid-Crystal Assemblies for Heterogeneous Catalysis and Selective Separations. Advanced Functional Materials, 16(7), 865-878.

Hu, H., Gopinadhan, M., & Osuji, C. O. (2014). Directed self-assembly of block copolymers: a tutorial review of strategies for enabling nanotechnology with soft matter. Soft Matter, 10(22), 3867, 23 pages.

Jackson, E. A., & Hillmyer, M. A. (2010). Nanoporous Membranes Derived from Block Copolymers: From Drug Delivery to Water Filtration. ACS Nano, 4(7), 3548-3553.

Majewski et al., J. Polym. Sci., Part B: Polym. Phys. 50:2-8, 2012.

Seo, M., & Hillmyer, M. A. (2012). Reticulated Nanoporous Polymers by Controlled Polymerization-Induced Microphase Separation. Science, 336(6087), 1422-1425.

Yoshio, M., Kagata, T., Hoshino, K., Mukai, T., Ohno, H., & Kato, T. (2006). One-Dimensional Ion-Conductive Polymer Films: Alignment and Fixation of Ionic Channels Formed by Self-Organization of Polymerizable Columnar Liquid Crystals. Journal of the American Chemical Society, 128(16), 5570-5577.

* cited by examiner

POLYMERIC COMPOSITES HAVING ORIENTED NANOPORES AND METHODS OF MAKING THE SAME

CROSS-REFERENCE TO RELATED APPLICATIONS

This application claims priority from U.S. application Ser. No. 16/077,132, filed Aug. 10, 2018, which is a national stage entry of International Application No. PCT/US17/21617, filed Mar. 9, 2017, which claims priority from U.S. Provisional Patent Application Ser. No. 62/305,695, filed Mar. 9, 2016, the entire contents of each of which are incorporated herein by reference.

STATEMENT REGARDING FEDERALLY SPONSORED RESEARCH OR DEVELOPMENT

This invention was made with government support under CMMI-1246804 awarded by the National Science Foundation. The government has certain rights in the invention.

BACKGROUND OF THE INVENTION

A long-standing goal in materials science is to provide highly ordered or periodic nanostructures with useful properties over large length scales or technologically relevant dimensions. Bottom-up approaches involve the self-assembly of atomic, molecular and colloidal building blocks as a promising way to achieve this goal at potentially lower cost or higher throughput than top-down strategies (Whitesides et al., 2002, Proc. Nat. Acad. Sci. 99:4769-4774). The translation of these ideas to polymeric materials enables highly compelling applications, such as precisely tailored nanoporous membranes (Jackson and Hillmyer, 2010, ACS Nano 4:3548-3553; Seo and Hillmyer, 2012, Science 336:1422-1425), photonic band gap materials (Yoon et al., 2005, MRS Bull. 30:721-726), and high resolution lithography using self-assembled structures as pattern transfer masks (Bita et al., 2008, Science 321:939-943). In these three cases, as in others, reliable control over the orientation of the self-assembled structures is needed to enable the applications as envisioned.

In designing nanoporous films for use as membranes, and also for pattern transfer applications (e.g. block copolymer lithography), the pores should all ideally possess the same diameter and be aligned parallel to the macroscopic transport direction, i.e. in the “thickness”, “through-plane”, or “vertical” direction (Hu et al., 2014, Soft Matter 10:3867-3889). The current state of the art departs considerably from this ideal, however. Membranes produced by conventional techniques, such as phase inversion, have highly tortuous, interconnected pore networks and a large variation in pore diameters. The broad distribution of pore diameters severely limits the selectivity of such membranes as evident from their molecular-weight cutoff characteristics (Gin and Noble, 2011, Science 332:674-676; Merkel et al., 2002, Science 296:519-522; Baker, 2012, Membrane Technology and Applications, Wiley). Additionally, the highly tortuous pore networks negatively impact membrane permeability, as the distance of molecular transport will be greater than the thickness of the membrane (Baker, 2012, Membrane Technology and Applications, Wiley, Phillip et al., 2010, ACS Applied Materials and Interfaces 2:847-853).

In principle, the aforementioned permeability and selectivity issues can be circumvented using self-assembled materials such as block copolymers (BCPs) or small-molecule liquid crystals (LCs) that feature nanostructures with thermodynamically defined characteristic dimensions which are therefore narrowly distributed (Jackson and Hillmyer, 2010, ACS Nano 4:3548-3553; Dorin et al., 2014, Polymer 55:347-353; Gin et al., 2006, Adv. Funct. Mater. 16:865-867; Gin et al., 2001, Acc. Chem. Res. 34:973-980). Leveraging self-assembled materials to fabricate ideal membranes requires both physical continuity and vertical alignment of nanostructures over large areas in thin films. As one might expect, such morphologies in general do not result spontaneously during self-assembly of these systems (Askay et al., 1996, Science 273:892-898). Considerable effort must often be expended, for example through the use of interfacial engineering (Bates et al., 2012, Science 338:775-779) or external fields (Majewski et al., J. Polym. Sci., Part B: Polym. Phys. 50:2-8; Firouzi et al., 1997, J. Am. Chem. Soc. 119:9466-9477), to control alignment while physical continuity is determined principally by the propensity to form defects.

One area of interest is in the development of membrane morphologies in systems where self-assembly provides access to pore sizes in the 1 nm regime. This length scale is of considerable interest in water purification as it permits nanofiltration of multivalent salts and small molecule solutes, including boron, which is a particularly challenging contaminant (Shannon et al., 2008, Nature 452:301-310). Recently, the use of magnetic fields to generate uniformly oriented, 1 nm pores in mechanically robust polymer films by field-induced alignment of a self-assembled cross-linkable LC mesophase was reported (Feng et al., 2014, ACS Nano 8:11977-11986). While the method is extremely effective, field alignment is best suited to morphological control in the bulk, i.e. where surface forces do not play a prominent and potentially confounding role. In the reported work the systems considered were generally 10 μm or larger in thickness. Practical membranes are often considerably thinner, however-transmembrane flux is maximized through thickness minimization for a given pressure differential. For example, the dense permselective layer in thin-film composite membranes used for reverse osmosis is only ca. 100-200 nm thick (Phillip et al., 2010, ACS Applied Materials and Interfaces 2:847-853; Geise et al., 2014, Prog. Polym. Sci. 39:1-42; Ghosh et al., 2008, J. Membrane Science 311:34-45). The need for mechanical integrity of the membrane, on the other hand, imparts a lower threshold on film thickness. A highly useful membrane therefore requires generating ideal pore morphology-physical continuity and vertical alignment—in a suitably thin yet mechanically robust film, ca. 1 μm in thickness or less. As a practical consideration, the morphological control should be amenable to large area films. Taken together, these requirements represent an extremely compelling yet unfulfilled goal.

The production of useful polymers from renewable or sustainably-derived materials represents an increasingly important societal concern. Synthetic routes have been developed for the polymerization of a broad range of sustainably-derived monomers, including vegetable oils and fatty acids, terpenes, lactic acid, and saccharides (Wilbon, et al., 2013, Macromol. Rapid Comm. 34:8; Gandini et al., 2016, Chem. Rev., 116:1637; de Espinosa, et al., 2011, Eur. Polym. J., 47:837; Xia and Larock, 2010, Green Chem., 12:1893; Yao and Tang, 2013, Macromolecules, 46:1689; Mikami, et al., 2013, J. Am. Chem. Soc., 135:6826; Meier, et al., 2007, Chem. Soc. Rev. 36:1788). The appeal of sustainable polymers from environmental and economic perspectives has traditionally been tempered by inferior properties, particularly mechanical properties, relative to petroleum-derived materials.

There is a need in the art for thin, nanoporous membranes with vertically aligned nanostructures. There is also need in the art for useful nanoporous polymers made from renewable or sustainably-derived materials. The present invention addresses these unmet needs.

SUMMARY OF THE INVENTION

In one aspect of the invention, a method of aligning nanopores in a polymeric film is described. In one embodiment, the method includes the steps of: depositing a solution of at least one monomer in a solvent onto a surface of a first substrate to form a mesophase comprised of nanopores; applying a second substrate onto a surface of the mesophase, such that the mesophase is in contact with both the first substrate and the second substrate, and wherein the nanopores at least partially align in response to the second substrate; and polymerizing the mesophase to form a polymeric film containing the at least partially aligned nanopores. In one embodiment, the method further includes the steps of: raising the temperature of the mesophase such that the mesophase is in a disordered state; and controlling the rate of cooling of the mesophase as it returns to an ordered state. In another aspect of the invention, a polymeric film formed by this method is described.

In one embodiment, the monomer is sodium 3,4,5-tris(11'-acryloyloxyundecyloxy)benzoate (Na-GA3C11). In one embodiment, the solvent further comprises a photoinitiator. In one embodiment, the photoinitiator is 2,4,6-trimethylbenzoyl-diphenylphosphine oxide. In one embodiment, the amount of photoinitiator is about 0.5%. In one embodiment, the monomer is polymerized by exposing the mesophase to UV light.

In one embodiment, the first substrate is a polydimethylsiloxane (PDMS) substrate. In one embodiment, the second substrate is a polydimethylsiloxane (PDMS) substrate. In one embodiment, the first substrate is a glass substrate. In one embodiment, the second substrate is a glass substrate. In one embodiment, the solvent is removed prior to the application of the second substrate.

In one embodiment, the polymeric film has a pore diameter of about 1 nm. In one embodiment, the polymeric film has a thickness ranging from about 200 nm to 40 μm. In one embodiment, the polymeric film has a hexagonal pore arrangement. In one embodiment, the nanopores are vertically aligned.

In another aspect of the invention, a composite material is described. In one embodiment, the composite material includes a first substrate, a second substrate, and a layer between the first and second substrate which comprises at least one monomer, at least one photoinitiator, and a plurality of nanopores, wherein the plurality of nanopores are at least partially aligned in the layer. In one embodiment, the at least one monomer is sodium 3,4,5-tris(11'-acryloyloxyundecyloxy)benzoate (Na-GA3C11).

In another aspect of the invention, a method of fabricating a polymeric film is described. In one embodiment, the method includes the steps of: depositing a solution of at least one monomer in a solvent onto a surface of a first substrate to form a mesophase comprised of nanopores; removing the solvent; applying a second substrate onto a surface of the mesophase, wherein the mesophase is in contact with both the first substrate and the second substrate, and wherein the nanopores at least partially align in response to the second substrate; raising the temperature of the mesophase such that the mesophase is in a disordered state; controlling the rate of cooling of the mesophase as it returns to an ordered state; and polymerizing the mesophase to form a polymeric film containing the at least partially aligned nanopores. In one embodiment, the method further includes the step of removing at least one of the substrates from the composite material after the polymerizing step. In one embodiment, the monomer is sodium 3,4,5-tris(11'-acryloyloxyundecyloxy)benzoate (Na-GA3C11). In one embodiment, the photoinitiator is 2,4,6-trimethylbenzoyl-diphenylphosphine oxide.

In one embodiment, the first substrate is a polydimethylsiloxane (PDMS) substrate. In another embodiment, the second substrate is a polydimethylsiloxane (PDMS) substrate. In one embodiment, the first substrate is a glass substrate. In another embodiment, the second substrate is a glass substrate. In one embodiment, the solvent is removed prior to the application of the second substrate.

In another aspect of the invention, a method of fabricating a polymeric film of aligned nanopores is described. In one embodiment, the method includes the steps of: depositing a mixture of at least one monomer and at least one template compound onto a surface of a first substrate to form a mesophase; polymerizing the mesophase to form a polymeric film; rinsing the polymeric film with NaOH in DMSO to remove the template compound; and wetting the polymeric film with water to form aligned nanopores. In one embodiment, the method further includes the steps of applying a second substrate prior to polymerization. In one embodiment, the method further includes the steps of: applying a magnetic field to the mesophase; rotating the mesophase about the normal of the first substrate; heating the mesophase; and gradually cooling the mesophase to room temperature. Also described is a polymeric film formed by this method.

In one embodiment, the first and second substrates are glass substrates. In one embodiment, the first and second substrates are coated with poly(sodium styrene sulfonate). In one embodiment, the first substrate and second substrate are coated with octadecyltrimethoxysilane.

In one embodiment, the mixture further includes at least one crosslinker and at least one photoinitiator. In one embodiment, the photoinitiator is benzoin methyl ether. In one embodiment, the crosslinker is selected from the group containing divinylbenzene, butyl acrylate, and 1,6-hexanediol diacrylate.

In one embodiment, the monomer is an unsaturated fatty acid. In one embodiment, the monomer is an epoxidized fatty acid. In one embodiment, the template compound is 1,3,5-tris(1H-benzo[d]imidazol-2-yl)benzene. In one embodiment, the monomer and template compound are in the mixture in a ratio of about 3:1. In one embodiment, the template compound can be recycled for later use.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 1A is an illustration depicting the molecular structure of the wedge-shaped amphiphilic monomer Na-GA3C11 and a 3-D model of its self-assembled $Col_h$ phase possessing 1 nm hydrophilic pores. FIG. 1B is a schematic illustration of an exemplary method of fabricating a sub-μm polymer thin film with vertically oriented 1 nm pores by soft confinement. In this embodiment, the thin film is obtained by casting a dilute Na-GA3C11/THF solution onto a silicon substrate and allowing the solvent to evaporate. The as-cast thin film contains supramolecular nanoporous columns lying parallel to the film plane. When a soft PDMS pad is imposed onto this film followed by thermal annealing, the columns adopt a vertical orientation. Photo-cross-linking of the aligned columns results in a sub-μm polymer film with vertically oriented nanopores, which can be easily detached from the substrate.

FIG. 3A is a direct image of the thin film displayed a single-crystal-like hexagonal pattern. FIG. 3B is a cross-sectional image of the specimen microtomed parallel to the film normal, demonstrating nanochannel vertical alignment and persistence through the film thickness. Fourier transforms of the two images (insets) show 6- and 2-fold symmetry, (FIGS. 3A and 3B, respectively), indicating the ordered hexagonal morphology. High-magnification images with artificial colors and 3-D models (insets) highlight the two imaging directions.

FIG. 4A is an image of 80 μm thick film sandwiched by two glass slides. FIG. 4B is an image of 28 μm thick film sandwiched by two glass slides. FIG. 4C is an image of 28 μm thick film prepared on a glass slide with one surface exposed to the air. FIG. 4D is an image of 28 μm thick film on a glass slide covered by a PDMS elastomer pad. The insets are conoscopy images obtained by a 40× lens. The corresponding 3-D models show the orientations of the supramolecular columns in the films. Scale bars: 200 μm.

FIGS. 5A-5G, depicts small angle X-ray scattering (SAXS) measurements of exemplary films. FIG. 5A is a schematic illustration of SAXS measurements on cross-linked polymer films. FIG. 5B is an image of 2-D SAXS patterns of polymer films prepared in a glass-slide-sandwiched geometry with thickness of 80, 28, and 7 μm, respectively. FIG. 5C is a graph of 1-D integral SAXS data of the polymerized sample demonstrating the hexagonal morphology. The primary reflection peak at $q^*=0.179$ Å$^{-1}$ corresponds to the Bragg spacing $d_{100}=3.5$ nm. FIG. 5D is a graph of Azimuthal dependence of scattering intensity of the 2-D SAXS patterns in FIG. 5B. FIG. 5E is an image of 2-D SAXS patterns of polymer films with thickness of 28 and 9 μm, respectively, prepared in soft confinement. FIG. 5F is an image of 2-D SAXS patterns of polymer films with thickness of 28 μm prepared in an open-to-air geometry. FIG. 5G is a graph of ionic conductivity measurements at a relative humidity of 100% on cross-linked $Col_h$ films (ca. 20 μm thick) of Na-GA3C11 prepared in sandwiched or open-to-air geometries, respectively.

FIG. 6A is a TEM image showing the columnar nanopores oriented vertically at the glass interface. FIG. 6B is a TEM image showing the columnar nanopores oriented parallel to the air interface.

FIG. 8A is a high-resolution TEM image showing the hexagonal packing of columnar nanopores (dark spots). The benzene rings lining the nanopores were selectively stained by $RuO_4$. FIG. 8B is a schematic illustration of the exaggeration of the pore size due to $RuO_4$ staining. The dark spots with a diameter ca. 1.6 nm as observed by TEM encompass the nanopores looped by benzene rings and carboxylic groups. By subtracting the lengths of benzene rings and carboxylic groups, a pore diameter can be estimated as 1 nm.

FIG. 14A shows the molecular structures of polymerizable CLA isomers. FIG. 14B shows the molecular structure of the template molecule 1,3,5-tris(1H-benzo[d]imidazol-2-yl)benzene (TBIB). FIG. 14C is an illustration of the supramolecular discotic complex $TBIB/(CLA)_3$ with a $C_3$ symmetry formed by fatty acids and the template molecule and its self-assembled $Col_h$ mesophase. FIG. 14D is an illustration of the ordered polymeric structure following radical cross-linking of the $Col_h$ mesophase. FIG. 14E is an illustration of the nanoporous polymer obtained after removing the template TBIB molecules.

FIG. 15A is a plot of the 1-D SAXS data of the supramolecular mesophase. The characteristic diffraction peak location ratio of 1:√3 confirms the $Col_h$ morphology. FIG. 15B is a plot of the 1-D WAXS data showing two peaks at 4.7 and 3.5 Å corresponding to the π-π stacking of the template molecules and the aliphatic packing of the CLA, respectively. FIG. 15C is an image of the fan-like texture of the $Col_h$ mesophase observed by polarized optical microscopy (POM).

FIG. 16A depicts photographs of cross-linked films and their POM images after photo-initiated radical polymerization of mesophases containing DVB or acrylates. FIG. 16B is a plot of the temperature-dependent 1-D SAXS data showing the lock-in of the $Col_h$ morphology after polymerization. FIG. 16C shows the FT-IR spectra of the sample with 20 wt % DVB before and after polymerization. FIG. 16D is a TEM micrograph of a sectioned polymer sample showing the hexagonal morphology; the inset shows the Fourier transform image.

FIG. 17A is a schematic illustration of face on or edge on orientation of the supramolecular columns. FIG. 17B is a POM image of homeotropically aligned $Col_h$ phase of neat TBIB/$(CLA)_3$ in a 15 μm thick film.

FIG. 17C shows the vertical alignment of DVB-containing $Col_h$ phase in a 5 μm thick film confined by poly(styrene sulfonate) (PSS) coated surfaces as confirmed by the through-thickness 2-D SAXS pattern exhibiting a 6-fold symmetry. FIG. 17D is a schematic of a thick film (thickness >5 μm), a comparison of 30 μm thick polymer films with randomly or vertically oriented supramolecular columns, and a POM image of the resulting vertically-aligned film.

FIG. 18A is the FT-IR spectra of the cross-linked samples before and after TBIB removal. FIG. 18B shows the 2-D SAXS data and schematic models before TBIB removal, after removal, and after water impregnation. FIG. 18C is a plot of 1-D SAXS data as integrated from the 2-D SAXS patterns in FIG. 18B.

FIG. 19A is a schematic of the molecular structures and space-filling models of methylene blue (MB), Rhodamine 6G (R6G) and methyl orange (MO). FIG. 19B depicts the selective absorption of MB into nanopores (~1.2-1.5 nm diameter) from a solution of MB and R6G as confirmed by UV-vis spectra and a color change of the solution. FIG. 19C depicts the Selective absorption of MB into nanopores from a solution of MB and MO as confirmed by UV-Vis spectra and a color change of the solution.

FIG. 25A is a plot of the DSC curves of the hydrogen-bonded CLA/TIBB obtained at 10° C./min. The second heating and first cooling curves are shown. FIG. 25B is a plot of the POM intensity of a sample exhibiting the extinction (heating) and the reappearance (cooling) of the birefringence at the isotropic-columnar phase transition.

FIG. 28A is an image of the resulting film. FIG. 28B is a schematic showing the resulting films' chloroform solubility. FIG. 28C shows the $Col_h$-Iso transition starting at 94° C. and terminating at 102° C.

FIG. 29A is a POM image of the 4:1 butyl acrylate/1,6-hexanediol diacrylate containing mesophase. FIG. 29B shows the 2-D SAXS pattern of the 4:1 butyl acrylate/1,6-hexanediol diacrylate containing mesophase. FIG. 29C is a POM image of the DVB containing mesophase. FIG. 29D shows the 2-D SAXS pattern of the DVB containing mesophase.

FIG. 30A shows the plot for DVB. FIG. 30B shows the plot for 4:1 butyl acrylate/1,6-hexanediol diacrylate.

DETAILED DESCRIPTION

Figure 1:
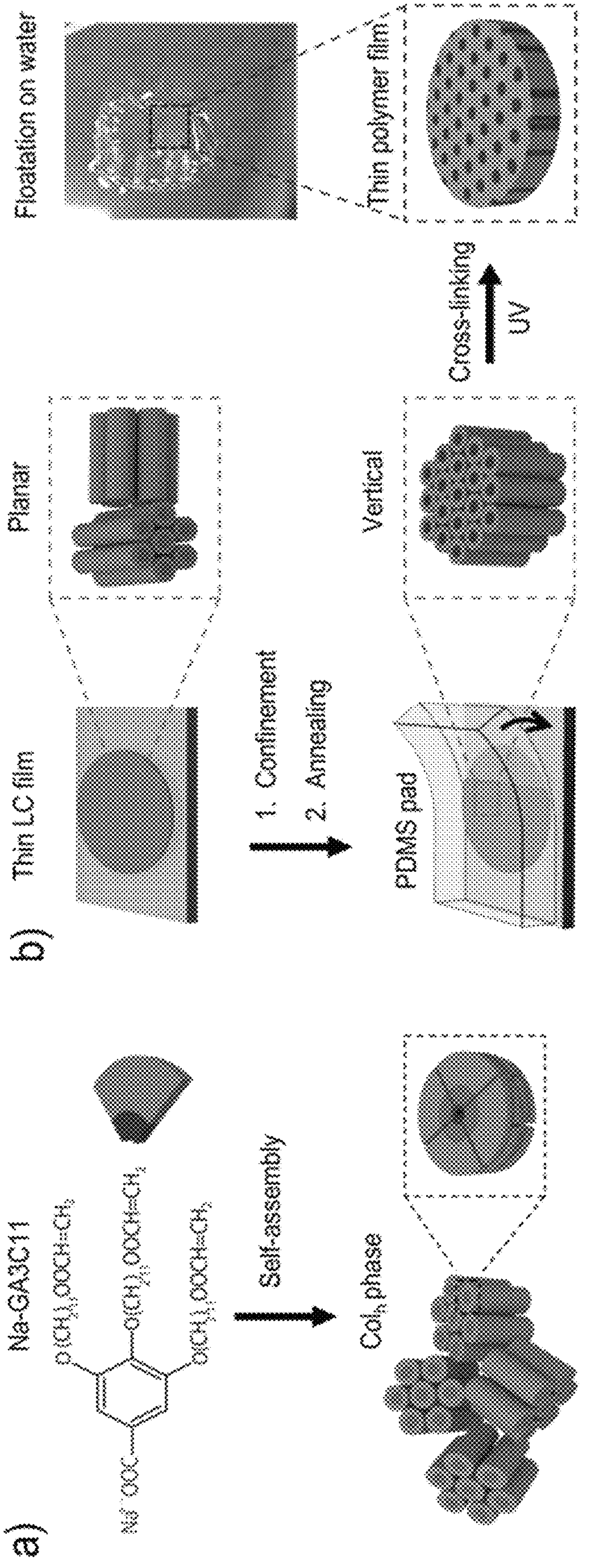
FIG. 1, comprised of FIGS. 1A-1B, depicts an exemplary method of forming the thin-films of the present invention by subjecting sub-μm films of a cross-linkable hexagonal columnar ($Col_h$) liquid crystal (LC) to soft confinement using an elastomeric pad of polydimethylsiloxane (PDMS).

It is to be understood that the figures and descriptions of the present invention have been simplified to illustrate elements that are relevant for a clear understanding of the present invention, while eliminating, for the purpose of clarity, many other elements found in composite materials and polymeric thin films. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

As used herein, each of the following terms has the meaning associated with it in this section. Unless defined otherwise, all technical and scientific terms used herein generally have the same meaning as commonly understood by one of ordinary skill in the art to which this invention belongs.

The articles "a" and "an" are used herein to refer to one or to more than one (i.e. to at least one) of the grammatical object of the article. By way of example, "an element" means one element or more than one element.

As used herein, the term "about" will be understood by persons of ordinary skill in the art and will vary to some extent depending on the context in which it is used. As used herein when referring to a measurable value such as an amount, a temporal duration, and the like, the term "about" is meant to encompass variations of ±20% or ±10%, more preferably ±5%, even more preferably ±1%, and still more preferably ±0.1% from the specified value, as such variations are appropriate to perform the disclosed methods.

As used herein, the term "mesophase" refers to the ordered phases of matter formed by anisotropic molecular or colloidal species as a function of temperature, concentration, pressure, ionic strength (salt content) or combinations thereof.

As used herein, the term "mesogen" refers to the constituents of mesophases.

As used herein, the term "liquid crystal" refers to a thermodynamic stable phase characterized by anisotropy of properties without the existence of a three-dimensional crystal lattice, generally lying in the temperature range between the solid and isotropic liquid phase.

As used herein, the term "lyotropic" refers to molecules that form phases with orientational and/or positional order in a solvent. Lyotropic liquid crystals can be formed using amphiphilic molecules (e.g., dodecyltrimethylammonium bromide, sodium laurate, phosphatidylethanolamine, lecithin). The solvent can be water.

As used herein, the term "nanopore" refers to a pore, channel or passage formed or otherwise provided in a membrane. A nanopore may have a characteristic width or diameter in a range of 0.1 nanometers to about 1000 nm.

As used herein, the term "monomer," refers to any molecule that can be polymerized, that is, linked together via a chemical reaction to form a higher molecular weight species.

As used herein, the term "polymer" denotes a covalently bonded chain of monomer units, and is intended to include both homopolymers and copolymers.

As used herein, the term "initiator," in accordance with the definition adopted by the IUPAC, refers to a substance introduced into a reaction system in order to bring about reaction or process generating free radicals or some other reactive reaction intermediates which then induce a chain reaction.

As used herein, the term "photoinitiator," in accordance with the definition adopted by the IUPAC, refers to a substance capable of inducing the polymerization of a monomer by a free radical or ionic chain reaction initiated by photoexcitation.

The term "crosslinker" refers to compounds that are able to react with the functional group or groups on the polymer chains to lengthen them and/or connect them, e.g., to form a crosslinked network like that of a cured elastomer.

As used herein, the term "Na-GA3C11" refers to 3,4,5-tris(11'-acryloyloxyundecyloxy)benzoate.

As used herein, the term "Darocur TPO" refers to 2,4,6-trimethylbenzoyl-diphenylphosphine oxide.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Description

As described herein, the present invention relates in part to the facile and scalable synthesis of thin polymer films containing vertically oriented nanopores. For example, as illustrated in FIG. 1, a soft PDMS pad can be imposed onto liquid crystalline (LC) mesophases prior to thermal annealing and photo-cross-linking, resulting in alignment of the nanopores and the formation of nanochannels. This method results in the alignment of the columns in the absence of any external field, and instead relies on surface confinement effects to determine the orientation of the columns. The surface confinement preserves nanomaterial orientation until post-alignment photopolymerization of the system forms the nanostructured material. As demonstrated herein, the utilization of soft confinement can effectively circumvent the critical challenge of the vertical (through-plane) alignment of nanopores over large areas.

As contemplated herein, the resulting polymeric thin films may be used in membranes, such as small molecule, size-based separation membranes, or other functional composite films, where large pore size distributions and tortuosity hinder performance and have proven challenging to overcome.

LC Mesophase

As contemplated herein, a LC mesophase is formed from the self-assembly of one or more mesogens. In one embodiment, the mesogen is a monomer. The LC mesophase may be composed of one or more photoinitiators or other chemical constituents. In certain embodiments, the mesophase may be a single-component material. In other embodiments, the mesophase may be multicomponent, having tunable physicochemical properties. In other embodiments, the mesophase may be anisotropic, lyotropic, thermotropic and/or metallotropic.

The mesophase contains at least one monomer. In one embodiment, the mesogen is itself a monomer, capable of being reacted to form a polymer. In one embodiment, the monomer is amphiphilic. As used herein, the term "amphiphilic" refers to a compound which has at least one hydrophilic moiety and at least one hydrophobic moiety. The one or more amphiphilic monomer induce a structural ordering of the LC system. In a non-limiting example, an amphiphilic monomer may comprise at least one polar group such as hydroxyl, carboxyl, sulfonate, phosphate, amino or any salts thereof, and at least one non-polar group such as n-alkyl, branched alkyl, alkenyl, or alkynyl. In another embodiment, the monomer contains one or more polymerizable constituents. For example, the mesophase may include one or more types or category of monomer suitable for forming a polymeric structure. The monomer may be synthetic, organic, or any other type of polymerizable monomeric molecule. The monomer may contain a type of polymerizable group. A polymerizable group is a chemical moiety that polymerizes under certain chemical conditions. In general, the type of polymerizable group is not critical, so long as the polymerizable group is capable of polymerization with a monomer of the instant invention. Examples of polymerizable groups include double-bond containing moieties which are polymerized by photopolymerization or free radical polymerization. In some embodiments, the polymerizable group is a vinyl group, acryl group, alkylacryl group (i.e. acryl group having an alkyl substituent, such as methacryl). As used herein, acryl (alkylacryl, methacryl, etc) includes acryl esters as well as acryl amides. In another embodiment, the monomer may be any alkyl methacrylate. In another embodiment, the monomer may be styrene, vinyl acetate, vinyl pyridine, n-isopropylacrylamide or a vinyl ether. In one embodiment, the monomer is sodium 3,4,5-tris(11'-acryloyloxyundecyloxy)benzoate (Na-GA3C11). Na-GA3C11 is a wedge-shaped amphiphilic molecule possessing a large hydrophobic body and a small hydrophilic head, forming supramolecular columnar LC mesophases with closely-packed, ordered hydrophilic nanochannels. Moreover, the introduction of triple reactive acrylate groups at the periphery of Na-GA3C11 enables structural lock-in of the hexagonal columnar ($Col_h$) order by photo-crosslinking into a mechanically and chemically robust polymer. In another embodiment, the monomer is the acid form, 3,4,5-tris(11'-acryloyloxyundecyloxy)benzoic acid (GA3C11). In another embodiment, the monomer is a metallic salt of 3,4,5-tris(11'-acryloyloxyundecyloxy)benzoic acid (GA3C11). In another embodiment, the monomer is sodium 2,3,4-tris(11'-acryloylundecyl-1'-oxy)benzenesulfonate. In one embodiment, the monomer self-assembles into a hexagonal columnar LC mesophase at room temperature. Non-limiting examples of other LC mesophases include cubic, reverse hexagonal, lamellar, and reverse micellar. Upon vertical alignment, these columns form nanochannels within the mesophase.

In one embodiment, the monomer is a natural or unnatural unsaturated fatty acid. Unsaturated fatty acids possess a carboxylic acid head group and a long aliphatic chain with one or more alkene groups. Examples of unsaturated fatty acids include, but are not limited to, 3-hexenoic acid, trans-2-heptenoic acid, 2-octenoic acid, 2-nonenoic acid, cis- and trans-4-decenoic acid, 9-decenoic acid, 10-undecenoic acid, trans-3-dodecenoic acid, tridecenoic acid, cis-9-tetradeceonic acid, pentadecenoic acid, cis-9-hexadecenoic acid, trans-9-hexadecenoic acid, 9-heptadecenoic acid, cis-6-octadecenoic acid, trans-6-octadecenoic acid, cis-9-octadecenoic acid, trans-9-octadecenoic acid, cis-11-octadecenoic acid, trans-11-octadecenoic acid, cis-5-eicosenoic acid, cis-9-eicosenoic acid, cis-11-docosenoic acid, cis-13-docosenoic acid, trans-13-docosenoic acid, cis-15-tetracosenoic acid, cis-17-hexacosenoic acid, and cis-21-triacontenoic acids, as well as 2,4-hexadienoic acid, cis-9-cis-12-octadecadienoic acid, cis-9-cis-12-cis-15-octadecatrienoic acid, eleostearic acid, 12-hydroxy-cis-9-octadecenoic acid, and the like. In one embodiment, the monomer is conjugated linoleic acid (CLA).

In one embodiment, the monomer is an epoxidized fatty acid. Epoxidized fatty acids are fatty acids that have been treated with a chemical agent to convert internal alkenes into epoxide moieties. Fatty acids suitable for epoxidation include, but are not limited to, all fatty acids discussed herein. In one embodiment, the epoxidized fatty acids are polymerized with reagents known to those of skill in the art. Epoxidized fatty acid polymerizing agents include, but are not limited to, aliphatic amines, aromatic amines, polyamide resins, tertiary and secondary amines, imidazoles, polymercaptans, polysulfide resins, anhydrides, boron trifluoride-amine complexes, dicyandiamide, organic acid hydrazides, and photo- and ultraviolet In one aspect of the invention, a template compound is employed to control the orientation of the monomers. In one embodiment, the monomer and template compound form a stable mesophase when mixed in a 3:1 ratio. In one embodiment, the template compound is 1,3,5-tris(1H-benzo[d]imidazol-2-yl)benzene. Other examples of template compounds include, but are not limited to, 2-[3,5-bis(1H-benzimidazol-2-yl)cyclohexyl]-1H-benzimidazole, 2,2',2"-(1α,3α,5α-Cyclohexanetriyl)tris(1-azonia-1H-benzoimidazole), 2-[3,5-bis(6-methyl-1H-benzimidazol-2-yl)phenyl]-6-methyl-1H-benzimidazole, 2,2'-(2-((1H-benzo[d]imidazol-2-yl)methyl)propane-1,3-diyl)bis(1H-benzo[d]imidazole), N,N-bis(1H-benzimidazol-2-ylmethyl)-3-phenylpropan-1-amine, 2-[2-(1H-benzimidazol-2-ylmethyl)phenyl]-1H-benzimidazole, 2-[2,4,5-tris(1H-benzimidazol-2-yl)phenyl]-1H-benzimidazole, N,N-bis(1H-benzimidazol-2-ylmethyl)-1-phenylmethanamine, N,N-bis(1H-benzimidazol-2-ylmethyl)-2-phenylethanamine, 2-[3-[2-amino-1,3-bis(1H-benzimidazol-2-yl)propan-2-yl]phenyl]-1,3-bis(1H-benzimidazol-2-yl)propan-2-amine, 4-phenyl-2-(4-phenyl-1H-benzimidazol-2-yl)-1H-benzimidazole, 2-[[3-(1H-benzimidazol-2-ylmethyl)-1-adamantyl]methyl]-1H-benzimidazole, 6-methyl-N,N-bis(6-methyl-1H-benzimidazol-2-yl)-1H-benzimidazol-2-amine, 2-[2,4,5-tris(1H-benzimidazol-2-yl)phenyl]-1H-benzimidazole, N,N,N',N'-tetrakis(1H-benzimidazol-2-ylmethyl)propane-1,3-diamine, 2-[3-(1H-benzimidazol-2-yl)-5-[3,5-bis(1H-benzimidazol-2-yl)phenyl]phenyl]-1H-benzimidazole, N,N,N',N'-tetrakis(1H-benzimidazol-2-ylmethyl) butane-1,4-diamine, 2-[1,2-bis(1H-benzimidazol-2-yl)-2-(1,3-dihydrobenzimidazol-2-ylidene)ethylidene]benzimidazole, N,N,N',N'-tetrakis(1H-benzimidazol-2-yl)ethane-1,2-diamine, N,N,N',N'-tetrakis(1H-benzimidazol-2-yl)ethane-1,2-diamine, 2-[2-(1H-benzimidazol-2-yl)propan-2-yl]-1H-benzimidazole, 2-[3-(1H-benzimidazol-2-yl)-5-[3,5-bis(1H-benzimidazol-2-yl)phenyl]phenyl]-1H-benzimidazole, benzene-1,3,5-tricarboxylic acid, and the like.

In some embodiments of the invention, it is desirable to remove the template compound from the polymerized film. In one embodiment, the template compound is removed by immersing the polymer film in 0.1% NaOH in DMSO, followed by rinsing with water. In one embodiment of the invention, the polymer film is then soaked in water to restore the nanotubes. In one embodiment of the invention, the template molecule and monomer co-system creates a hexagonal distribution of nanopores in the polymer film. In one embodiment, the template molecule can be recycled following its removal via NaOH in DMSO and can be re-used in later polymer-forming processes.

The mesophase may also include one or more crosslinkers and/or initiators, depending on the mechanism and the amount of polymerization and crosslinking desired. As contemplated herein, any type of crosslinker and/or initiator may be used as would be understood by those skilled in the art. Examples of crosslinkers include, without limitation, polycarboxylic acids, polyamines, polyisocyanates, polyepoxides, and polyhydroxyl containing species. Other crosslinkers include bi- and multifunctional vinyl ethers, acrylamides and acrylates. Exemplary crosslinkers include 1,3,5-triallyl-1,3,5-triazine-2,4,6 (1H,3H,5H)-trione (also referred to as triallylisocyanurate), triallyl cyanurate, diallyl bisphenol A, diallylether bisphenol A, triethyleneglycol divinyl ether, 1,4-bis(4-vinylphenoxy) butane, cyclohexanedimethanol divinyl ether, multi-functional norbornene monomers prepared by reaction of multifunctional acrylates with cyclopentadiene, norbornadiene, 1,2,4-benzenetricarboxylic acid tris[4-(ethenyloxy)butyl]ester, vinylcyclohexene, 1,2,4-trivinylcyclohexane, diallyl malate, diallyl monoglycol citrate, allyl vinyl malate, glycol vinyl allyl citrate, monoglycol monoallyl citrate, monoglycol monoallyl fumarate, ethylene glycol dimethacrylate, N,N-methylene-bismethacrylamide, diethylene glycol dimethacrylate, glycerine trimethacrylate, and the like. In one embodiment, the crosslinker is divinylbenzene. In one embodiment, the crosslinker is butyl acrylate (BA). In one embodiment, the crosslinker is 1,6-hexanediol diacrylate (HDA). In one embodiment, the crosslinker is poly(ethylene glycol)-400 dimethacrylate. In some embodiments, one or more crosslinkers can be used in combination.

Examples of initiators include, but are not limited to, thermal initiators, photoinitiators, redox reaction initiators, persulfates, ionizing radiation initiators, and ternary initiators. Other photoinitiators and thermal initiators include those based on benzophenones as well as those based on peroxides. In a preferred example, the initiator is a photoinitiator.

In one embodiment, the initiator is an organic photoinitiator. In another embodiment, the photoinitiator is acetophenone. Non-limiting examples of photoinitiators include 2-benzyl-2-(dimethylamino)-4'-morpholinobutyrophenone, 4'-tert-butyl-2',6'-dimethylacetophenone, 2,2-diethoxyacetophenone, 2,2-dimethoxy-2-phenylacetophenone, diphenyl(2,4,6-trimethylbenzoyl)phosphine oxide/2-hydroxy-2-methylpropiophenone blend, 4'-ethoxyacetophenone, 3'-hydroxyacetophenone, 4'-hydroxyacetophenone, 1-hydroxycyclohexyl phenyl ketone, 2-hydroxy-4'-(2-hydroxyethoxy)-2-methylpropiophenone, 2-hydroxy-2-methylpropiophenone, 2-methyl-4'-(methylthio)-2-morpholinopropiophenone, 4'-phenoxyacetophenone, benzoin, benzoin ethyl ether, benzoin methyl ether, 4,4'-dimethoxybenzoin, 4,4'-dimethylbenzil, benzophenone, benzophenone-3,3',4,4'-tetracarboxylic dianhydride, 4-benzoylbiphenyl, 4,4'-bis(diethylamino)benzophenone, 4,4'-bis [2-(1-propenyl) phenoxy]benzophenone, 4-(diethylamino) benzophenone, 4,4'-dihydroxybenzophenone, 4-(dimethylamino)benzophenone, 3,4-dimethylbenzophenone, 3-hydroxybenzophenone, 4-hydroxybenzophenone, 2-methylbenzophenone, 3-methylbenzophenone, 4-methylbenzophenone, methyl benzoylformate, Michler's ketone (4,4'-bis(dimethylamino)benzophenone), bis(4-tert-butylphenyl)iodonium perfluoro-1-butanesulfonate, bis(4-tert-butylphenyl)iodonium p-toluenesulfonate, bis(4-tert-butylphenyl)iodonium triflate, boc-methoxyphenyldiphenylsulfonium triflate, (tert-butoxycarbonylmethoxynaphthyl)-diphenylsulfonium triflate, (4-tert-butylphenyl)diphenylsulfonium triflate, diphenyliodonium hexafluorophosphate, diphenyliodonium nitrate, diphenyliodonium perfluoro-1-butanesulfonate, diphenyliodonium p-toluenesulfonate, diphenyliodonium triflate, (4-fluorophenyl)diphenylsulfonium triflate, n-hydroxynaphthalimide triflate, n-hydroxy-5-norbornene-2,3-dicarboximide perfluoro-1-butanesulfonate, (4-iodophenyl) diphenylsulfonium triflate, (4-methoxyphenyl) diphenylsulfonium triflate, 2-(4-methoxystyryl)-4,6-bis (trichloromethyl)-1,3,5-triazine, (4-methylphenyl) diphenylsulfonium triflate, (4-methylthiophenyl)methyl phenyl sulfonium triflate, 1-naphthyl diphenylsulfonium triflate, (4-phenoxyphenyl)diphenylsulfonium triflate, (4-phenylthiophenyl)diphenylsulfonium triflate, triarylsulfonium hexafluoroantimonate salts, triarylsulfonium hexafluorophosphate salts, triphenylsulfonium perfluoro-1-butanesufonate, triphenylsulfonium triflate, tris(4-tert-butylphenyl) sulfonium perfluoro-1-butanesulfonate, tris(4-tert-butylphenyl)sulfonium triflate, anthraquinone-2-sulfonic acid, 2-tert-butylanthraquinone, camphorquinone, diphenyl (2,4,6-trimethylbenzoyl)phosphine oxide, 9,10-phenanthrenequinone, phenylbis(2,4,6-trimethylbenzoyl)phosphine oxide, 1-chloro-4-propoxy-9 h-thioxanthen-9-one, 2-chlorothioxanthen-9-one, 2,4-diethyl-9 h-thioxanthen-9-one, isopropyl-9h-thioxanthen-9-one, 10-methylphenothiazine, and thioxanthen-9-one. In one embodiment, the photoinitiator is 2,4,6-trimethylbenzoyl-diphenylphosphine oxide (Darocur TPO). In one embodiment, the photoinitiator is benzoin methyl ether.

In some embodiments, the initiator is a thermal initiator. In a non-limiting example, the thermal initiator polymerizes the monomer upon exposure to heat, as would be understood by one of ordinary skill in the art. Examples of thermal initiators include, but are not limited to, azo compounds, peroxides and persulfates. Suitable persulfates include, but are not limited to, sodium persulfate and ammonium persulfate.

Suitable azo compounds include, but are not limited to, non-water-soluble azo compounds, such as 1-1'-azobiscyclohexanecarbonitrile, 2-2'-azobisisobutyronitrile, 2-2'-azobis(2-methylbutyronitrile), 2-2'azobis(propionitrile), 2-2'-azobis(2,4-dimethylvaleronitrile), 2-2' azobis(valeronitrile), 2-(carbamoylazo)-isobutyronitrile and mixtures thereof; and water-soluble azo compounds, such as azobis tertiary alkyl compounds, including 4-4'-azobis(4-cyanovaleric acid), 2-2'-azobis(2-methylpropionamidine) dihydrochloride, 2,2'-azobis [2-methyl-N-(2-hydroxyethyl) propionamide], 4,4'-azobis(4-cyanopentanoic acid), 2,2'-azobis (N,N'-dimethyleneisobutyramidine), 2,2'-azobis(2-amidinopropane) dihydrochloride, 2,2'-azobis (N,N'-dimethyleneisobutyramidine) dihydrochloride and mixtures thereof.

Suitable peroxides include, but are not limited to, hydrogen peroxide, methyl ethyl ketone peroxides, benzoyl peroxides, di-t-butyl peroxides, di-t-amyl peroxides, dicumyl peroxides, diacyl peroxides, decanol peroxide, lauroyl peroxide, peroxydicarbonates, peroxyesters, dialkyl peroxides, hydroperoxides, peroxyketals and mixtures thereof.

LC mesophases of the invention may be formed by first depositing a solution comprising at least one monomer, and optionally at least one initiator, in a solvent on a surface of a first substrate. In one embodiment, the solvent is an organic solvent. Non-limiting examples of organic solvents include tetrahydrofuran, (THF), xylene (ortho, meta, or para), methanol, ethanol, isopropanol, acetone, ethyl acetate, acetonitrile, hexane, hexene, octane, pentane, cyclohexane, iso-octane, and 1-hexene. In one embodiment, the solvent is tetrahydrofuran. In another embodiment, the solvent is water. The thickness of the mesophase may be adjusted by varying the concentration of the monomer in the solution and by the amount of solution deposited on the substrate. In other embodiments, the mesophase may include one or more other solvents, such as water, as would be understood by those skilled in the art. Upon deposition of the solution onto the surface of the first substrate, the monomer can self-assemble into supramolecular columns, forming pores within the mesophase.

The substrate may be formed from any material that would permit the formation of a LC mesophase upon its surface. In some embodiments, the substrate is a silicone elastomer substrate. In one embodiment, the silicone elastomer is polydimethylsiloxane (PDMS). Non-limiting examples of other polysiloxanes polydiethylsiloxane, polydiphenylsiloxane, polymethylvinylsiloxane, polyethylvinylsiloxane, polyphenylvinylsiloxane, polyethylmethylsiloxane, polymethylphenylsiloxane, and polyethylmethylsiloxane. In one embodiment, the first substrate is a PDMS substrate. In another embodiment, the first substrate is a glass substrate. In another embodiment the substrate is Kapton. In another embodiment the substrate is a silicon wafer. In another embodiment the substrate is composed of a polymeric material such as polyacrylic acid or polyvinylalcohol.

In one embodiment, the substrate is treated with a chemical agent to modify its surface properties. In one embodiment, the surface agent is poly(sodium 4-styrenesulfonate (PSS). In one embodiment, the chemical agent is applied using spin-coating. In another embodiment, the surface agent is octadecyltrimethoxysilane (OTMS). In one embodiment, the chemical agent is applied by exposing the surface to a vapor of the chemical agent.

In one embodiment, the solvent is removed from the mesophase prior to application of the first substrate. This may be accomplished, for example, by passing a stream of a gas or air over the mesophase surface, or by allowing the mesophase to remain exposed to air such that the solvent evaporates over time.

The mesophase may be of any volume, and is not limited to any particular geometry. Thus, the mesophase may take the shape and size of any substrate, mold, or container in order to produce, upon polymerization, a polymerized structure of desired geometry. For example, in one embodiment, the mesophase is shaped to form a thin-film polymer.

In certain embodiments, the mesophase may include an amount of monomer equal to about 10%, about 15%, about 16%, about 17%, about 18%, about 19%, about 20%, about 25%, about 30%, about 40%, about 50%, about 60%, about 70%, about 80%, about 90%, about 95% and about 99%. In some embodiments, the monomer is the mesogen, and the mesophase is comprised almost exclusively of the monomer with a small amount of initiator.

In certain embodiments, the mesophase may not include any photoinitiator. In other embodiments, the mesophase may include an amount of photoinitiator equal to about 0.1%, about 0.2%, about 0.3%, about 0.4%, about 0.5%, about 0.6%, about 0.7%, about 0.8%, about 0.9%, about 1%, about 2%, about 3%, about 4% or about 5%. In one embodiment, the mesophase includes about 0.5% of photoinitiator by weight. In one embodiment, the mesophase includes about 1.0% of photoinitiator by weight.

In certain embodiments, the mesophase may not include any crosslinker. In other embodiments, the mesophase may include an amount of crosslinker equal to about 0.1%, about 0.5%, about 0.6%, about 0.7%, about 0.8%, about 0.9%, about 1%, about 1.1%, about 1.2%, about 1.3%, about 1.4%, about 1.5%, about 2%, about 3%, about 4% or about 5%.

The mesophase is preferably in the form of a thin film of substantially constant thickness. In some embodiments, the thin film has a thickness ranging from about 10 nm to 500 μm. In another embodiment, the thin film has a thickness ranging from about 200 nm to 40 μm. In one embodiment, the thickness of the thin film is about 350 nm. The influence of the thickness on the alignment can be readily understood in the context of the finite elasticity of the medium, which specifies the distance over which the memory of a given orientation will decay under thermal forces. That is, the length scale where the elastic energy due to a non-uniform orientation of the LC director is less than or equal to $k_BT$. This length scale can be considered in a dimensionally consistent manner, as a persistence length λ defined by the ratio of an effective bending rigidity of the mesophase $K_{eff}$ and $k_BT$, where the effective bending rigidity originates from the elasticity of the mesophase. The quality of the alignment then decays exponentially with distance z from the interface, as captured by the tilt away from the boundary condition, $\cos\theta = e^{-z/\lambda}$.

Preferably, the thin film has a pore diameter ranging from about 0.1 nm to 10 nm. In one embodiment, the pore diameter is about 1 nm. In another embodiment, the pore diameter is between 1 and 2 nm. In one embodiment, the pore diameter is between 1.2 and 1.5 nm.

The thin films have pores of substantially uniform size. By "substantially uniform" it is meant that at least 75%, for example 80% to 95%, of pores have pore diameters to within 30%, within 10%, or within 5%, of average pore diameter. More preferably, at least 85%, for example 90% to 95%, of pores have pore diameters to within 30%, within 10%, and within 5%, of average pore diameter.

The pores are preferably cylindrical in cross-section, and preferably are vertically aligned, or present or extend through the thickness of the thin film, such that the pores are aligned parallel to the macroscopic transport direction.

The structure of the thin films of the present invention has a periodic arrangement of pores having a defined, recognizable topology or architecture, for example cubic, lamellar, oblique, centred rectangular, body-centred orthorhombic, body-centred tetragonal, rhombohedral, or hexagonal. In one embodiment, the thin film has a pore arrangement that is hexagonal, in which the film is perforated by a hexagonally oriented array of pores that are of uniform diameter and continuous through the thickness of the film.

In some embodiments, at least one of the substrates is removed from the thin film. In another embodiment, both the first and second substrates are removed from the thin film. In one embodiment, at least one substrate is comprised of a dissolvable material which can be selectively removed from the film by dissolution in a solvent. Non-limiting examples of dissolvable materials include polyacrylic acid and polyvinyl alcohol. In one embodiment, the solvent is water. In another embodiment, the solvent is an organic solvent. In another embodiment, both substrates are comprised of a dissolvable material.

Soft Confinement

The vertical alignment of nanopores in a thin film may be driven by subjecting the mesophase to soft confinement prior to annealing and optional cross-linking. As contemplated herein, soft confinement may include, without limitation, applying a second substrate onto the surface of the formed LC mesophase, thereby sandwiching the mesophase between the first and second substrates. In this conformation, the mesophase is in contact with both the first substrate and the second substrate, which induces homeotropic anchoring of the columnar nanopores at the interfaces between the mesophase and the first and second substrates, resulting in vertical alignment of the nanopores. Moreover, the presence of the second substrate prevents exposure of the mesophase to air, which can induce distortion of the thin film structure. In one embodiment, the second substrate is a PDMS substrate. A PDMS substrate is particularly useful, as it is both easily fabricated and can be scaled to cover large areas. In another embodiment, the second substrate is a glass substrate. In some embodiments, the first substrate and the second substrate are formed from the same material. In other embodiments, the first substrate and the second substrate are formed from different materials. Any size substrate may be used for the soft confinement step, provided that the area of the first substrate and the area of the second substrate are each equal to, or greater than, the area of the mesophase.

The temperature of the mesophase system may be manipulated during all or any portion of time that the second substrate is applied to the surface of the mesophase. In certain embodiments, control of temperature may be automated through a programmable temperature controller (Omega, Stamford, CT) that provides temperature control within 0.1° C. of set points, for example. Initially, the mesophase system may be heated above a threshold or temperature suitable for transitioning the mesophase monomers and other constituents from an ordered state to a disordered state. For example, the mesophase is heated above its order-disorder transition temperature, $T_{ODT}$, which facilitates rapid alignment. For example, if the threshold temperature is about 65° C., the system can be raised to a first temperature such as between 70-90° C., and held at that temperature for a period of time before cooling through $T_{ODT}$ to a second temperature of between about 20-30° C. at a rate between 0.1 and 30° C./minute. In a preferred embodiment, the mesophase system may be heated to a threshold or melting temperature of about 75° C., and held at that temperature for about 1 minute before cooling through $T_{ODT}$ to a second temperature of about 25° C. at a rate of about 0.1° C./minute. In another embodiment, the cooling rate is 0.1° C./minute. In some embodiments, the threshold temperature is the temperature at which the mesophase exhibits an isotropic phase. As used herein, the term "isotropic" indicates a single continuous phase, such as a liquid. The temperature at which a mesophase exhibits an isotropic phase can be determined using any method known in the art, such as differential scanning calorimetry, temperature resolved polarized optical microscopy or temperature resolved x-ray scattering.

In one embodiment, a magnetic field can be applied to the polymer film with concurrent rotation about the normal of the plane of the film. In one embodiment, this magnetic field and rotation is maintained while the system is heated to the isotropic point and cooled to room temperature. In one embodiment, the magnetic field strength is between 0.001 and 10 T. In one embodiment, the magnetic field strength is between 1 and 10 T. In one embodiment, the magnetic field strength applied is 6 T. In some embodiments, the magnetic field can be necessary if the film thickness is greater than 5 μm.

Polymerization

After alignment of the mesophase system via application of the second substrate, the system may be polymerized to form a polymer film having aligned or oriented nanopores therein. Polymerization may be performed via, thermal polymerization, free radical polymerization, catalyst induced polymerization, or any other polymerization technique as would be understood by those skilled in the art. In certain embodiments, the polymerization is free radical polymerization. In certain embodiments, the film may include a well maintained alignment of structures substantially perpendicular to the film surface.

EXPERIMENTAL EXAMPLES

The invention is now described with reference to the following Examples. These Examples are provided for the purpose of illustration only, and the invention is not limited to these Examples, but rather encompasses all variations that are evident as a result of the teachings provided herein.

Example 1: Thin Polymer Films with Physically Continuous and Vertically Aligned 1 nm Pores: Toward Improved Membranes The materials and methods employed in these experiments are now described.

Materials and Methods

The synthesis and characterization of the amphiphilic monomer Na-GA3C11 is referenced in a previous report (Gin et al., J. Am. Chem. Soc., 1997, 119 (17), pp 4092-4093). Silicon elastomer kit was obtained from Dow Corning. All other chemicals were purchased from Aldrich and used as received. For UV-induced cross-linking, Na-GA3C11 was doped with a small amount of a commercially available radical photoinitiator diphenyl(2,4,6-trimethylbenzoyl)phosphine oxide (0.5 wt %). Glass slides and silicon wafers were cleaned by acetone and water and then dried by nitrogen gas before use. Polydimethylsiloxane (PDMS) elastomer pads were prepared by following the standard procedure. Briefly, a homogeneous fluid mixture of a silicon monomer and a curing agent with a weight ratio of 9:1 was poured into a Petri dish in which a clean silicon wafer was placed at the bottom. Subsequently, bubbles trapped in the fluid mixture were eliminated by vacuum. Thermal curing at 70° C. resulted in a transparent PDMS elastomer pad (5 mm) with a smooth surface.

Preparation of LC and Polymer Films

LC films with two thicknesses (i.e., 80 and 28 μm) were prepared by sandwiching the mesophase by two substrates with the corresponding 80 or 28 μm spacers, respectively. LC films with a thickness ranging from 200 nm to 10 μm were obtained by casting of an LC/THE solution onto a glass or silicon substrate followed by solvent evaporation. The thickness of the film was generally controlled by the concentration and the amount of the solution cast on the substrate. Polymer films were prepared by photo-cross-linking of LC films (with 0.5 wt % initiator) obtained by following the above described procedure.

Soft Confinement Fabrication of Polymer Films

A PDMS elastomer pad (1.5 cm×1.5 cm×0.5 cm) was pressed onto a LC film (doped with photo-initiator) lying on a substrate. The LC film was then thermally annealed by heating up to the isotropic phase (75° C.) and allowing it to cool back to room temperature at a rate of 0.1° C./min. Subsequently, a polymer film was obtained by cross-linking the LC film immediately through exposure to 365 nm UV light (8 W UVL-18 EL lamp at a distance of ca. 10 cm) for 24 h at room temperature.

Polarized Optical Microscopy (POM) and Conoscopy

POM images were obtained by a Zeiss Axiovert 200 M inverted microscope. Conoscopy studies were performed by using a Zeiss Axio Imager M2m microscope. The conoscopic images were obtained with a 40× objective and a Bertrand lens introduced between the analyzer and the ocular.

Transmission Electron Microscopy (TEM)

To obtain a thin specimen for cross-sectional TEM imaging, a polymer film was embedded in an epoxy and then the epoxy along with the sample was cured at 60° C. overnight to enhance the rigidity for microtoming. The cured epoxy block was then sectioned at room temperature by a diamond knife mounted on a Leica EM UC7 ultramicrotome. Thin sections (ca. 60 nm thick) on top of water were picked up onto a TEM grid and stained in vapor of a 0.5 wt % aqueous solution of $RuO_4$ for 10 min. Specimens were then visualized by an FEI Tecnai Osiris TEM with an accelerating voltage of 200 kV. To visualize a polymer film with a thickness of 350 nm along the through-plane direction, the film was detached from the substrate by sonication in a water/ethanol (9/1, volume ratio) bath. Specimens were then obtained by placing several drops containing suspension of tiny pieces of films onto a TEM grid.

Small Angle X-Ray Scattering (SAXS)

Figure 5:
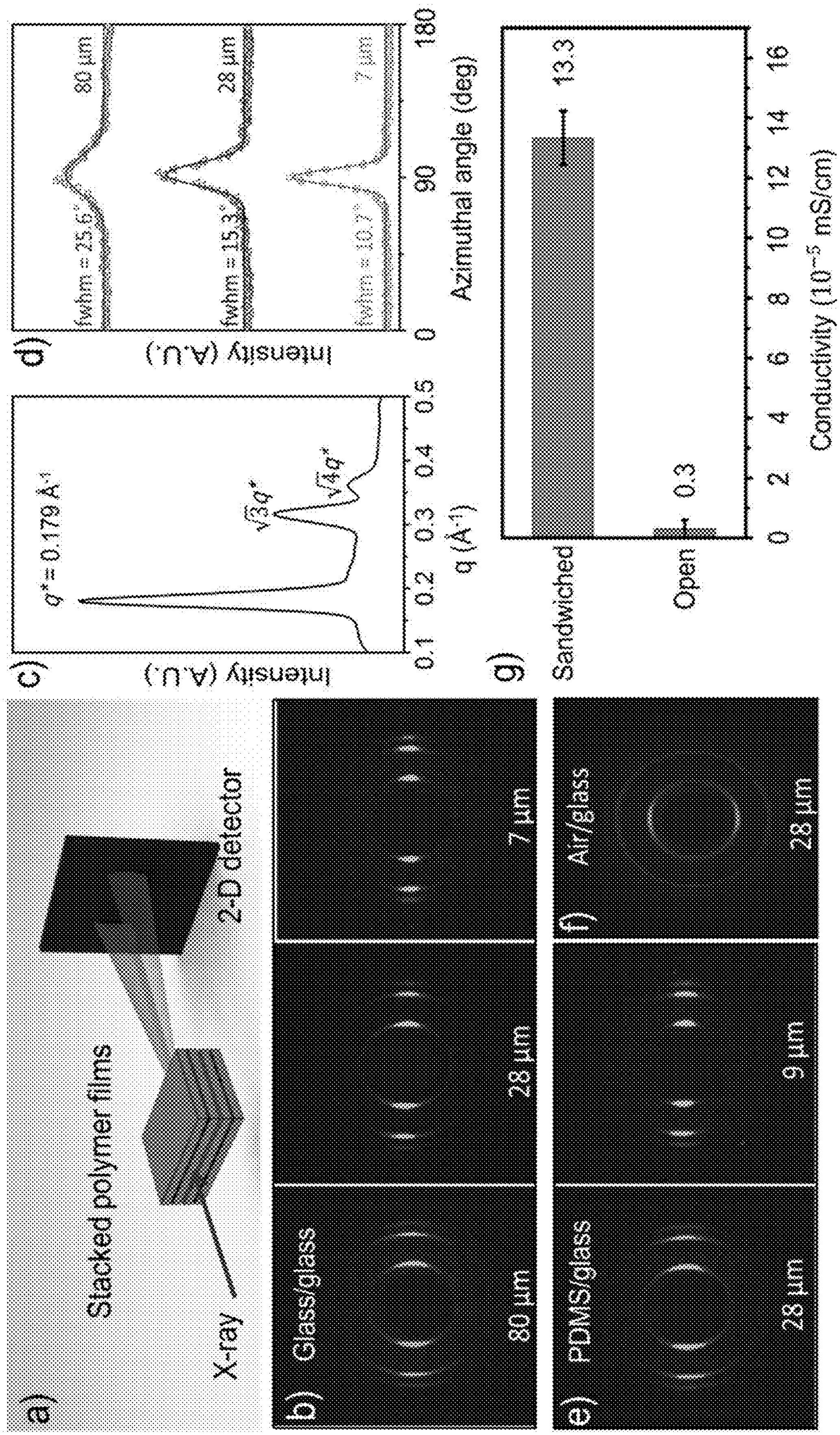
FIG. 5, comprising
Figure 20:
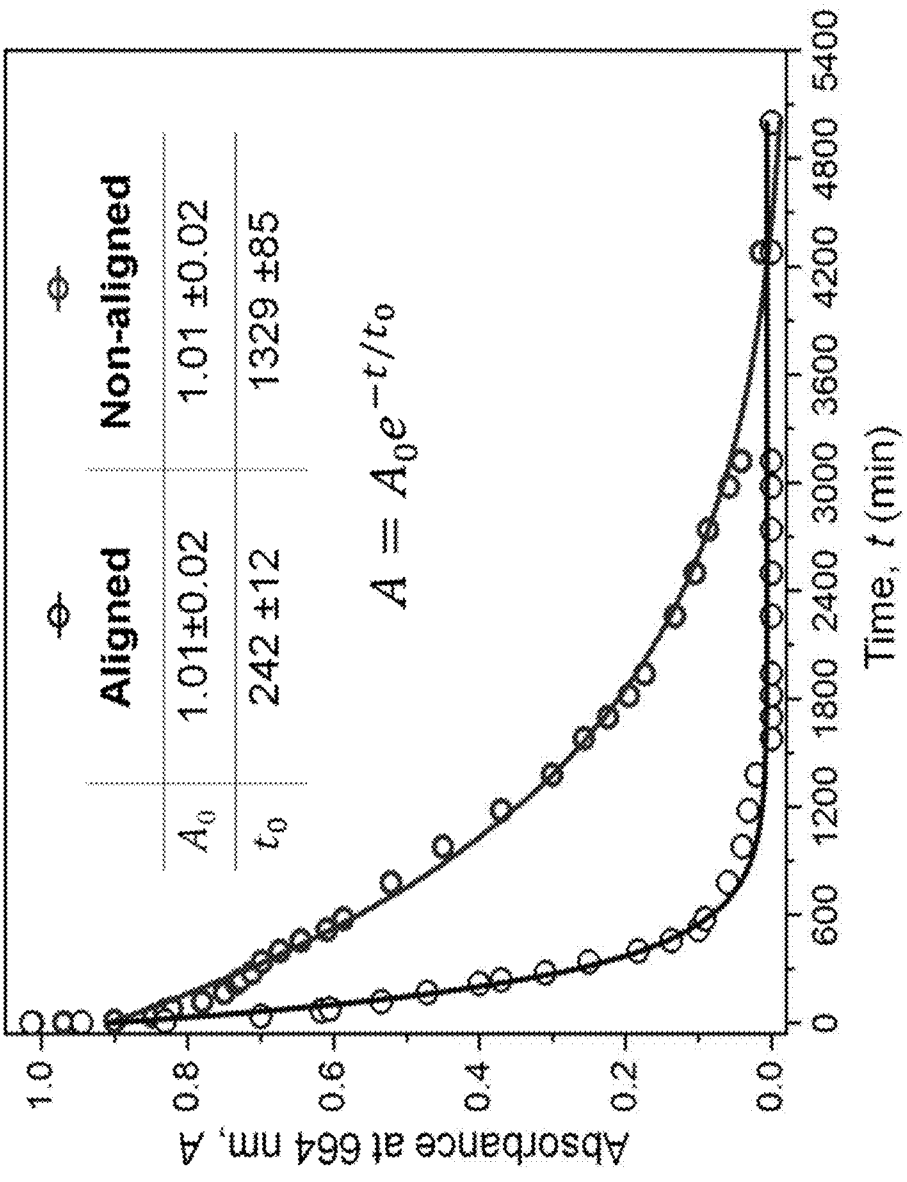
FIG. 20 is a plot of the UV-Vis absorbance of MB solutions as a function of time during adsorption into aligned and non-aligned nanoporous polymers.

SAXS measurements on the $Col_h$ mesophase and cross-linked polymer films were performed by using a Rigaku 007 HF+ instrument with a rotating anode Cu Kα X-ray source (λ=1.542 Å) and a 2-D Saturn 994+CCD detector. A silver behenate standard (d-spacing of 58.38 Å) was employed for the calibrations of the resultant 2-D SAXS data. All the 2-D scattering patterns were integrated into 1-D plots of scattering intensity (I) versus q, where $q=4\pi \sin(\theta)/\lambda$, and the scattering angle is 2θ. Particularly for measurements on a polymer film, as schematically illustrated by FIG. 5*a*, 20 layers were stacked along the film normal to enhance the scattering intensity. Two additional metal sheets (ca. 2 mm thick) were used to sandwich the stacked polymer films. The sample was then mounted to the SAXS instrument such that the incident X-ray beam was parallel to the film plane.

The results of the experiments are now described.

The results described herein demonstrate the fabrication of sub-μm polymer films possessing vertically oriented 1 nm pores using simple and readily accessible tools. These films were produced by subjecting sub-μm films of a cross-linkable hexagonal columnar ($Col_h$) LC to soft confinement using an elastomeric pad of polydimethylsiloxane or PDMS (FIG. 1). High-resolution transmission electron microscopy (TEM) images confirm that the pores are physically continuous with persistent vertical orientation through the film thickness.

Figure 7:
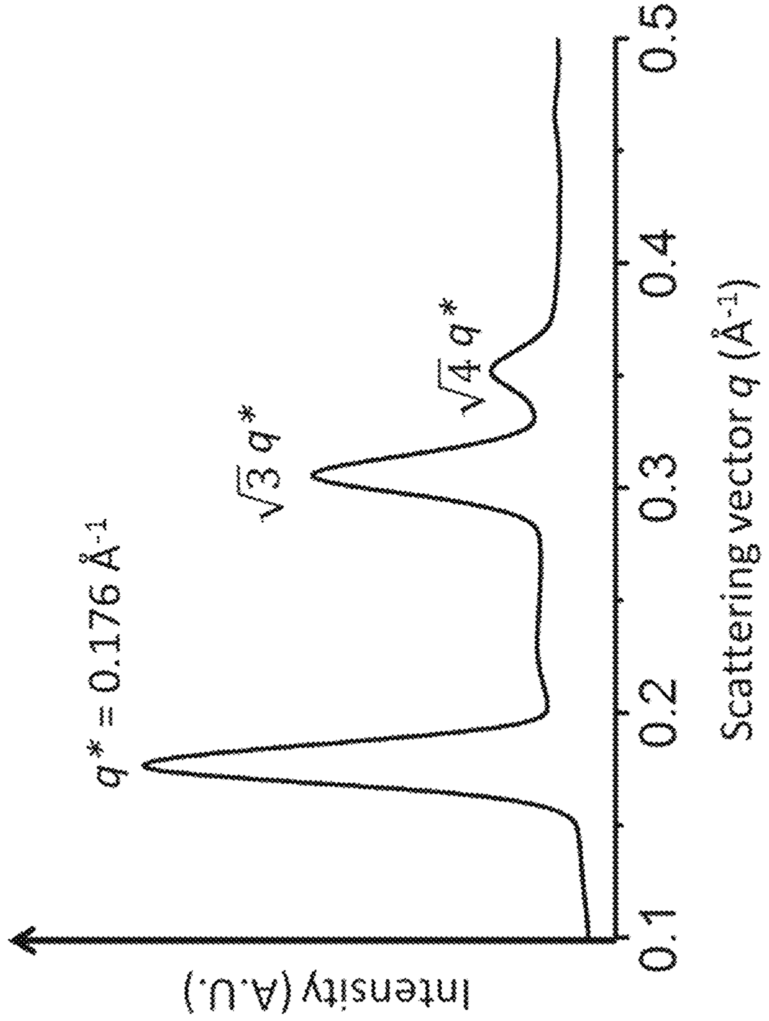
FIG. 7 is a graph of experimental SAXS integrated data of the $Col_h$ phase formed by Na-GA3C11 at room temperature. The primary reflection at $q^*=0.176$ Å$^{-1}$ corresponds to the Bragg spacing d (100)=3.6 nm. The characteristic peak spacing ratio of 1:√3:√4 demonstrates the hexagonal morphology.
Figure 8:
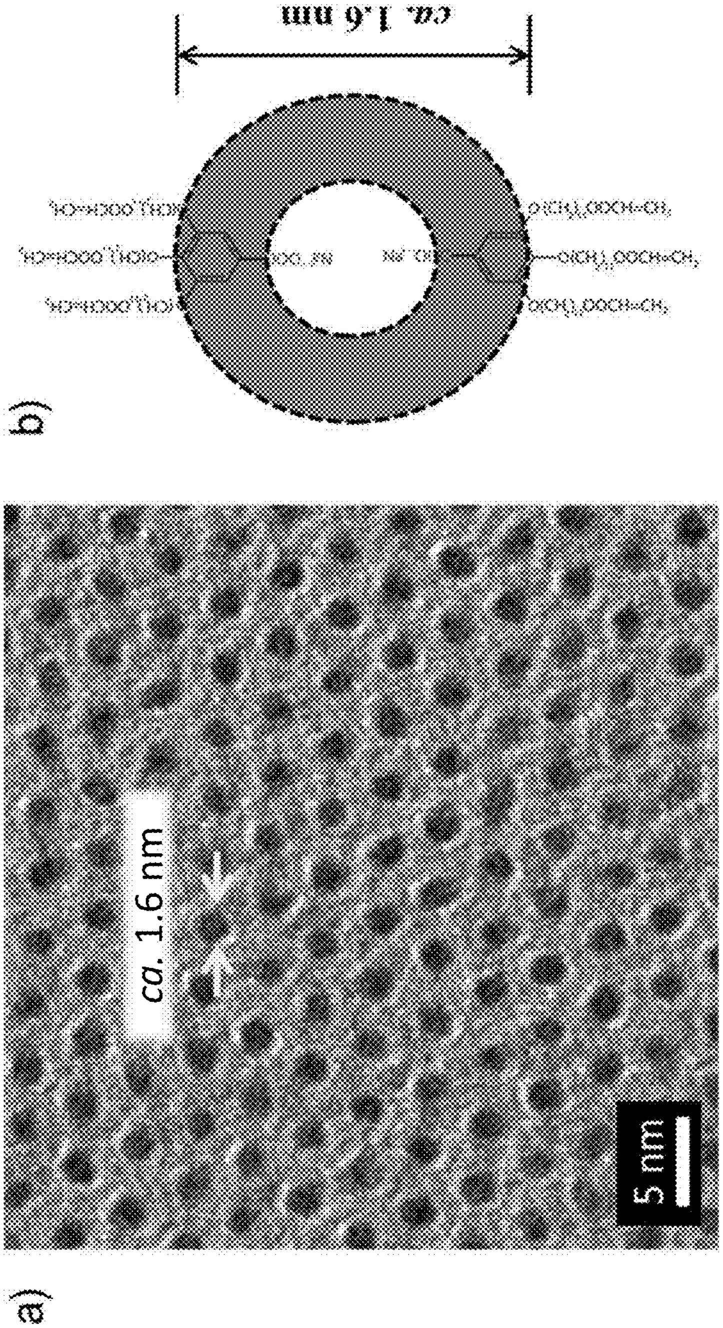
FIG. 8, comprised of FIGS. 8A-8B, depicts images of exemplary columnar nanopores.

FIG. 1A shows the molecular structure of the employed amphiphilic monomer (Na-GA3C11), the synthesis and characterization of which have been previously reported (Geng et al., 2014, ACS Nano 8:11977-11986). This type of wedge-shaped amphiphilic molecule possessing a large hydrophobic body and a small hydrophilic head tends to form supramolecular columnar LC phases with closely-packed, ordered hydrophilic nanochannels (Chen et al., 2014, J. Phys. Chem. B 118:3207-3217; Smith et al., 1997, J. Am. Chem. Soc. 1.19:4092-4093; Deng et al., 1998, J. Am. Chem. Soc. 120:3522-3523). In the neat state, Na-GA3C11 self-assembles into a $Col_h$ LC phase at room temperature, as confirmed by small angle X-ray scattering (SAXS) showing the characteristic peak spacing of 1:13:14 (FIG. 7). The $Col_h$ mesophase transitions into isotropic phase at elevated temperatures above 64.9° C. (Geng et al., 2014, ACS Nano 8:11977-11986). High-resolution TEM visualization of a microtomed specimen from the magnetically aligned and subsequently photo-cross-linked bulk sample reveals the hexagonally-packed nanopores with diameter as estimated to be ca. 1 nm (FIG. 8).

Figure 12:
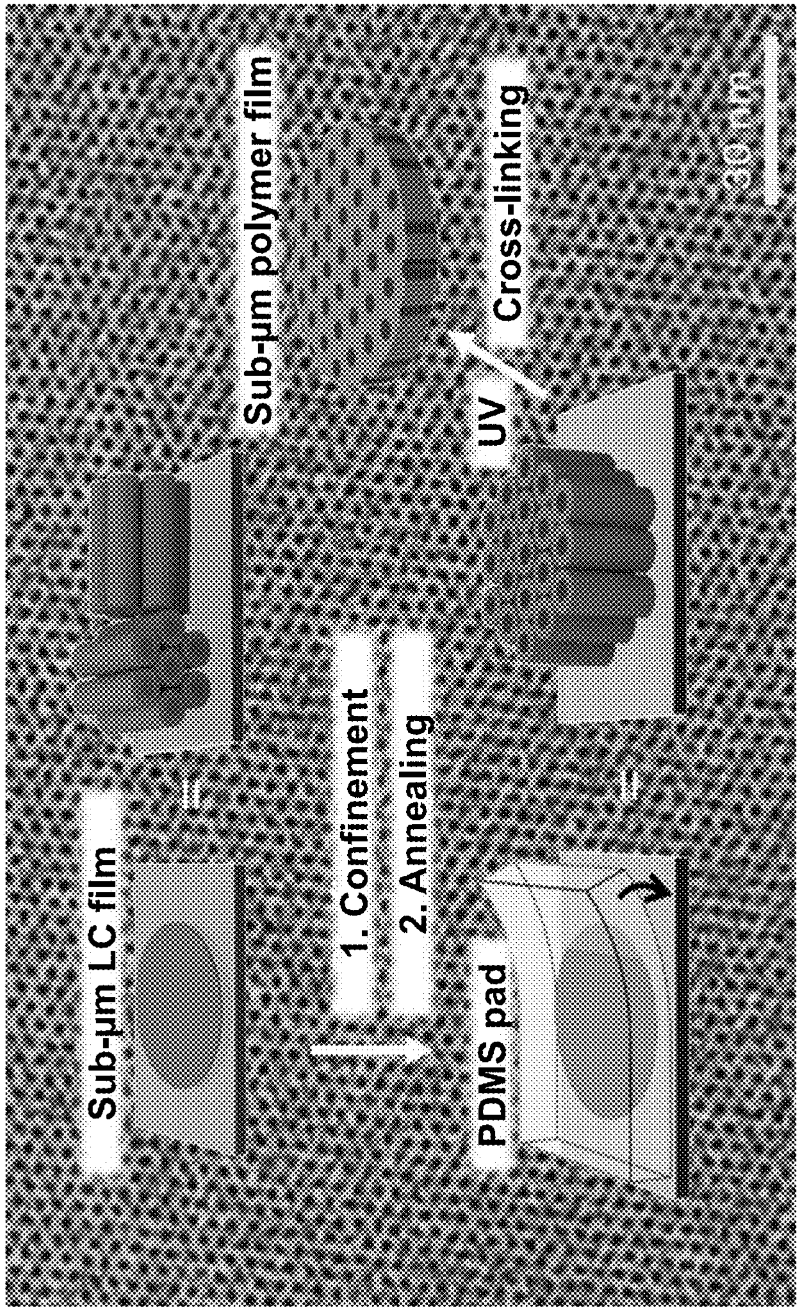
FIG. 12 is a scheme of an exemplary process of aligning nanopores using the methods of the invention. The schematic is superimposed over a TEM image of aligned nanopores.

As described herein, the orientation of the nanoporous structure in polymer thin films in the absence of any external field was investigated. Here the orientation of the columnar nanopores is determined only by surface confinement effects. As schematically illustrated by FIG. 1B, it was observed that the utilization of soft confinement can effectively circumvent the critical challenge of the vertical (through-plane) alignment of nanopores over large areas in polymer thin films. FIG. 12 also shows a schematic illustration of an exemplary process of aligning nanopores using the methods of the present invention.

Figure 2:
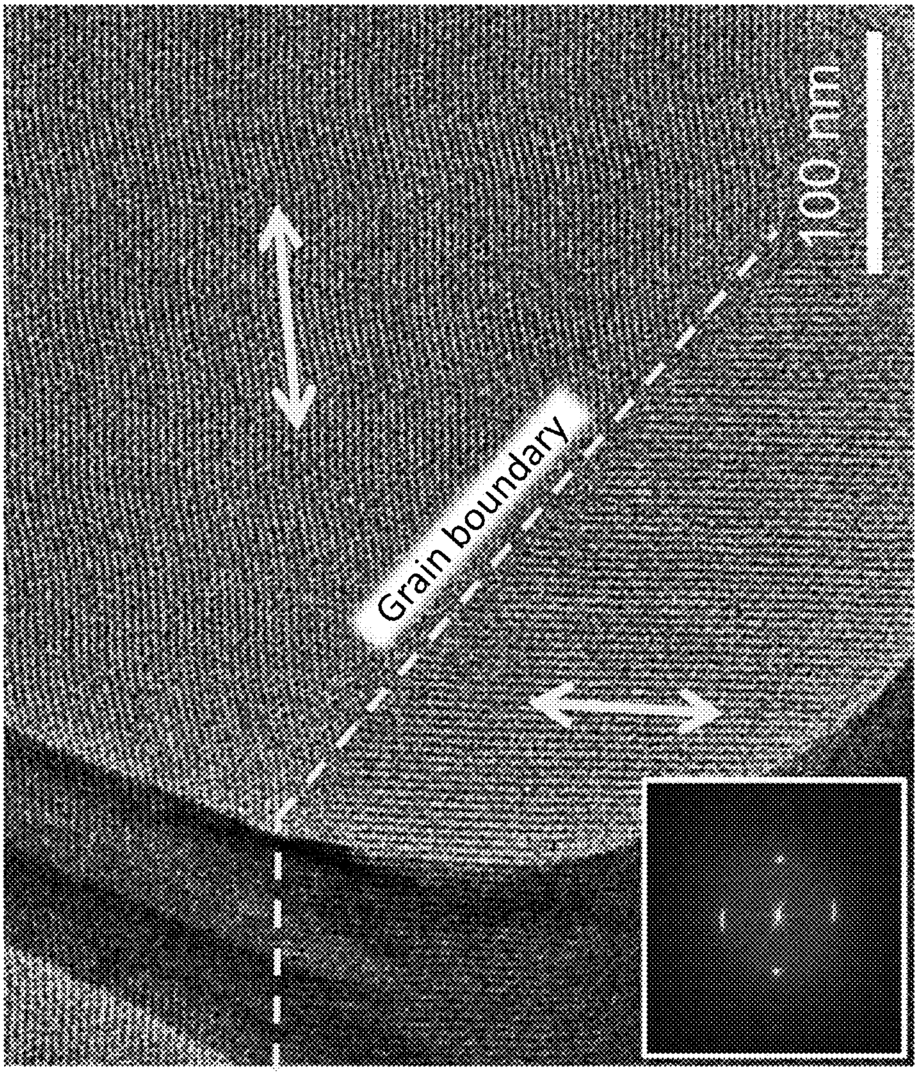
FIG. 2 is a plane view tunneling electron microscopic (TEM) image of an exemplary polymer film produced by casting a Na-GA3C11/THF solution onto a glass substrate followed by thermal treatment and subsequent photo-cross-linking. The image shows degenerate planar alignment of the columnar nanochannels. Fourier transform (inset) indicates the different orientations of two coexistent grains with an observable grain boundary.

A thin LC monomer film was prepared by casting a dilute THF solution of Na-GA3C11 containing a small amount of photo-initiator (0.5 wt %) on a silicon substrate and allowing the solvent to evaporate. The film was thermally treated with heating to the isotropic phase (75° C.) and cooling back to room temperature at a rate of 0.1° C./min. A polymer film (ca. 350 nm thick) was obtained by subsequent photo-cross-linking. FIG. 2 shows a direct TEM image of a plan view of the cross-linked film. The columnar axes are oriented parallel to the plane of the film with the azimuthal angle being arbitrary, as evidenced by two coexistent grains showing different planar columnar orientations with an observable grain boundary. The Fourier-transform pattern (inset) exhibiting four-fold contributions further demonstrates the degenerate planar nature of the orientation.

Figure 3:
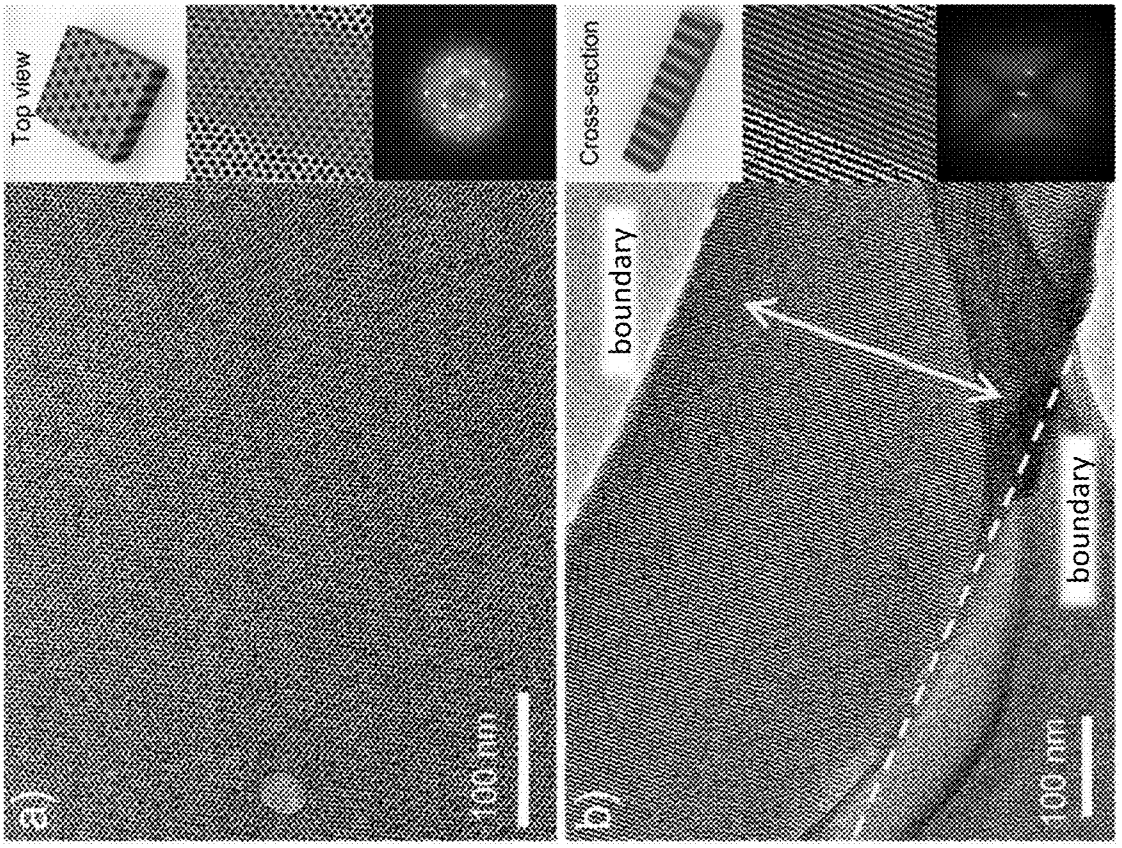
FIG. 3, comprised of FIGS. 3A-3B, depicts TEM images of an exemplary polymer thin film with thickness of about 350 nm produced by soft confinement showing highly-ordered, vertical nanochannels.

When a soft PDMS elastomer pad was pressed onto the LC film before thermal annealing and cross-linking, the columnar nanopores adopted a strikingly different orientation. FIG. 3A shows a plan view TEM image of the thin film prepared by soft confinement. A single-crystal-like array of hexagonally packed nanopores is observed. The Fourier transform (inset) of this image displays sharp six-fold symmetric contributions up to the third order, reflecting the high degree of structural order in the sample. A cross-sectional TEM image (FIG. 3B) of a specimen microtomed perpendicular to the film plane clearly shows that the nanopores are vertically aligned and physically continuous through the thickness of the specimen. The Fourier transform of the TEM image (inset) displays the corresponding two-fold symmetry expected for a cross-sectional view of vertically aligned structures.

The different orientations of columnar nanopores found in open versus confined films originate from different surface anchoring of the columnar structures at the free air surface relative to the PDMS interface. To elucidate the influence of surface anchoring on the alignment of columnar nanopores over more macroscopic dimensions, polarized optical microscopy (POM) and conoscopy studies were performed on LC films (in the absence of any photo-initiator) under different surface confinement conditions. All the investigated LC films were thermally treated following the same protocol described above.

Figure 4:
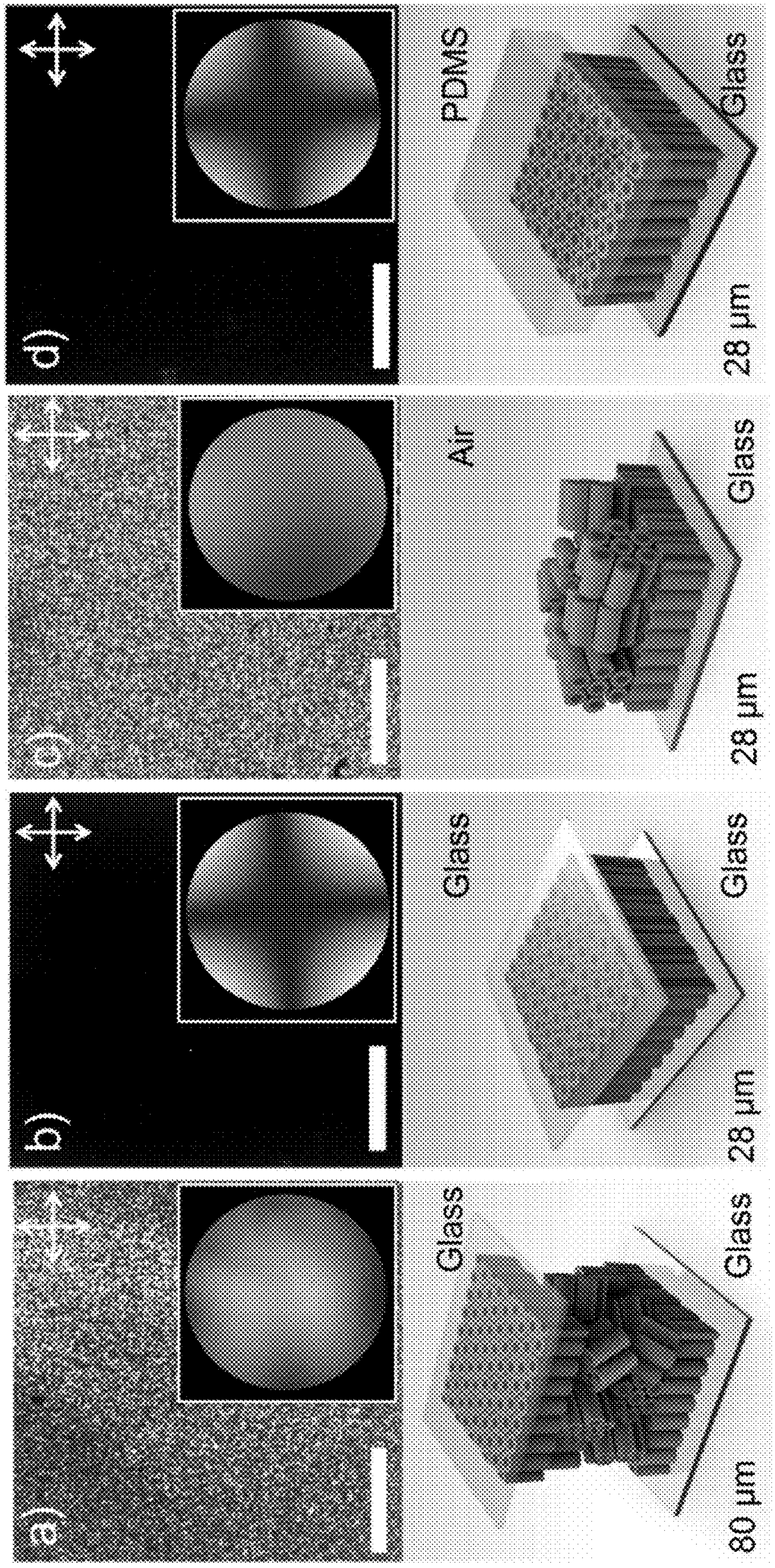
FIG. 4, comprised of FIGS. 4A-4D, depicts room-temperature polarized optical microscopy (POM) images of exemplary thermally annealed Na-GA3C11 films with different thickness and under different surface confinement conditions.

FIG. 4A shows POM and conoscopic (inset) images of an 80 μm thick film sandwiched by two flat glass slides after thermal treatment. The observed birefringent texture under POM as well as the poorly defined features in the conoscopic image indicate that the optical axes of the domains (i.e., the columnar axis of $Col_h$ structure) is not uniquely oriented along the normal to the film surface. That is, there are significant deviations of the columnar axes from the vertical direction in the film. However, when the film thickness was reduced to 28 μm, the sample exhibited optical extinction and a characteristic Maltese cross under POM and conoscopy, respectively (FIG. 4B), which are consistent with uniform vertical alignment of the supramolecular columnar nanopores (homeotropic anchoring). This behavior indicates that the glass interface induced homeotropic anchoring to the columnar nanopores.

In contrast to the sandwiched sample, an open film of the same thickness (28 μm) with one surface exposed to the air possessed randomly oriented columnar nanopores, as evidenced by a birefringent POM texture and poorly defined conoscopic image (FIG. 4C). Although not wishing to be bound by any particular theory, this observation suggests that the free surface of the film induced non-homeotropic anchoring of the $Col_h$ phase, most likely resulting in a degenerate planar or homogeneous anchoring condition. Air interfaces under ambient conditions are known to favor contact with hydrophobic moieties (Malysa et al., Adv Colloid Interface Sci. 2009, 147-148:155-69). It was hypothesized that the anchoring behavior in the 28 μm open sample results from energy minimization at the free air interface by preferentially displaying the hydrophobic alkyl tails of the mesogens, leaving the polar ionic head groups recessed. Thus, the open film was subject to antagonistic or asymmetric boundary conditions as schematically illustrated by the 3-D model in FIG. 4C. When a smooth, soft PDMS pad was placed onto the 28 μm open film followed by thermal annealing, vertically aligned columnar nanopores were obtained, as confirmed by a dark POM appearance and a characteristic Maltese cross from conoscopy (FIG. 4D). Although not wishing to be bound by any particular theory, this observation suggests that both the glass and the PDMS interfaces induce the same boundary condition to the $Col_h$ phase, i.e., homeotropic anchoring.

SAXS studies on the polymer films were performed to provide complementary information regarding the orientation of the columnar nanopores. FIG. 5A depicts the SAXS experiment, in which the polymer films were stacked to provide sufficiently thick samples for the measurement.

FIG. 5B shows the 2-D scattering patterns of films of different thicknesses prepared by thermal treatment under confinement between two glass slides. Anisotropic scattering equatorial intensity concentrations indicate that the glass surface produces vertically aligned columnar nanopores. The 1-D integrated data with characteristic peak spacing ratio of $1:\sqrt{3}:\sqrt{4}$ shown in FIG. 5C confirms the hexagonal symmetry of nanostructure in the samples expected for the $Col_h$ phase. FIG. 5D shows the azimuthal intensity distribution for the primary Bragg peak at different film thickness and Gaussian fits of the data. The vertical alignment quality increased upon decreasing the film thickness, as characterized by a decrease of the FWHM (full width at half maximum). This finding is consistent with the above mentioned POM observation where birefringent textures appear in a relatively thick film (i.e., 80 μm). The azimuthal intensity distribution is exceptionally narrow at a thickness of 7 μm, with a FWHM=10.7°. Using a Gaussian approximation for the azimuthal intensity distribution, this FWHM yields an orientational order parameter S=0.98, where S=1 corresponds to a perfectly oriented system and S=0 a completely random one. The 2-D SAXS patterns (FIG. 5E) of the polymer films prepared by soft confinement also display such a dependence of alignment quality on film thickness. The azimuthal intensity distribution at a thickness of 9 μm is much narrower than that of 28 μm with FWHM of 23.9 vs 13.4°, respectively. The discernable differences between the 14 and 4.5 μm half-thickness films indicates that the persistence length is similar in magnitude to these dimensions. Therefore, it can be hypothesized that when the film thickness is reduced to the sub-μm range, highly persistent alignment of columnar nanopores should be achieved. The TEM observations in FIG. 3B for a film of 350 nm support this hypothesis. FIG. 5F shows 2-D SAXS of a 28 μm film prepared with antagonistic boundary, conditions, where one interface is exposed to air. The measured scattering is indicative of a morphology with mixed orientations of the columnar structures. Although not wishing to be bound by any particular theory, anisotropic scattering with sharp intensity along the meridian suggests the presence of in-plane orientation in the film. The detectable scattering at other azimuthal positions may arise due to degeneracy of parallel orientation at the free surface and distortion of the columnar director under the antagonistic boundary conditions.

Figure 6:
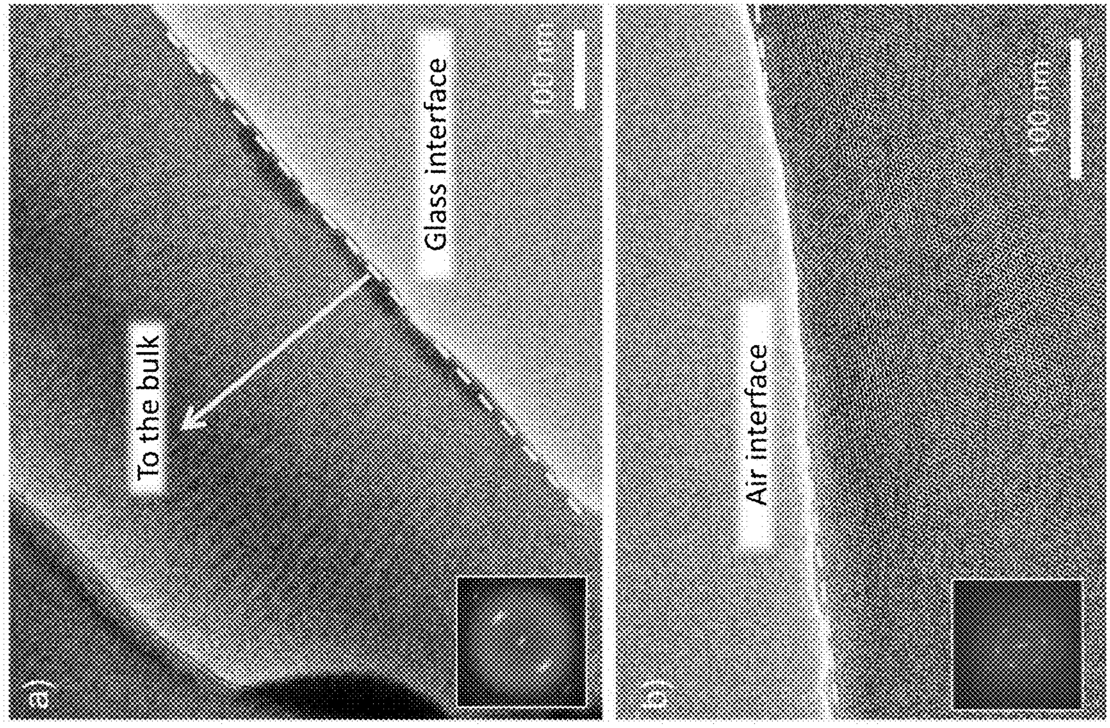
FIG. 6, comprised of FIGS. 6A-6B, depicts TEM images of columnar nanopores.
Figure 9:
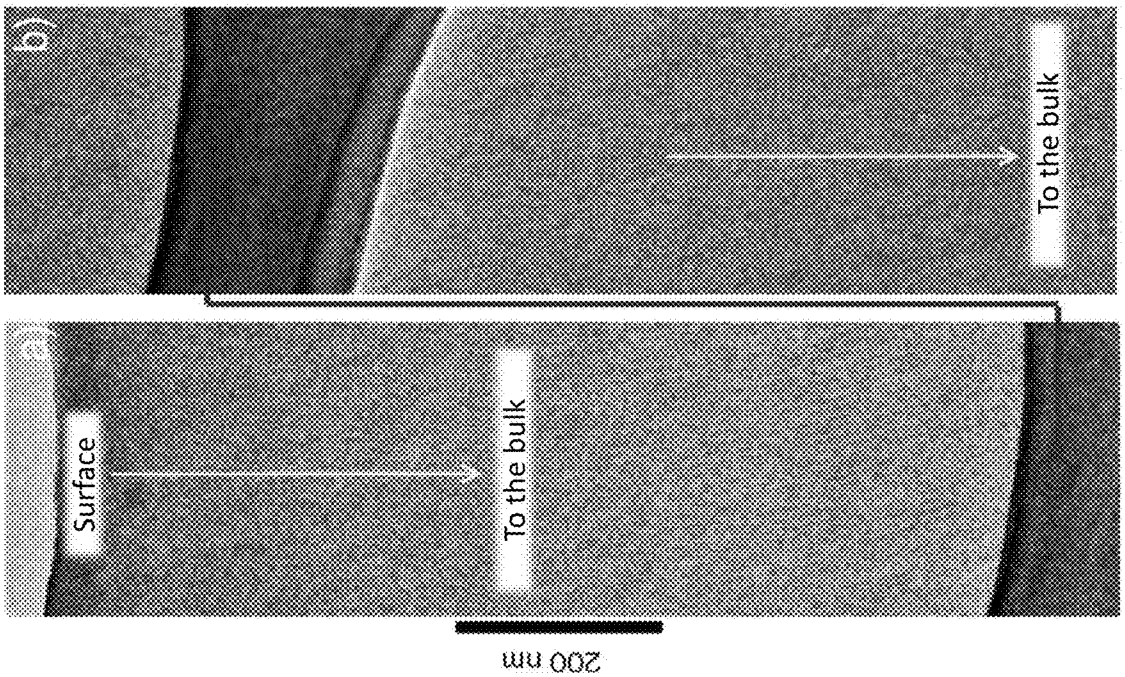
FIG. 9, comprised of FIGS. 9A-9B, depicts low-magnification TEM images showing the physical continuity of vertical alignment of columnar nanopores from the surface to the bulk.
Figure 10:
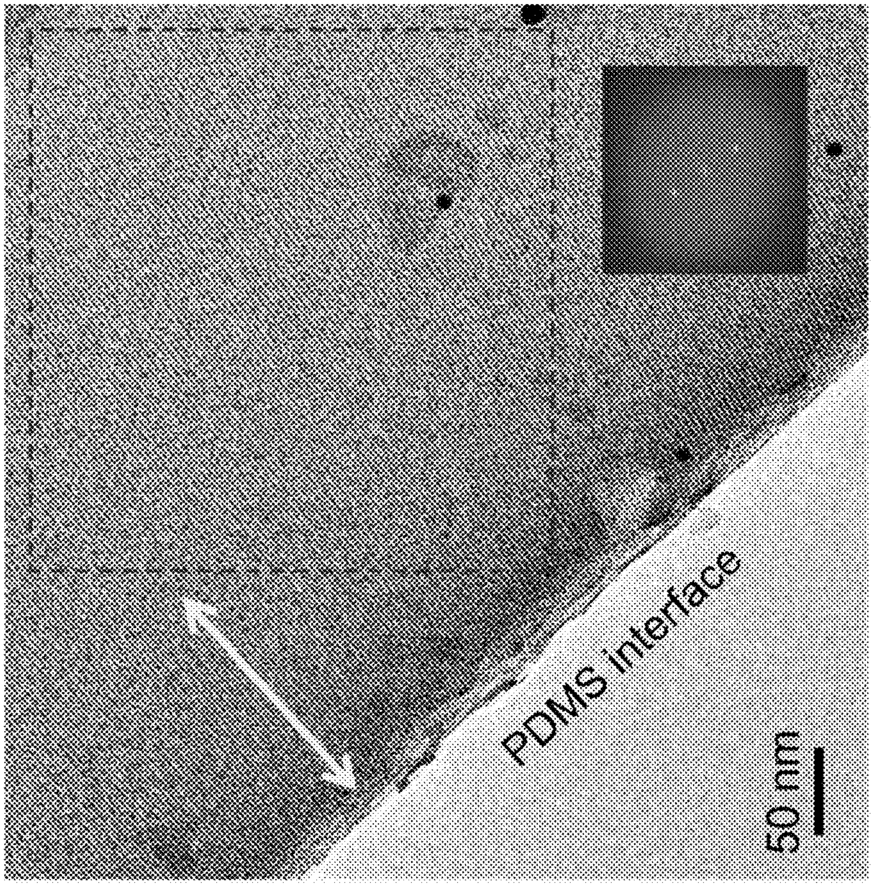
FIG. 10 is a series of cross-sectional TEM images showing the columnar nanopores oriented vertically to the PDMS interface. The Fourier transform (inset) of an area enclosed by the red dashed rectangle displays two fold symmetry.
Figure 13:
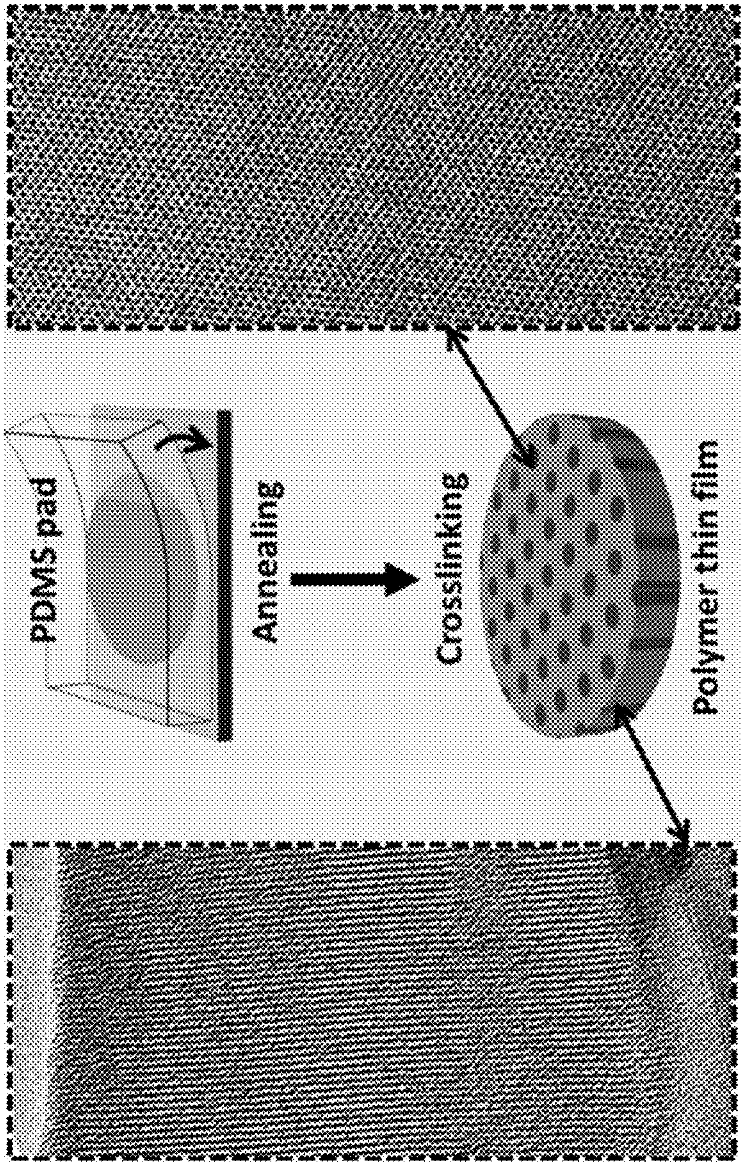
FIG. 13 is a series of images from different perspectives of nanopores aligned using the methods of the present invention.

Conductivity measurements on cross-linked polymer films prepared in sandwiched and open-to-air geometries respectively provide strong evidence of their different transport properties (FIG. 5G). The sandwiched films show a 44-fold increase in their conductivity relative to the open films. The substantial improvement in the conductivity of the system in the sandwiched state highlights the potential utility of the current approach in producing membranes with attractive properties for functional applications. TEM was employed to obtain a direct visualization of the surface structure and thereby provide insight regarding the orientation and physical continuity of the nanopores at the confining surfaces. The thickness of the investigated polymer film was about 400 μm, which is expected to decouple the surface morphologies, and hence exclude the possibility of significant director distortion. Thin specimens (ca. 60 nm thick) were prepared by microtoming the sample perpendicular to the film surface, thereby providing cross-sectional views of the film morphology. FIG. 6A shows a cross-sectional TEM image for the nanostructure at the polymer/glass interface. It is clear that the columnar nanopores are perpendicular to the glass interface and that the vertical orientation extends from the surface towards the bulk interior of the 400 μm thick sample. Accordingly, the Fourier transform of the TEM image (inset) displays two-fold symmetry. Step-imaging at lower magnifications shows that the physical continuity and vertical alignment of the structure persists for a distance of approximately 5 to 10 μm (FIG. 9). FIG. 13 shows additional images of aligned columnar nanopores. This finding is in rough quantitative in agreement with both the SAXS and POM data. It is also revealed by TEM that the polymer/PDMS interface induces vertical alignment of the columnar nanopores (FIG. 10).

Figure 11:
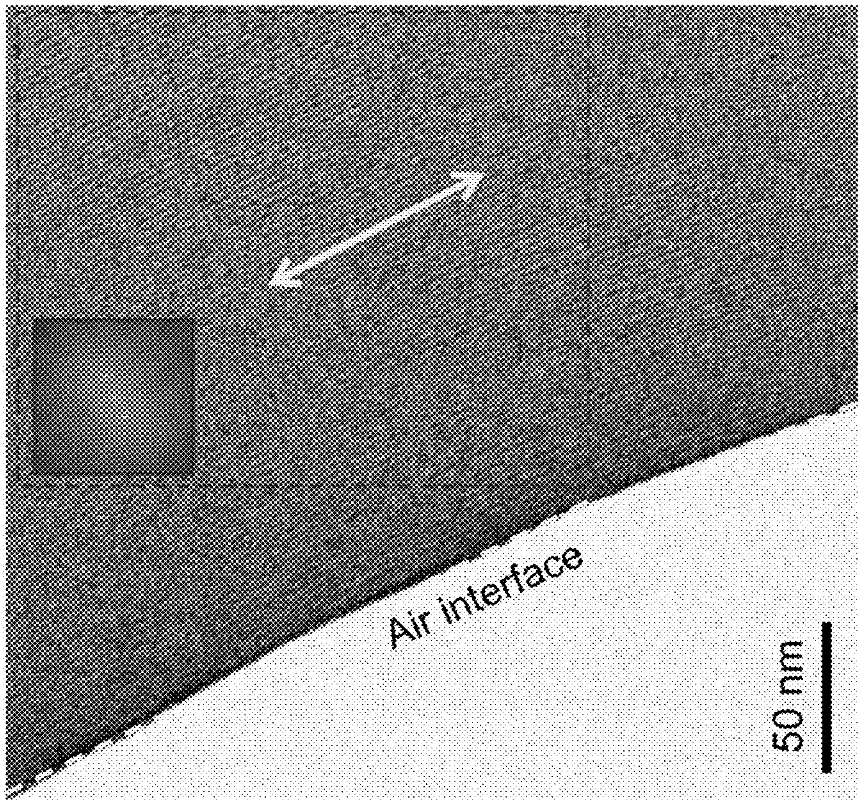
FIG. 11 is a series of cross-sectional TEM images showing the columnar nanopores oriented parallel to the air interface and the sectioned plane. The Fourier transform (inset) of an area enclosed by the red dashed rectangle displays two fold symmetry.

TEM imaging of the polymer/air interface shows homogeneous anchoring as distinguished by the occurrence of several areas in which circular hexagonally packed features are clearly visible, consistent with end-on views of the hexagonally packed columnar structures (FIG. 6B). The homogeneous anchoring produces a degenerate situation as evident from the various projections of the parallel aligned columnar nanopores that are visible in addition to the hexagonally packed end-on views (FIG. 11).

The data obtained from POM, SAXS, and TEM studies demonstrates that both the glass and PDMS surfaces induce homeotropic anchoring of the columnar nanopores, but the free air interface results in degenerate planar anchoring. Film exposed to air were therefore subjected to antagonistic boundary conditions which induce distortion of the structure. In sufficiently thin films one expects uniform orientation of the nanopores throughout the film because distortion of the LC director on sub-thickness length scales in such a film would be precluded by the very large associated elastic energies. Assuming equilibrium conditions, the particular orientation observed would be determined by the surface which has stronger 1 anchoring strength. Although not wishing to be bound by any particular theory, the TEM image of the open sub-μm thin film (FIG. 2) indicates that the free air surface was dominant in controlling the orientation of the columnar nanopores, as a degenerate planar anchoring morphology was observed. It is apparent that the samples conformally contact both PDMS and glass surfaces such that air pockets are not formed, and exposure to air is therefore avoided. In the sandwiched arrangement both surfaces of the film induce homeotropic anchoring leading to vertical alignment as desired.

In conclusion, the results described herein demonstrate a simple strategy to produce polymeric thin films with physically continuous and vertically aligned 1 nm pores. This method relies on confinement and subsequent photo-cross-linking of thin films of a $Col_h$ mesophase formed by a wedge-shaped amphiphile. TEM, SAXS and POM studies provide clear experimental verification of the role of different anchoring conditions in producing the observed morphologies, and of the physical continuity of nanopores through the film thickness. Thin films of any desired area can be easily processed by this technique to achieve vertical nanopore orientation, as the only requirement is for the area of the substrate and the confining material, glass or PDMS, to be matched with that of the film.

Example 2: Aligned Nanoporous Polymers from Sustainable Materials Using a Molecular Templating Approach The materials and methods employed in these experiments are now described.

Materials and Methods

Synthesis of the Template Molecule 1,3,5-tris(1H-benzo[d]imidazol-2-yl)benzene (TBIB)

Figure 21:
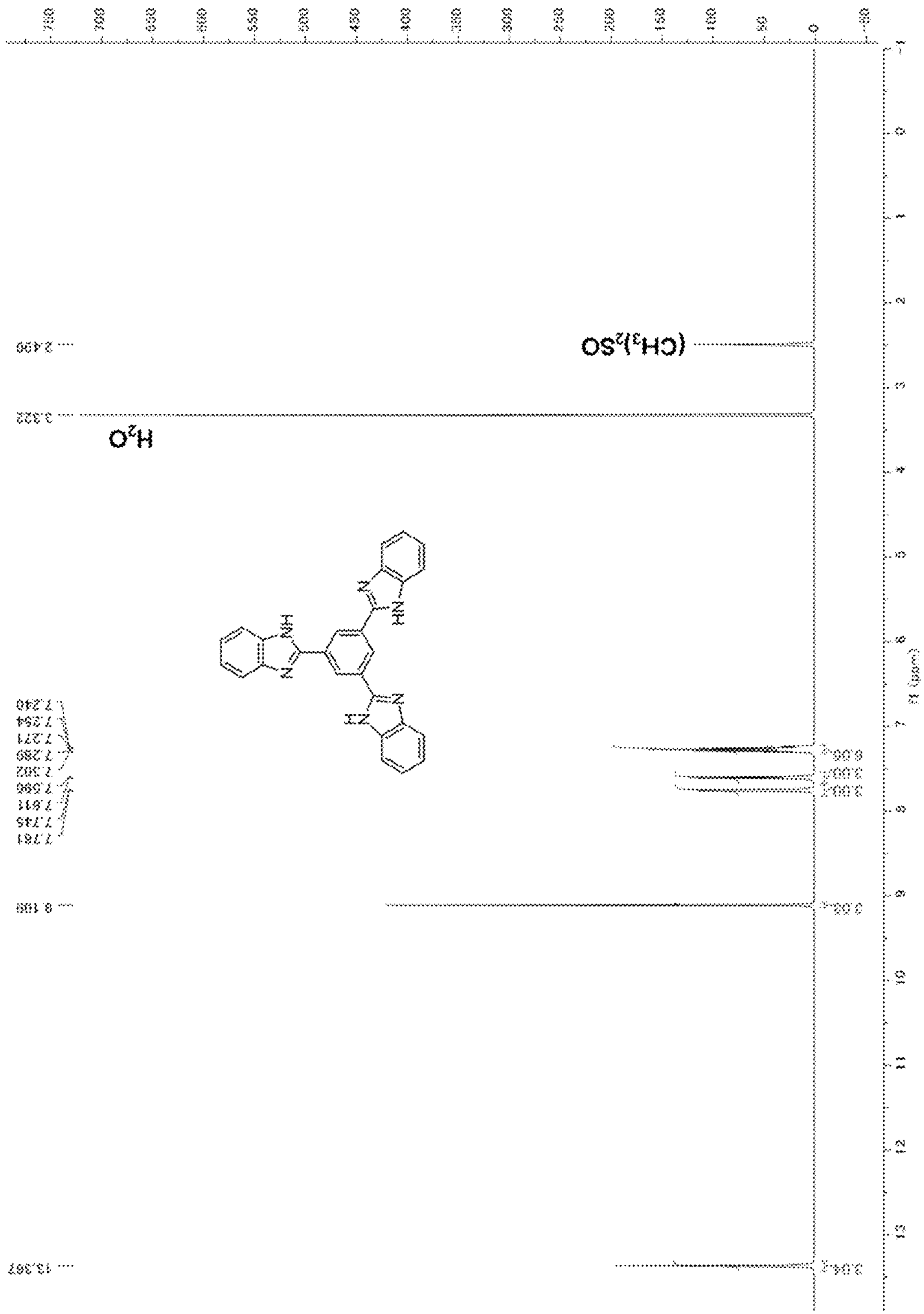
FIG. 21 is a $^1H$ NMR spectrum of 1,3,5-tris(1H-benzo[d]imidazol-2-yl)benzene in $(CD_3)_2SO$.
Figure 22:
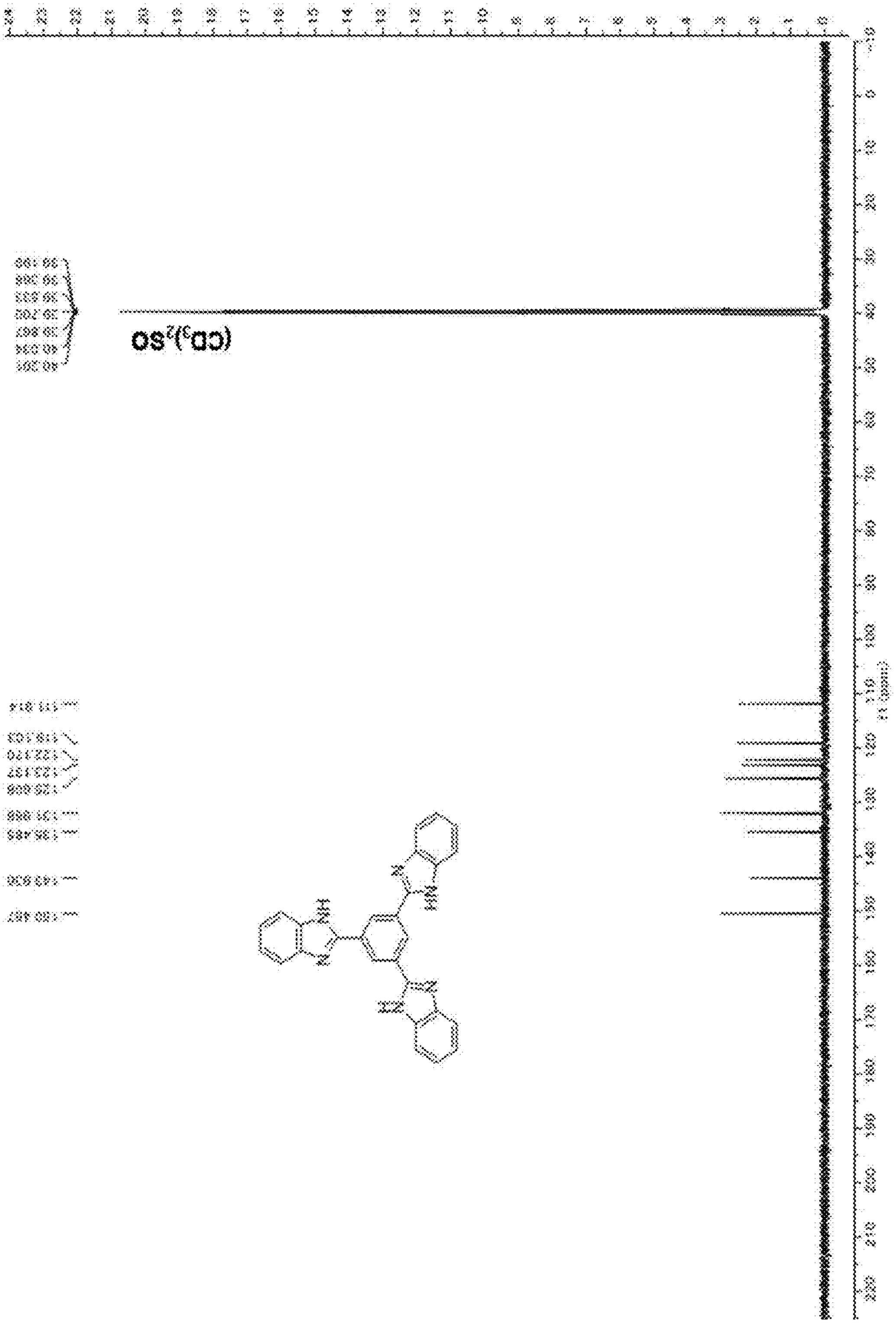
FIG. 22 is a $^{13}C$ NMR spectrum of 1,3,5-tris(1H-benzo[d]imidazol-2-yl)benzene in $(CD_3)_2SO$.

TBIB was synthesized using a single-step reaction adopted from literature.[28] The product was purified twice by sublimation prior to use. NMR spectra (FIGS. 21 and 22) were obtained by using an Agilent DD2 500 MHz NMR spectrometer using deuterated chloroform ($CDCl_3$), deuterated dimethyl sulfoxide ($(CD_3)_2SO$) or deuterated methanol ($CD_3OD$) as solvents. Chemical shifts (8) are reported in parts per million (ppm) relative to the singlet at 0.00 ppm of tetramethylsilane as the internal reference or the peaks at 2.49 ppm of $(CH_3)_2SO$ for 1H and 39.7 ppm of $(CD_3)_2SO$ for $^{13}C$.

Preparation of the TBIB/(CLA)$_3$ Complex

CLA and TBIB with a molar ratio of 3:1, respectively, were dissolved in chloroform. A small amount of methanol (~5 wt %) was then added to the solution to assist dissolution of TBIB and formation of the supramolecular complex. The resulting solution was then allowed to stand for 30 min under ambient conditions before solvent evaporation at room temperature under nitrogen atmosphere. The obtained supramolecular discotic complex, TBIB/(CLA)$_3$, was then dried in vacuum overnight.

Figure 23:
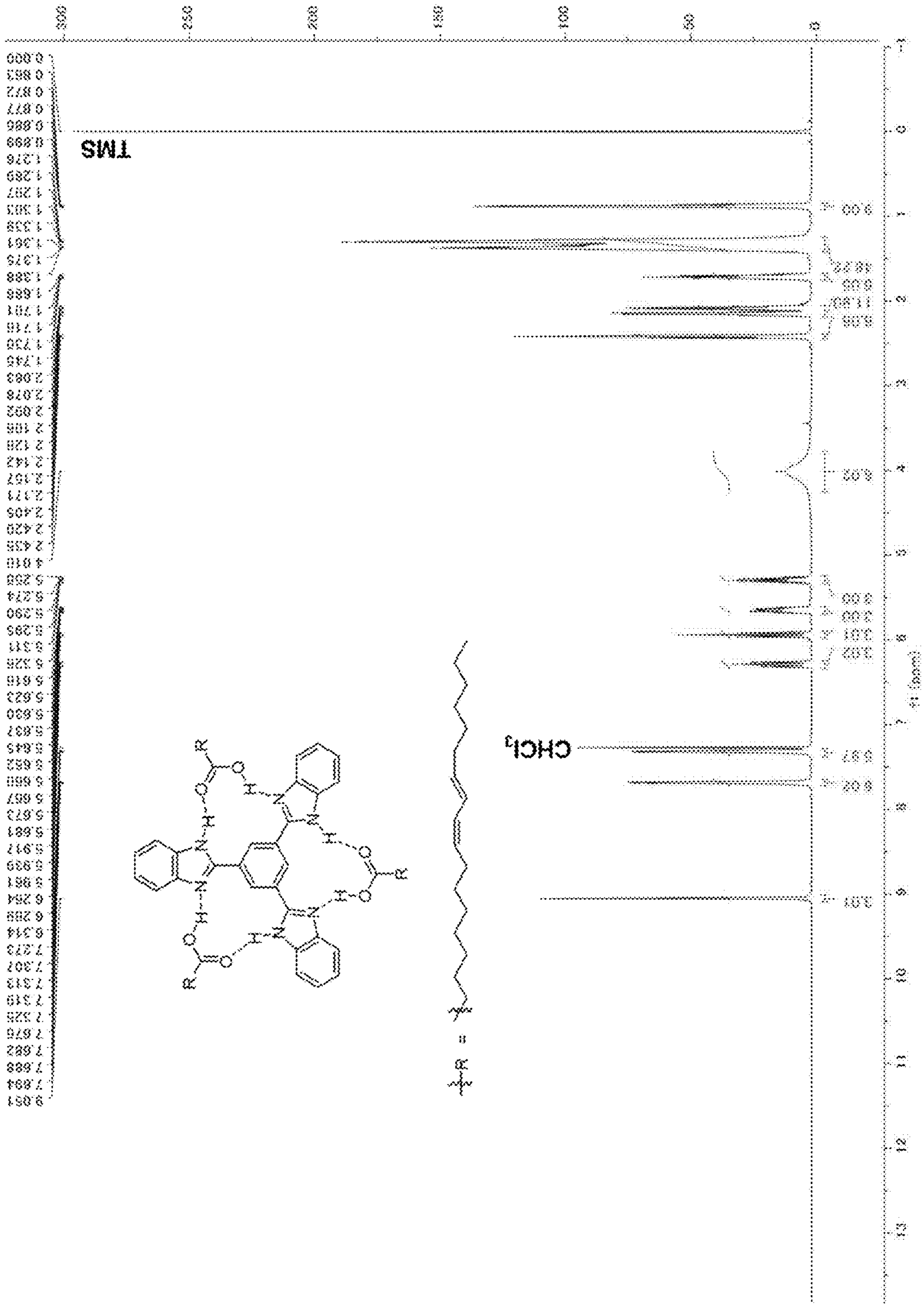
FIG. 23 is a $^1H$ NMR spectrum of the TBIB$(CLA)_3$ supramolecular complex in $CDCl_3/CD_3OD$ (99:1).
Figure 24:
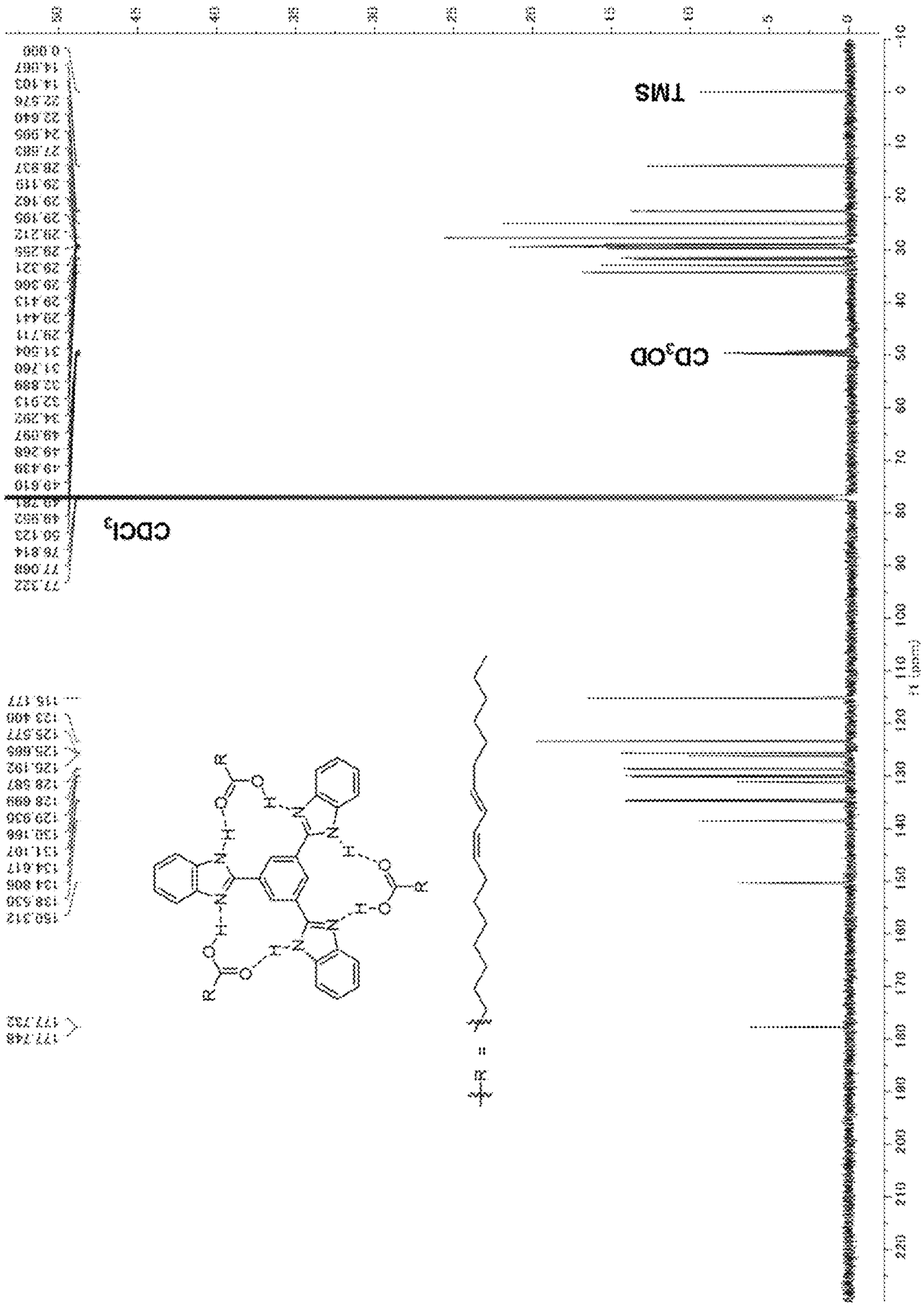
FIG. 24 is a $^{13}C$ NMR spectrum of the TBIB$(CLA)_3$ supramolecular complex in $CDCl_3/CD_3OD$ (99:1).

NMR spectra of the TBIB/(CLA)$_3$ complex are displayed in FIGS. 23 and 24. $^1H$ NMR ($CDCl_3/CD_3OD$ (99:1), 500 MHz): § (ppm) 9.05 (s, 3H), 7.69 (m, 6H), 7.32 (m, 6H), 6.29 (t, 3H, J=12.5 Hz), 5.94 (t, 3H, J=11.0 Hz), 5.65 (m, 3H), 5.29 (t, 3H), 4.01 (s, 6H), 2.42 (t, 6H, J=7.5 Hz), 2.17-2.06 (m, 12H), 1.72 (quintet, 6H, J=7.5 Hz), 1.39-1.28 (m, 48H), 0.90-0.86 (m, 9H). $^{13}C$ NMR ($CDCl_3$, 125 MHz): § (ppm) 177.75, 177.73, 150.31, 138.53, 134.81, 134.62, 131.11, 130.17, 129.93, 128.70, 128.59, 126.19, 125.67, 125.58, 123.40, 115.18, 34.29, 32.91, 32.89, 31.76, 31.50, 29.71, 29.44, 29.41, 29.37, 29.32, 29.26, 29.21, 29.20, 29.16, 29.12, 28.94, 27.68, 25.00, 22.64, 22.58, 14.10, 14.07.

Preparation of Mesophases Containing TBIB/(CLA)$_3$ and Cross-Linker

Homogeneous mesophases were prepared by addition of various quantities of acrylate or vinyl co-monomers to the supramolecular discotic TBIB/(CLA)$_3$ complex. The co-monomers aided crosslinking and also served as a means to modify the phase behavior of the system. A mixture of butyl acrylate (BA) and 1,6-hexanediol diacrylate (HDA) with a fixed weight ratio of 4:1 was chosen for forming acrylate co-monomer-containing mesophases, and divinylbenzene (DVB) for vinyl co-monomer-containing mesophases. To ensure homogenous mixing, after the addition of a desired amount of co-monomer/cross-linker the mesophases were vortexed and centrifuged for a minimum of 10 cycles.

Mesophase Polymerization/Cross-Linking

Mesophases containing a small amount of radical photo-initiator (~1 wt %) 2-methoxy-2 phenylacetophenone were polymerized by exposure to 365 nm UV light using a focused spot UV beam (100 Watt Sunspot SM Spot Curing System at a distance of ~2 cm) for 1 h followed by a benchtop lamp (8 Watt UVL-18 EL lamp at a distance of ~2 cm) for 24 h.

Removal of TBIB Template Molecules

Polymerized mesophase samples were immersed into a DMSO solution of NaOH (0.1 wt %) for 24 hours at room temperature (~21° C.). The polymer samples were then rinsed with de-ionized water to eliminate any residual NaOH/DMSO solution.

Differential Scanning Calorimetry (DSC)

DSC measurements were performed using a Q200 DSC (TA Instruments) with a heating/cooling rate of 10/min.

Polarizing Optical Microscopy (POM)

A Zeiss Axiovert 200 M inverted microscope was employed to obtain POM images.

Transmission Electron Microscopy (TEM).

Polymer films obtained after polymerization were embedded in epoxy, which was then cured at 60° C. overnight to ensure enough rigidity for microtoming. Epoxy blocks containing samples were sectioned at room temperature by a diamond knife mounted on a Leica EM UC7 ultramicrotome. The thickness of thin sections was controlled to be around 60 nm. To improve the contrast, the thin sections were stained by vapor of a 0.5% aqueous solution of $RuO_4$ for 10 min. An FEI Tecnai Osiris TEM was employed to visualize the sample at an accelerating voltage of 200 kV.

X-Ray Scattering.

X-ray scattering measurements on mesophases and polymerized/cross-linked polymer films were performed using a Rigaku 007 HF+ instrument equipped with a rotating anode Cu Kα X-ray source (λ=1.542 Å) and a 2-D Saturn 994+CCD detector. A silver behenate standard (d-spacing of 58.38 Å) was employed for the calibrations of the resultant 2-D SAXS data. All the 2-D scattering patterns were integrated into 1-D plots of scattering intensity (I) versus q, where $q=4\pi \sin(\theta)/\lambda$ and the scattering angle is 2θ.

UV-Vis Spectroscopy.

UV-Vis spectra were recorded in transmission mode using a dual beam configuration on a Cary 300 spectrometer.

Fourier Transform Infrared (FT-IR) Spectroscopy

FT-IR spectra of the samples were measured using FTIR/Raman Thermo Nicolet 6700 in the attenuated total reflection (ATR) method.

Alignment of $Col_h$ Mesophases: Surface Alignment

Surface alignment of the mesophases was achieved by sandwiching their thin films (ca. 15 μm thick) with two surface-modified glass slides of a thickness of 100 μm. The glass slides were cleaned by a piranha solution and UV-ozone for 20 min (UV Ozone Cleaner—ProCleaner, Bioforce Nanosciene) before further chemical treatment. The surfaces of the cleaned glass slides were then modified by either spin coating a thin layer of polyelectrolyte for face-on (homeotropic) anchoring or silanization for edge-on (planar) anchoring, respectively. The spin-coating was carried out with a 1 wt % aqueous solution of PSS [poly(sodium 4-styrenesulfonate), Mw ~70,000] and a spin-speed of 3000 rpm for 1 min. For silanization, the cleaned glass slides were placed inside a container with a 15 μl drop of octadecyltrimethoxysilane (OTMS) on an aluminum foil. The container was heated to 100° C. to evaporate OTMS, and the glass slides were exposed to silane vapor for 3 h. After removed from the chamber, the glass slides were rinsed by isopropanol and dried by nitrogen prior to use.

Alignment of $Col_h$ Mesophases: Magnetic Field Alignment

A magnetic field with a field strength of 6 T provided by a superconducting magnet (American Magnetics, Inc.) was utilized to align the mesophases containing acrylates or DVB in films with a thickness above 5 μm that were not able to align uniformly through the whole thickness by surface effects. Vertical orientation of the supramolecular columns was achieved by continuous rotation of the mesophase film sandwiched by PSS coated glass slides about the normal of the film that was positioned perpendicular to the magnetic field direction. Under continuous rotation, the sample was heated to the isotropic phase, followed by slow cooling back to room temperature with a cooling rate of 0.2° C./min.

Dye Adsorption

Three water soluble dyes including cationic methylene blue (MB) and Rhodamine 6G (R6G) and anionic methyl orange (MO) were chosen for testing. For in situ UV-vis spectroscopy, the weight factions of MB, R6G and MO in water solutions (2.8 g) were $3.6\times10^{-6}$, $9\times10^{-6}$, and $12\times10^{-6}$, respectively, which corresponded to a relative absorbance of approximately 1. Experiments were performed using deionized, neutral pH water. For the demonstration of selective adsorption of dye molecules through visualizing color changes of water solutions containing two dyes by eyes, the weight faction of MB, R6G and MO in MB/R6G and MB/MO solutions (2.8 g) was fixed to $5\times10^{-5}$. For both UV-vis spectroscopy and eye visualization, 2 mg polymer films possessing aligned nanopores with a thickness of 15 μm were added into the dye solutions.

Calculation of Pore Dimensions and Functional Group Areal Density

For TBIB/(CLA)$_3$, the weight fraction of TBIB is 0.34 (MW of TBIB is 426 g/mol and MW of CLA is 280 g/mol). In a binary system the volume fraction of a species $\phi_1$ is related to its mass fraction $f_1$ as $\phi_1=f_1/[f_1+(1-f_1)\alpha]$ where $\alpha=\rho_1/\rho_2$ is the ratio of the mass densities of the two species. While the exact densities of CLA and TBIB in the mesophase are not known, the ratio of their densities can reasonably be bracketed between 1.4 and 2.2 based on mass densities of CLA relative to analogous aromatic species in disordered liquids (low) and π-π stacked ordered mesophases (high). On this basis, the TBIB volume fraction is between 0.19 and 0.27 and correspondingly the column diameter in the mesophase can be estimated using Equation 1 to be between 1.19 and 1.42 nm. This calculation assumes effectively circular cross-sections and that there is a sharp boundary between TBIB and the CLA matrix. While these assumptions are not quantitatively correct, the calculation provides a useful estimate for the effective size of the columns.

$$D = d\left[\varphi\frac{8}{\sqrt{3}\pi}\right]^{1/2} \tag{1}$$

Pore Dimensions, Specific Surface Area and Functional Group Density in Comonomer Containing Samples:

In the presence of 20 wt. % co-monomer, the TBIB volume fraction lies between 0.152 and 0.216. For the DVB system with a d-spacing of 2.69 nm, the corresponding cylinder diameter lies between 1.27 and 1.52 nm. For the acrylate containing system, with a d-spacing of 2.52 nm, the cylinder diameters lie between 1.18 and 1.41 nm.

The specific surface area $S_v$ (area per mass of non-porous material) is given by Equation 2 below where E, porosity, is TBIB volume fraction.

$$S_v = \frac{4\varepsilon}{D\rho(1-\varepsilon)} \tag{2}$$

For the DVB containing sample (used in adsorption experiments), $S_v$ varies from a minimum of 4×0.152/(1.52E-9 m×1000 kg·m$^{-3}$×1000 g·kg$^{-1}$×0.848) to a maximum of 4×0.216/(1.27E-9×1000 kg·m$^{-3}$×1000 g·kg$^{-1}$×0.784), i.e. 470 to 870 m$^2$·g$^{-1}$, where a density of 1000 kg·m$^{-3}$ is assumed for the polymeric matrix (liquid monomer densities are 900 and 914 kg·m$^{-3}$ for CLA and DVB respectively).

For the acrylate containing sample, the specific surface area ranges from 4×0.152/(1.41E-9 m×1000 kg·m$^{-3}$×1000 g·kg$^{-1}$×0.848) to 4×0.216/(1.18E-9×1000 kg·m$^{-3}$×1000 g·kg$^{-1}$×0.784), i.e. 510 to 930 m$^2$·g$^{-1}$, where a density of 1000 kg·m$^{-3}$ is assumed for the polymeric matrix (liquid monomer densities are 900 and 911 kg·m$^{-3}$ for CLA and acrylate mixture (890 and 1010 kg·m$^{-3}$ for BA and HDA respectively, present at 4:1 mass ratio).

The number of functional groups per unit area is calculated by mass balance based on the distance a between pores as shown in Equation 3 below where φ is the volume fraction of CLA in the system and M is the molar mass of CLA. Alternatively, the same expression can be used for the volume fraction of CLA+comonomer, but the relevant molar mass is now $M_{CLA}+(f_{CLA}/f_{co})M_{co}$ where f is the weight fraction of the species.

$$\sigma = \frac{a\varphi N_A\rho}{M} \tag{3}$$

For the DVB system, σ varies between 3.9 and 4.2 nm$^{-2}$.

For the acrylate system, σ varies between 3.6 and 3.9 nm$^{-2}$.

The results of the experiments are now described.

A core-templated strategy for the synthesis of vertically aligned nanopores in polymer films is realized here using 1,3,5-tris(1H-benzo[d]imidazol-2-yl)benzene (TBIB) as the templating core species and conjugated linoleic acid (CLA) as the renewable monomer. There are two key features. The carboxylic acid headgroup of CLA can form hydrogen bonds with the basic benzoimidazole ring on TBIB to yield a supramolecular discotic complex composed of one TBIB and three CLA molecules (i.e. TBIB/(CLA)$_3$) that then undergoes LC self-assembly. Additionally, the use of a conjugated form of linoleic acid aids free-radical initiated crosslinking as the reactivity of conjugate dienes is significantly higher than their non-conjugated counterparts. The TBIB/(CLA)$_3$ self-assembles into a thermotropic Col$_h$ mesophase that can be vertically aligned with high fidelity using a simple surface-confinement method. This alignment method can be optionally coupled with magnetic fields if desired. Cross-linking of the aligned TBIB/(CLA)$_3$ mesophase followed by chemical removal of TBIB results in thin films with vertically aligned nanopores of ~1.0-1.5 nm diameter. These polymer films display sharp selectivity for molecular solutes with different sizes and charges, as demonstrated by the size and charge selective adsorption of model penetrant molecules in aqueous solutions.

Figure 14:
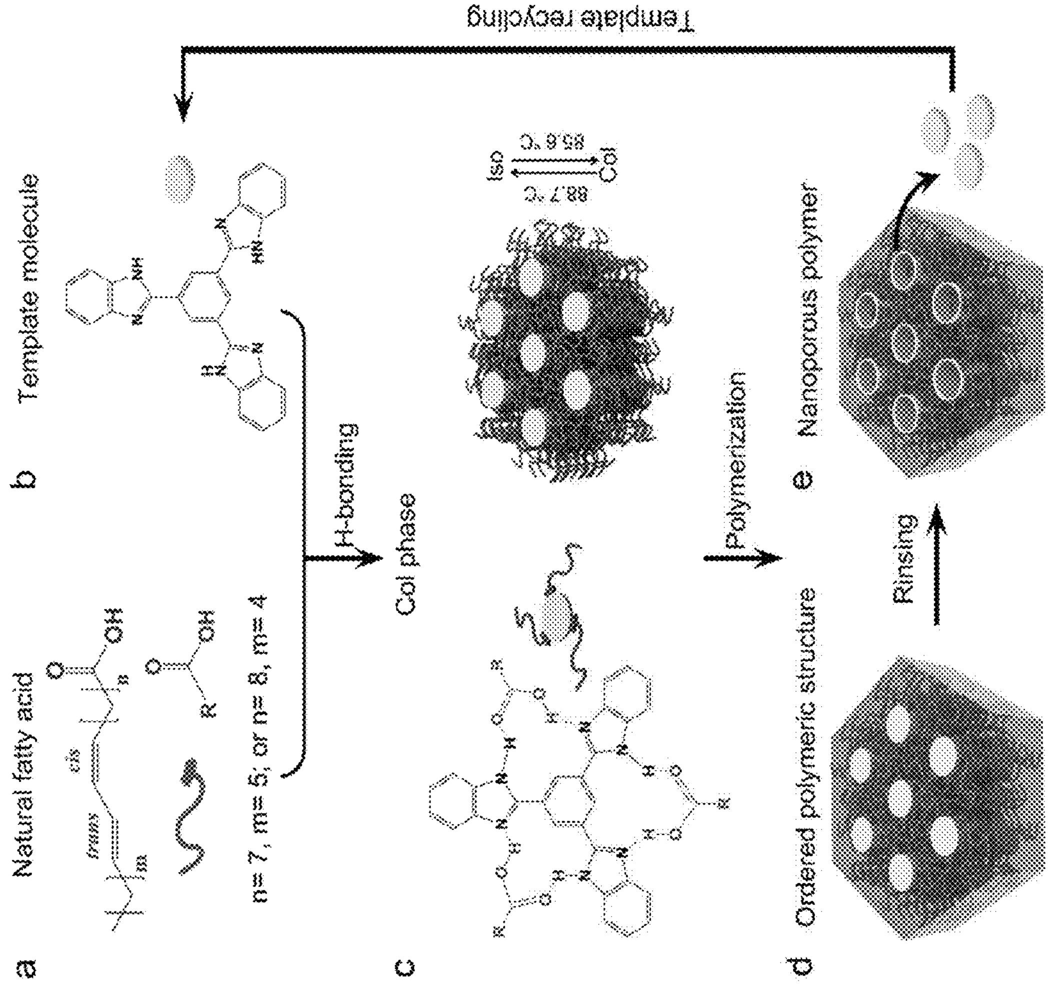
FIG. 14, comprised of FIGS. 14A-14E, is a schematic illustration of the templated synthesis of ordered nanostructured polymers and nanoporous polymers from renewable natural fatty acids.
Figure 15:
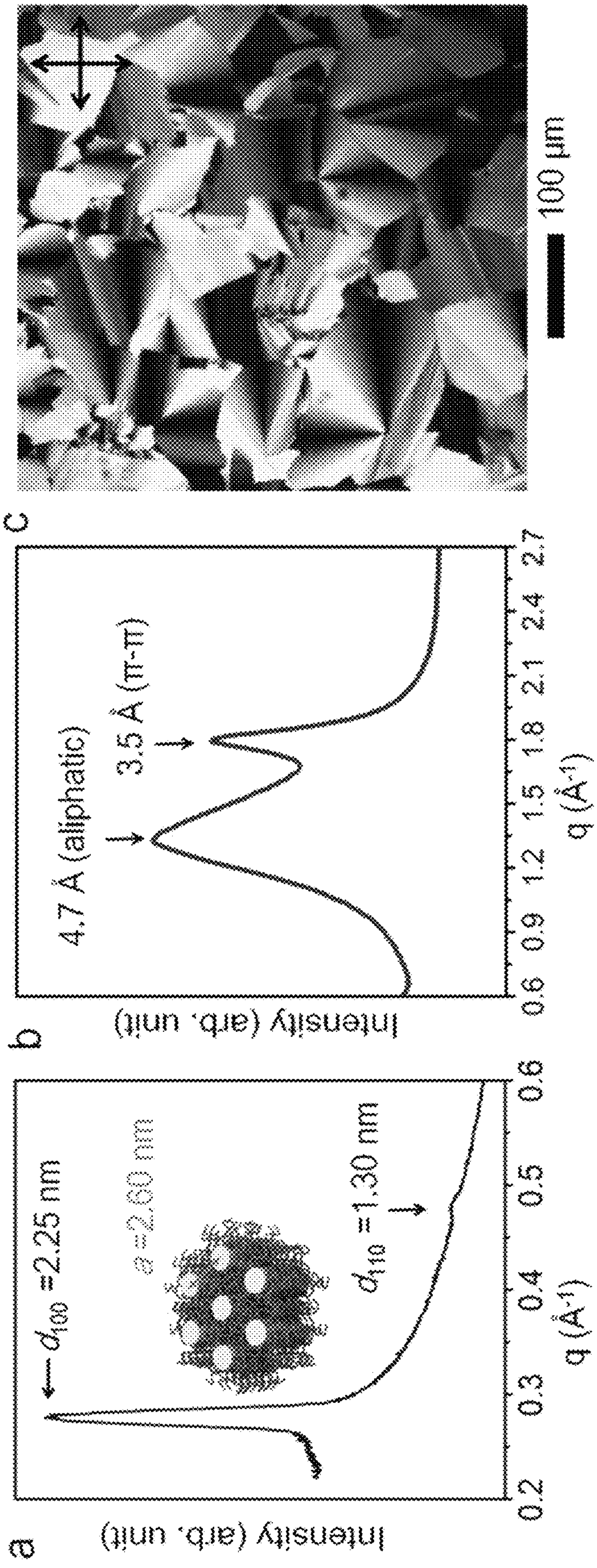
FIG. 15, comprised of FIGS. 15A-15C, depicts the characteristics of the supramolecular mesophase formed by $TBIB/(CLA)_3$.
Figure 25:
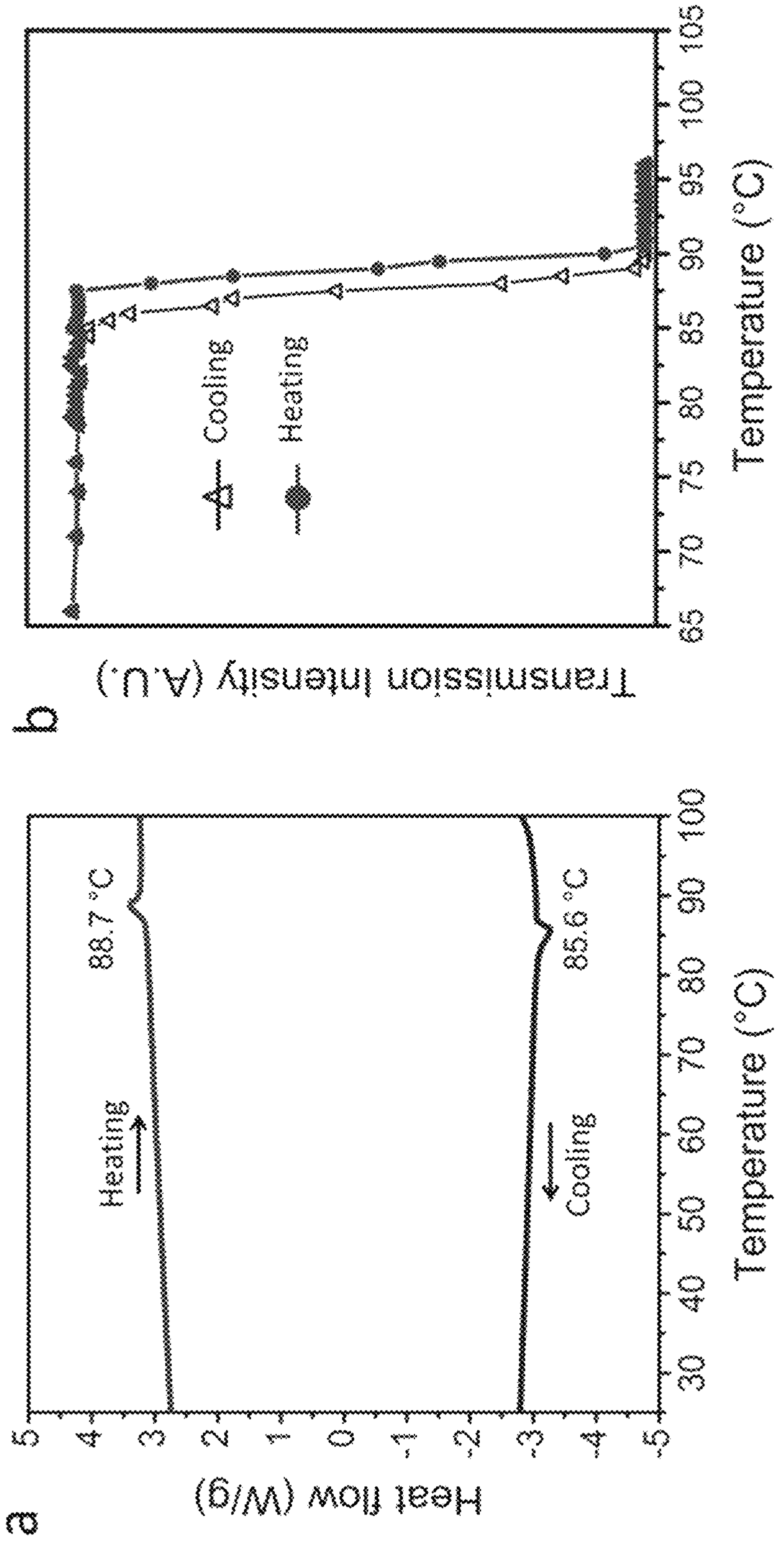
FIG. 25, comprised of FIGS. 25A and 25B, is a characterization of the isotropic-columnar phase transition of TBIB $(CLA)_3$.

The $C_3$ symmetric TBIB/(CLA)$_3$ complex (FIG. 14C) displays a Col$_h$ mesophase at room temperature. The formation of such thermotropic LC mesophases in systems with rigid aromatic cores and flexible aliphatic peripheries is documented in literature.[28-33] The supramolecular mesophase exhibited a transition to an isotropic state (Col$_h$-Iso) at 88.7° C. on heating and at 85.6° C. upon cooling, as determined by differential scanning calorimetry (DSC) and POM (FIG. 25). The hexagonal Col$_h$ morphology of the TBIB/$(CLA)_3$ system at room temperature was confirmed by 1-D small angle X-ray scattering (SAXS) data that shows the Bragg spacing $d_{100}$ of 2.25 nm and duo of 1.30 nm, as well as the characteristic diffraction peak location ratio of 1:√3 (FIG. 15A). The inter-columnar distance a is 2.6 nm, as calculated by $a=2d_{110}$. The 1-D wide angle X-ray scattering (WAXS) data shows evidence of T-T stacking interactions between the template TBIB molecules with a periodicity of 3.5 Å, and liquid-like packing of the aliphatic chains at 4.7 Å (FIG. 15B). The system displays the typical fan-like optical texture of $Col_h$ mesophases in POM (FIG. 15C). The diameter, D, and volume fraction, φ, of columns in the system are related to the d-spacing for hexagonal packing as shown in Equation 1. For TBIB/$(CLA)_3$, the weight fraction of TBIB is 0.34. The column diameter in the mesophase is estimated to be between 1.19 and 1.42 nm, based on estimates for the volume fraction of packed CLA in the system using the relevant mass densities of CLA and TBIB domains.

$$D = d\left[\varphi\frac{8}{\sqrt{3}\pi}\right]^{1/2} \quad (1)$$

Figure 26:
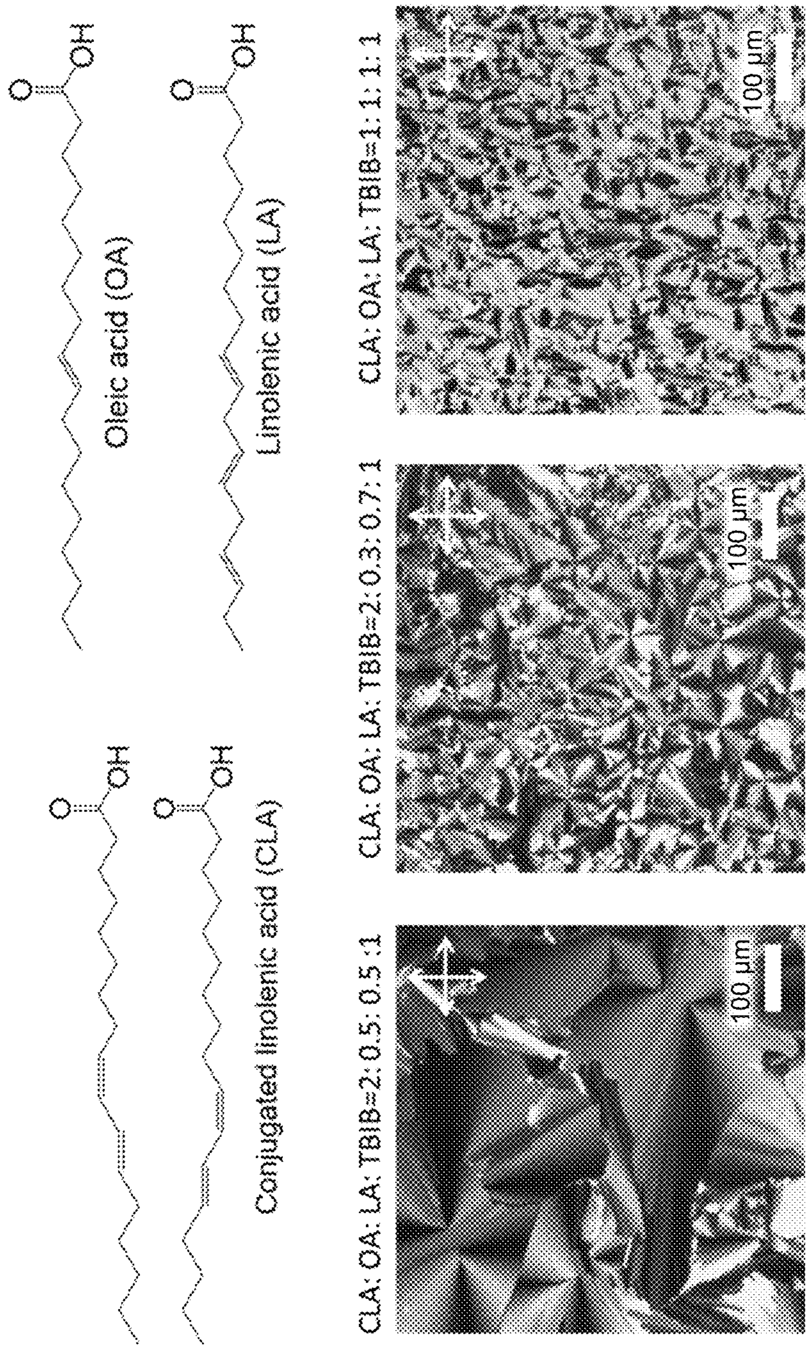
FIG. 26 depicts the POM images of fatty acid-TBIB complexes with mixtures of CLA, OA and LA, as well as the molecular structures of the fatty acids. The molar ratios are indicated in the figure.

CLA derived from plant oils is composed of an ill-specified mixture of various C18 fatty acids. The LC formation behavior of TBIB with single component C18 fatty acids such as linolenic acid and oleic acid, as well as their mixtures, was investigated to determine whether mesophase formation was sensitive to the feedstock composition. Stable $Col_h$ mesophases can also be formed at the 3:1 molar ratio of fatty acid to TBIB for both of these species and mixtures thereof (FIG. 26).

Figure 27:
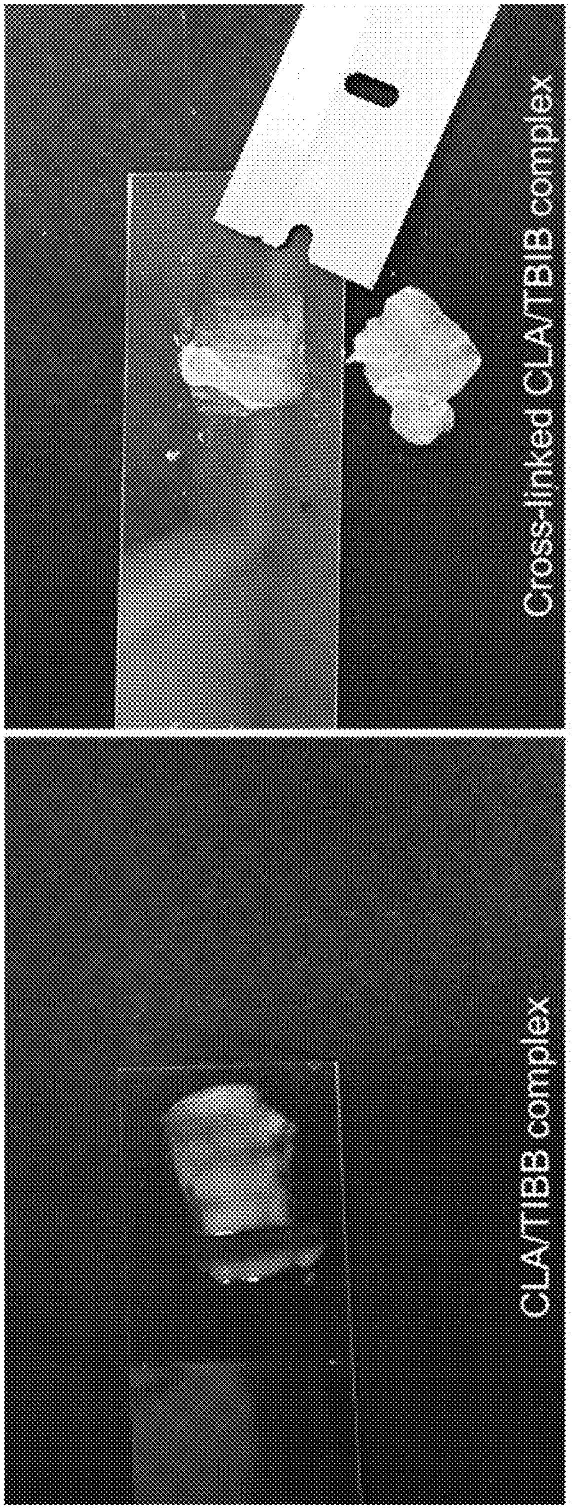
FIG. 27 shows the liquid crystalline neat TBIB/$(CLA)_3$ complex and polymer obtained by oxidative crosslinking after exposure to air for 3 weeks.

Drying oils contain mixtures of unsaturated fatty acids and are used to create tough thin coatings or varnishes upon exposure to air. The 'drying' or hardening of the material is due to oxygen-induced oxidative crosslinking of the fatty acids rather than any evaporation of volatile species. Likewise, exposure of the TBIB/$(CLA)_3$ $Col_h$ mesophase to air under ambient conditions resulted in the formation of a dense crosslinked sample from an initially gel-like LC (FIG. 27). Full densification of the sample required in excess of 3 weeks of air exposure however, which is an impractically long period of time for the present purposes. The slow kinetics are likely due to the creation of a densely cross-linked skin layer that limits the diffusion of oxygen into the bulk of the material. The slow crosslinking kinetics and the need to ensure oxygen transport into the film impose practical constraints on the approaches that can be used to control the alignment of the mesophase. Photo-initiated radical crosslinking was therefore investigated as an alternative.

Figure 28:
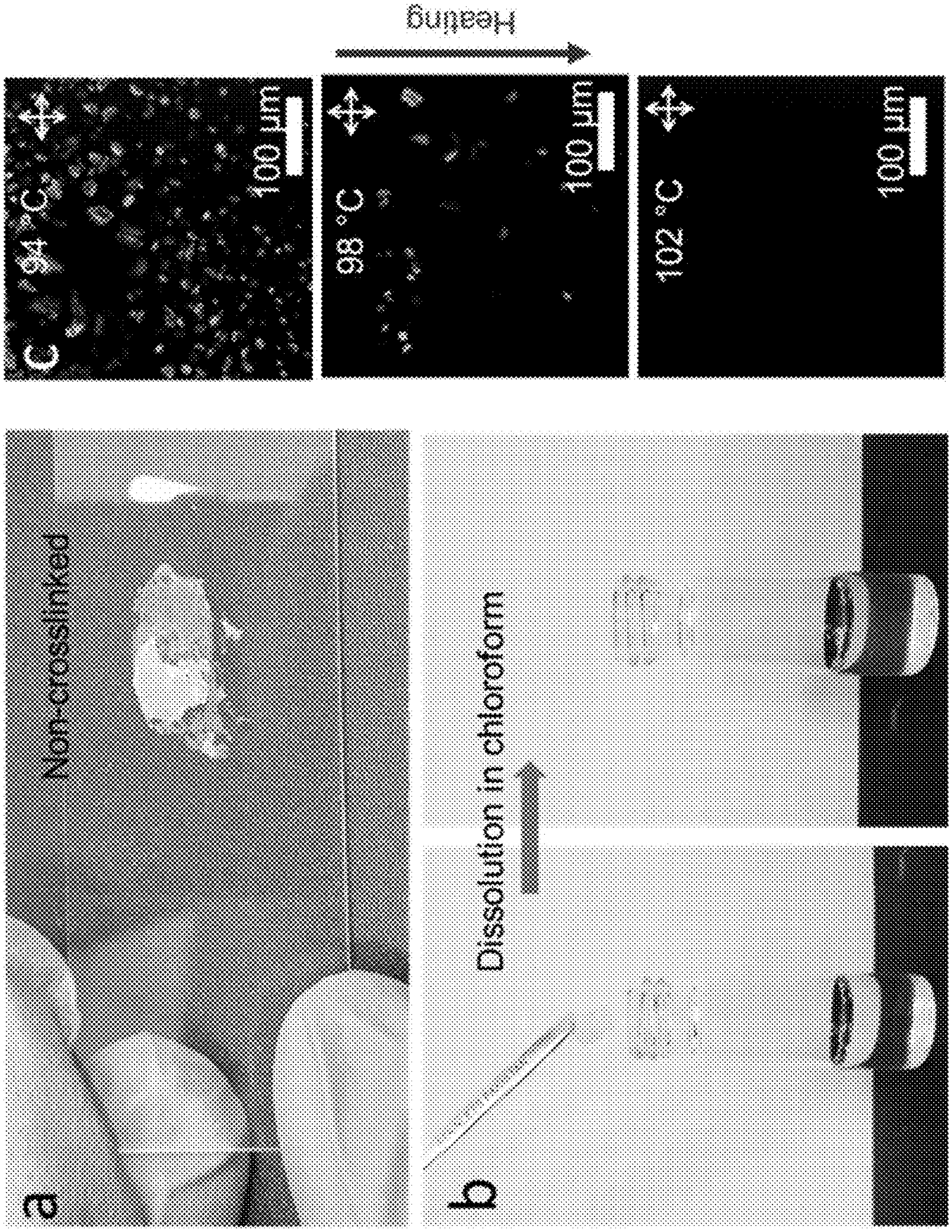
FIG. 28, comprised of FIGS. 28A-28C, depicts the polymer resulting from the TBIB/$(CLA)_3$ system containing 1 wt. % 2-methoxy-2-phenylacetophenone photo-initiator and no cross-linker.

Photo-initiated free radical polymerization and crosslinking have been employed effectively to lock in the structure of polymerizable LC assemblies (Gin, et al., 2006, Adv. Funct. Mater. 16:865; Yoshio, et al., 2006, J. Am. Chem. Soc., 128:5570.). CLA is amenable to polymerization and cross-linking using a range of chemistries including diene metathesis by Grubbs catalysts, controlled radical polymerizations and thiol-ene click chemistry (de Espinosa and Meier, 2011, Eur. Polym. J. 47:837; Yao and Tang, 2013, Macromolecules, 46:1689) A simple UV-initiated free-radical polymerization route was pursued in this example. This reaction necessitated the use of a more reactive co-monomer to crosslink the system due to the limited free-radical reactivity of CLA (FIG. 28). DVB and a BA/HDA mixture were selected as co-monomer systems based on the prior success of these systems for the copolymerization of vegetable oils (triglycerides) and their derivative fatty acids with acrylate and styrene monomers (Xia and Larock, 2010, Green Chem. 12:1893; Roberge and Dubé, 2016, ACS Sust. Chem. Eng., 4:264).

Figure 29:
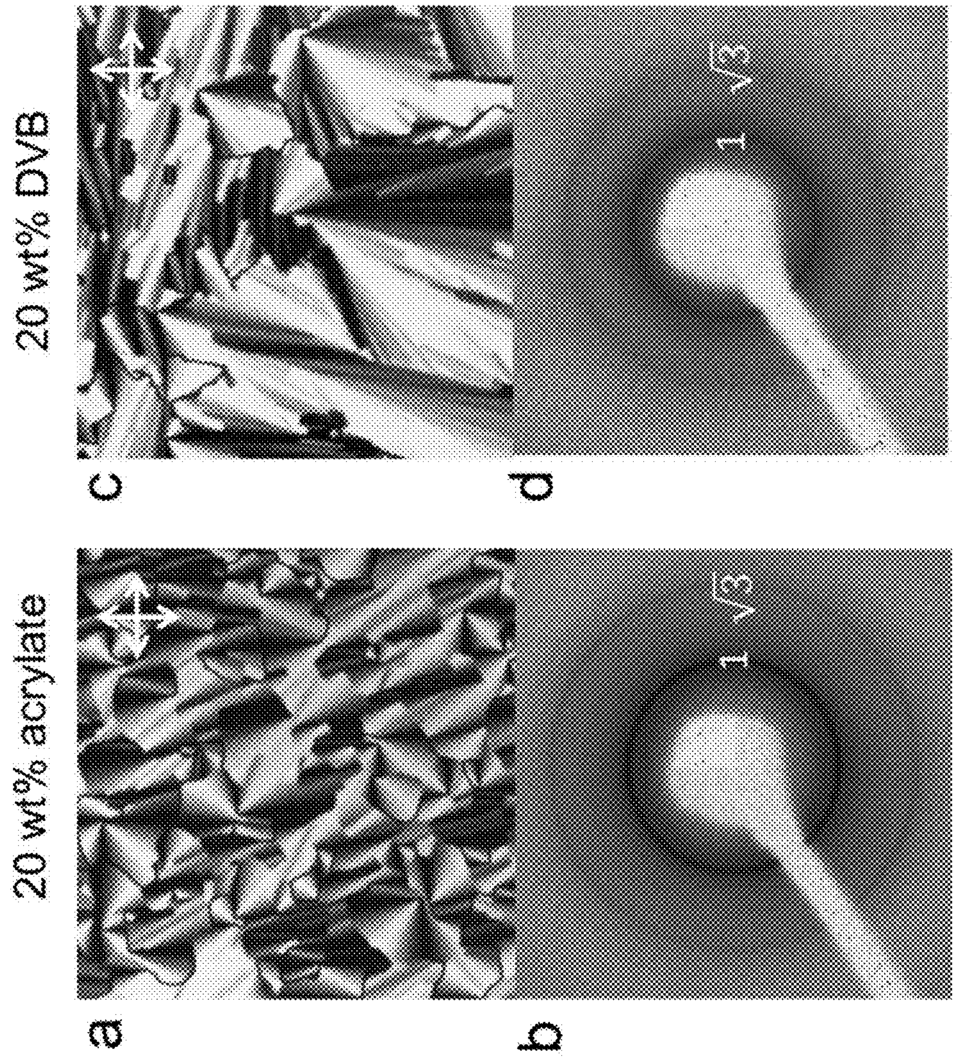
FIG. 29, comprised of FIGS. 29A-29D, depict mesophases with acrylate or DVB prior to polymerization.
Figure 30:
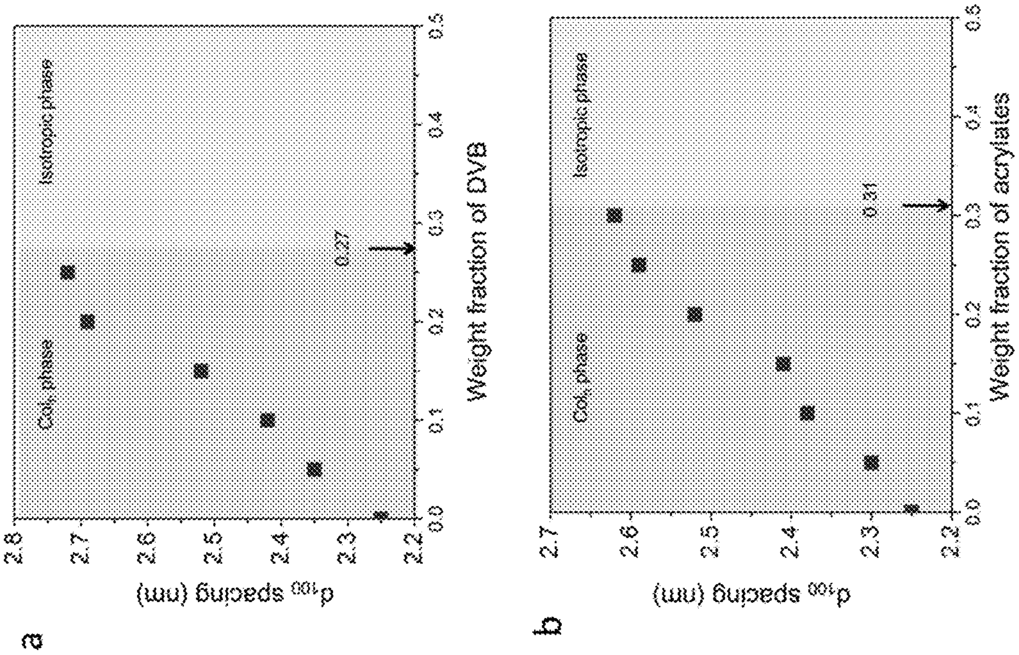
FIG. 30, comprised of FIGS. 30A and 30B, are plots of the phase diagrams and $d_{100}$ spacing of the columnar mesophase of the supramolecular complex mixed with the crosslinkers.

Stable, homogeneous $Col_h$ mesophases with addition of small quantities of either a mixture of BA and HDA, or DVB, were formed (FIGS. 29 and 30). Increasing the co-monomer content resulted in increased d-spacings, for both the acrylate mixture and DVB (FIG. 30). The miscibility of the co-monomers with CLA and immiscibility with TBIB indicate that the increased d-spacing is most likely due to swelling of the CLA surrounding the TBIB cores. Eventually the system formed an isotropic phase at room temperature for co-monomer weight fractions in excess of 0.31 and 0.27 for the BA/HDA and DVB co-monomers, respectively (FIG. 30).

Figure 16:
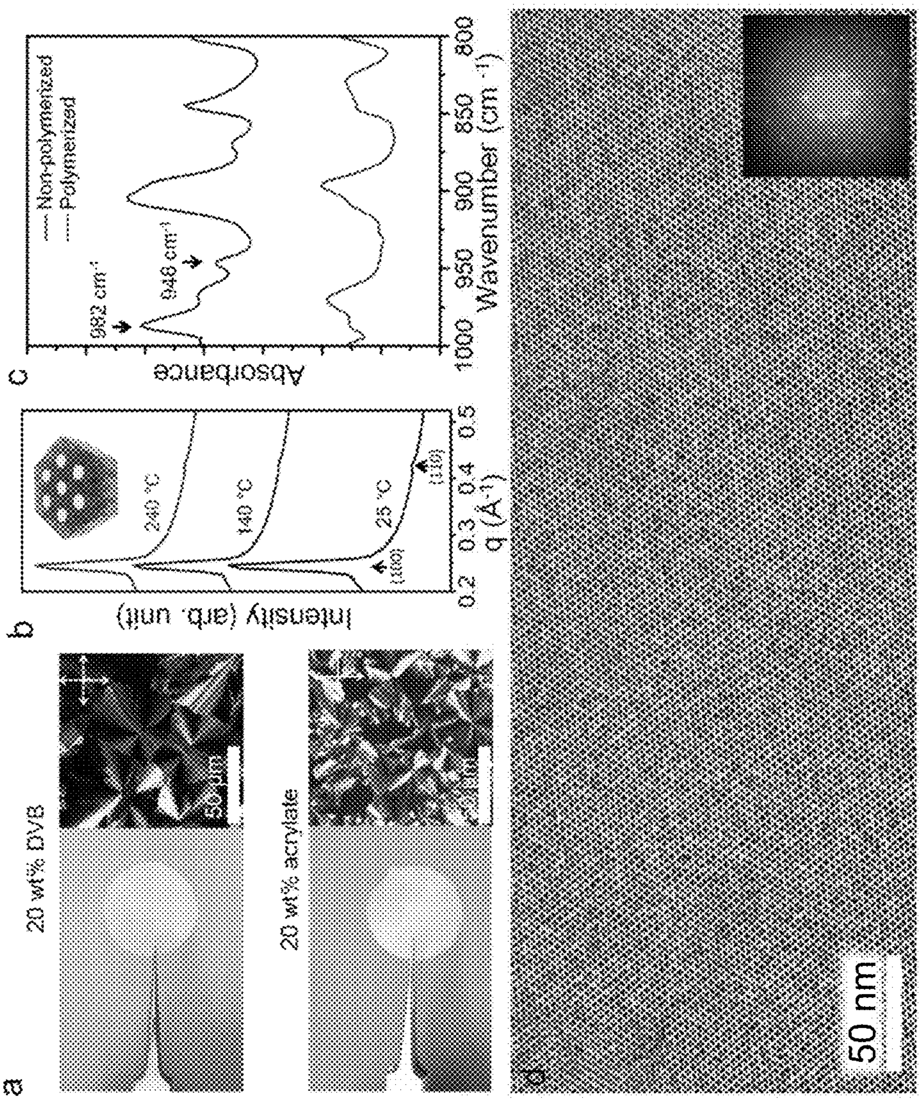
FIG. 16, comprised of FIGS. 16A-16D, depicts the characteristics of the rigid films following polymerization in the presence of 20% divinylbenzene (DVB) or 20% butylacrylate/1,6-hexanedioldiacrylate.
Figure 31:
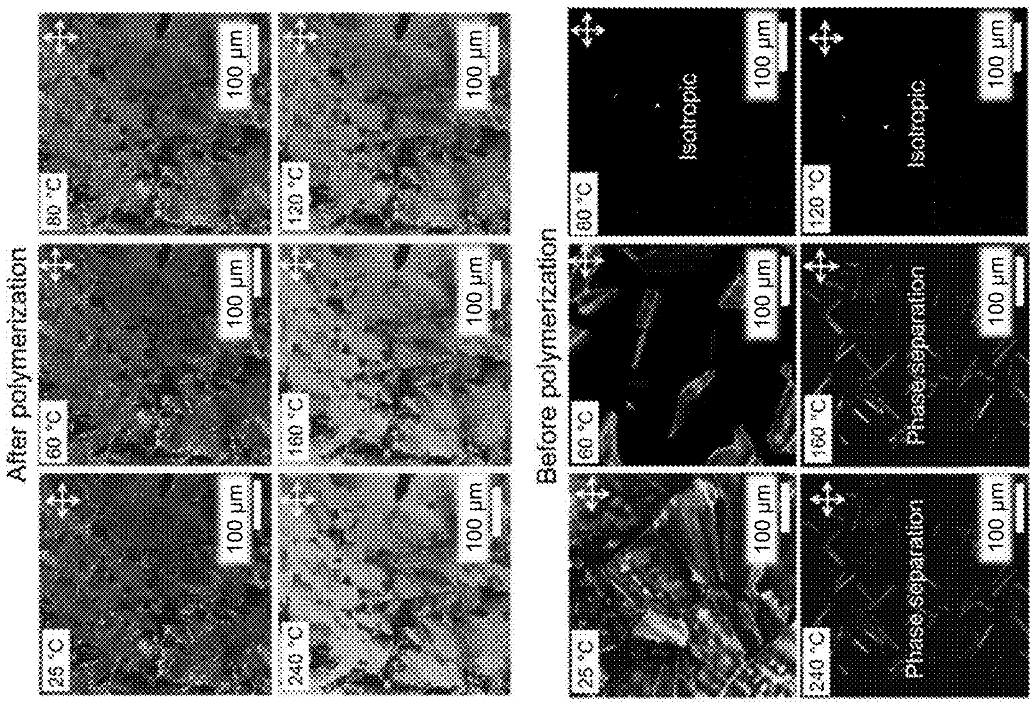
FIG. 31 shows temperature-dependent POM images of mesophase thin films before and after polymerization with 20 wt % DVB.

Co-monomer containing mesophases of TBIB/$(CLA)_3$ with added photo-initiator were photo-polymerized by exposure to 365 nm UV light at room temperature for 24 h, resulting in the formation of rigid polymer films (FIG. 16A). Two samples containing 20 wt % acrylates (BA/HDA mixture) or DVB were systematically characterized. The polymer films retained the fan-like optical textures of the $Col_h$ mesophase after photo-polymerization as observed by POM, indicating that the LC assemblies remained stable during polymerization and did not undergo any polymerization-induced phase separation. 1-D SAXS data showing characteristic diffraction peak location ratio of 1:√3 indicates the retention of the $Col_h$ morphology after polymerization. The thermal stability of the cross-linked mesophase was confirmed by temperature-dependent SAXS and POM measurements. SAXS measurements on the cross-linked sample upon heating display stable characteristic 1-D diffraction peaks of hexagonal morphologies up to 240° C. (FIG. 16B). POM micrographs show that the pattern of the LC texture was effectively invariant upon heating for the crosslinked sample, with only a slight and gradual alteration of the birefringent color, possibly due to the thermal disordering of the stacked TBIB molecules, or simple temperature induced change of the optical density of the sample (FIG. 31). In contrast, the non-polymerized counterpart underwent an expected isotropic transition and then a sudden phase separation at elevated temperatures induced by the dissociation of the hydrogen bonds between CLA and TBIB and the crystallization of TBIB.

The participation of the CLAs in the copolymerization was verified by FT-IR analysis of thin films of the $Col_h$ mesophases before and after polymerization. FIG. 16C shows the FT-IR spectra of the DVB containing mesophase before and after UV exposure. The cis and trans-dienes of the CLAs have characteristic =C—H vibration bands at 948 $cm^{-1}$ and 982 $cm^{-1}$, respectively (Roberge and Dubé, 2016, J. Appl. Polym. Sci., 133:43574). It is clear that after UV-exposure the IR band at 948 $cm^{-1}$ completely disappeared and the absorbance intensity of the 982 $cm^{-1}$ band significantly decreased, indicative of a high conversion of the CLAs into the polymer network.

Figure 32:
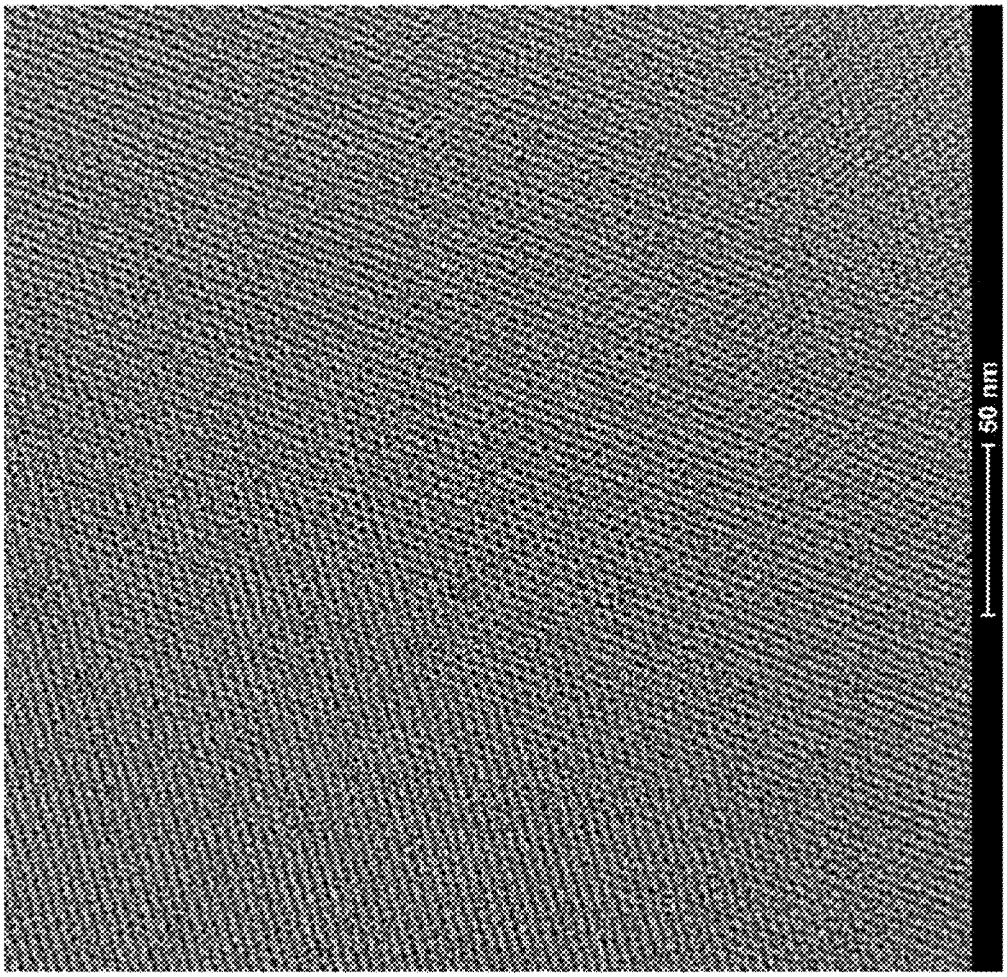
FIG. 32 is a TEM micrograph of a sectioned thin film obtained by polymerization of the $Col_h$ mesophase containing 20 wt % DVB. The sectioned thin film was stained by $RuO_4$.
Figure 33:
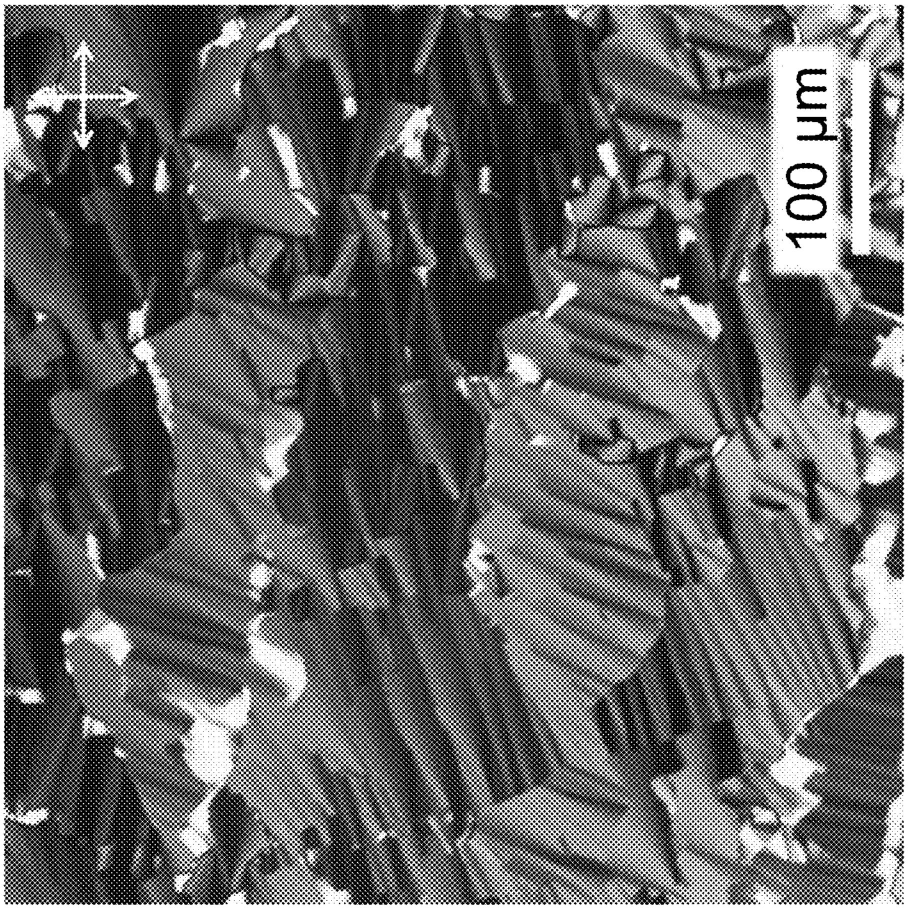
FIG. 33 is a POM image of neat TBIB/$(CLA)_3$ mesophase film sandwiched by two glass slides coated by OTMS.
Figure 34:
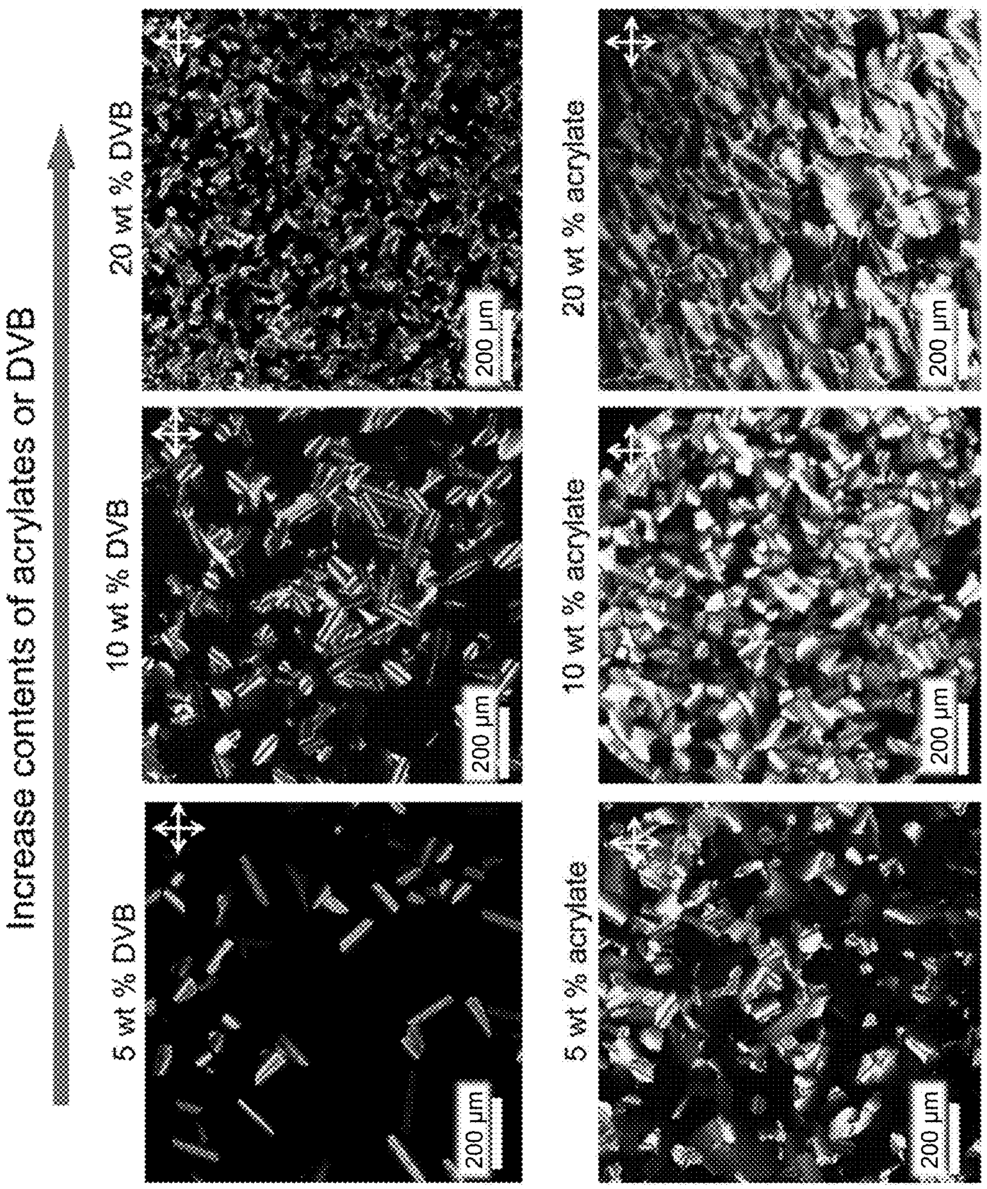
FIG. 34 depicts POM images obtained after thermal annealing of mesophase films (15 μm thick), with different contents of additive monomers, sandwiched by PSS-coated glass slides.

FIG. 16D shows a TEM micrograph of a cross-linked sample containing acrylate co-monomer. The aromatic TBIB molecules located at the core of each column appear dark due to chemical staining by $RuO_4$. A highly ordered hexagonal array of the supramolecular columns with a $d_{100}$-spacing of ~2.50 nm is observed, consistent with the SAXS characterization. The corresponding Fourier-transform of this micrograph exhibits sharp 6-fold symmetric contributions (inset). For DVB-containing samples the selectivity of the chemical staining is reduced due to the uptake of $RuO_4$ by the aromatic phenyl rings of the DVB molecules mixed in with CLA at the periphery of TBIB molecules, resulting in poor TEM contrast (FIG. 32). Accounting for the presence of the co-monomers, the column diameter is estimated to lie between 1.27 and 1.52 nm (Supporting Information). On the basis of the observed $d_{100}$ spacings for the acrylate and DVB containing samples (2.52 nm and 2.69 nm), the areal densities of the columns are calculated as $1.4\times10^{13}$ $cm^{-2}$ and $1.2\times10^{13}$ $cm^{-2}$, respectively. Such large areal densities are compelling in the context of high specific surface area nanoporous materials, and high performance nanofiltration membranes.

Effective utilization of the crosslinked nanostructured materials derived here requires alignment of the columnar structures and, in particular, vertical alignment in thin films, which may be mediated using surface anchoring and film confinement of the $Col_h$ mesophases. The hydrogen-bonded TBIB/$(CLA)_3$ is effectively an amphiphilic supramolecular species consisting of a rigid core with partial ionic character due to strong hydrogen bonding by acid-base proton sharing, and an oleophilic periphery due to the aliphatic CLA and comonomer chains. Thus, a surface exhibiting strong affinity for the cores favors face-on (i.e. homeotropic, vertical) alignment of the supramolecular columns, and a surface with ionic character can provide the required affinity. Conversely, an oleophilic or hydrophobic surface favors edge-on orientation of the columnar structure, or a planar anchoring.

The surfaces of glass slides were modified by depositing a layer of polyelectrolyte poly(sodium styrene sulfonate) (PSS) via spin coating. POM was used to characterize optical textures in samples sandwiched between PSS-coated glass slides during slow cooling (0.2° C./min) from the isotropic phase. The growth of dendritic morphologies (inset of FIG. 17B), and finally optical extinction with the presence of rectilinear defects in a TBIB/$(CLA)_3$ thin film (~15 μm thick), was observed. These observations are consistent with homeotropic alignment of the $Col_h$ mesophase (Oswald, 1981, J. Phys. Lett.-Paris, 42:171; Pisula, et al., 2007, ChemPhysChem, 8:1025; Saez and Goodby, 2005, Mater. Chem., 15:26). In contrast, when the glass slides were treated by octadecyltrimethoxysilane (OTMS), the columnar superstructures adopted degenerate planar (i.e. edge-on) anchoring in the TBIB/$(CLA)_3$ thin film. The columnar director is arbitrarily distributed in the plane of the film as evidenced by the fan-like texture observed by POM imaging (FIG. 23) (Kleman, 1980, J. Phys. I, 41:737; Oswald, P.; Pieranski, P. Smectic and columnar liquid crystals: concepts and physical properties illustrated by experiments; CRC Press, 2005).

Figure 17:
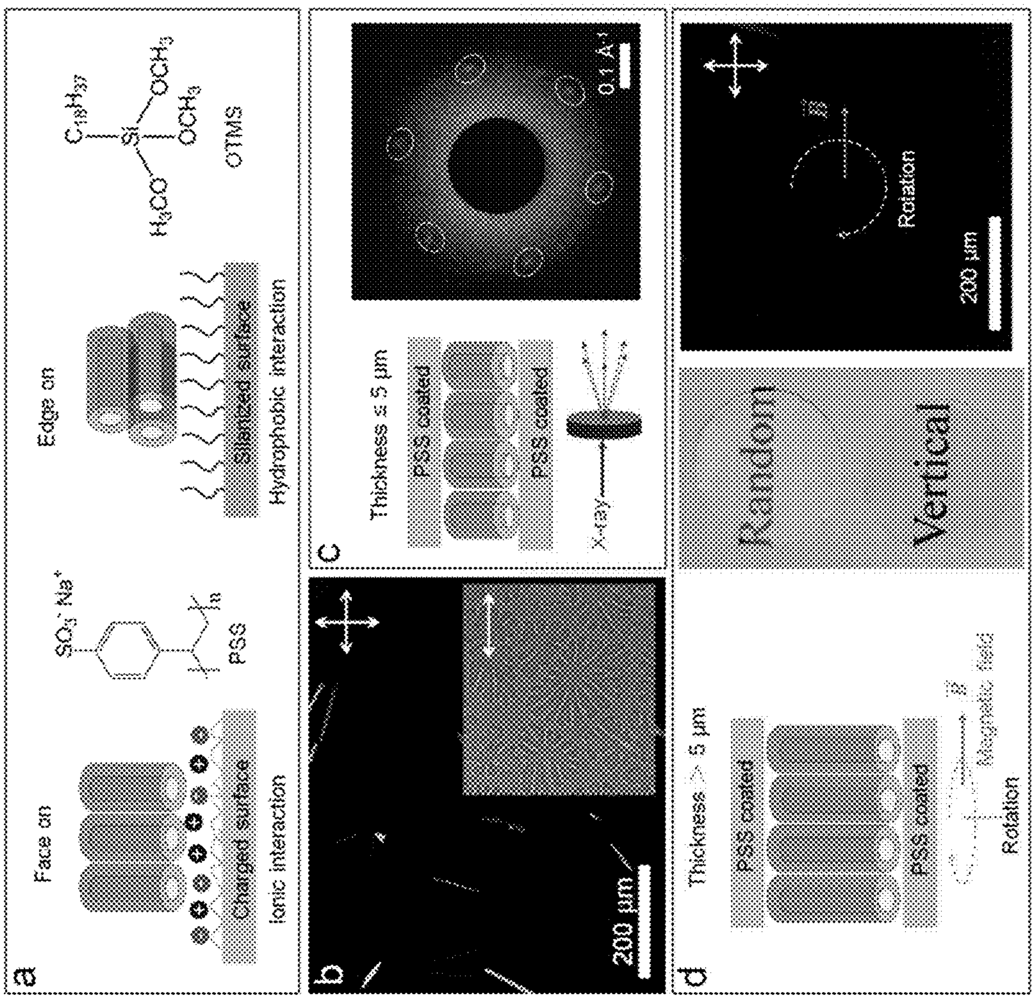
FIG. 17, comprised of FIGS. 17A-17D, depicts the effect of substrate surface modification.

Surface-induced alignment using treated glass slides was also successful in the case of co-monomer containing samples, albeit with a greater sensitivity to the film thickness. Data are shown here for DVB-containing samples. An increase in the population of rectilinear and other LC defects on increasing co-monomer content at a fixed film thickness of 15 μm (FIG. 24) was observed. This observation suggests that the preferred homeotropic anchoring at the PSS-coated surfaces was not extended effectively through the whole film (Zhou, et al., 2008, Chem. Mater., 20:3551). A reduction in thickness to about 5 μm resulted in uniform vertical columnar orientation in the mesophase as revealed by the through-thickness 2-D SAXS pattern showing a 6-fold symmetry (FIG. 17C).

For films more than 5 μm thick, a 6 T magnetic field was employed to assist the alignment of the mesophases and annihilate LC defects. In analogy to $Col_h$ mesophases formed by discotic mesogens bearing aromatic cores, the TBIB/$(CLA)_3$ mesophases possess negative magnetic anisotropy and therefore the columnar axes degenerately align perpendicular to the field direction (Lee, et al., 2006, Mater. Chem., 16:2785). That is, the easy axis for magnetic alignment is in the plane of the TBIB, and the hard axis is along the columns. Degeneracy due to negative magnetic anisotropy can be broken by rotation of the sample around an axis perpendicular to the field, resulting in alignment of the hard axis parallel to the axis of rotation (Majewski and Osuji, 2009, Soft Matter, 5:3417; Majewski and Osuji, 2010, Langmuir, 26:8737). Uniform and non-degenerate vertical alignment was successfully achieved in this manner, by continuous rotation of the sample around an axis normal to the field, and normal to the film surface (FIG. 17D). Samples were sandwiched between PSS-modified glass slides to ensure homeotropic alignment in the near-surface regions of the film, and cooled slowly at 0.2° C./min from the isotropic phase to room temperature. In this manner the samples could be readily aligned, including co-monomer containing materials. While film thicknesses only up to 30 μm were explored here, the combination of space-pervasive magnetic field dictated bulk alignment and PSS-surface dictated alignment can be leveraged to produce substantially thicker aligned samples if so desired. Visually, the polymer films produced from magnetically aligned mesophases were markedly more transparent than those from non-aligned samples, which displayed cloudiness due to visible light scattering by the randomly oriented $Col_h$ domains (FIG. 17D). Optical extinction with the elimination of rectilinear defects observed by POM confirmed the formation of a uniform vertically oriented $Col_h$ structure.

Figure 18:
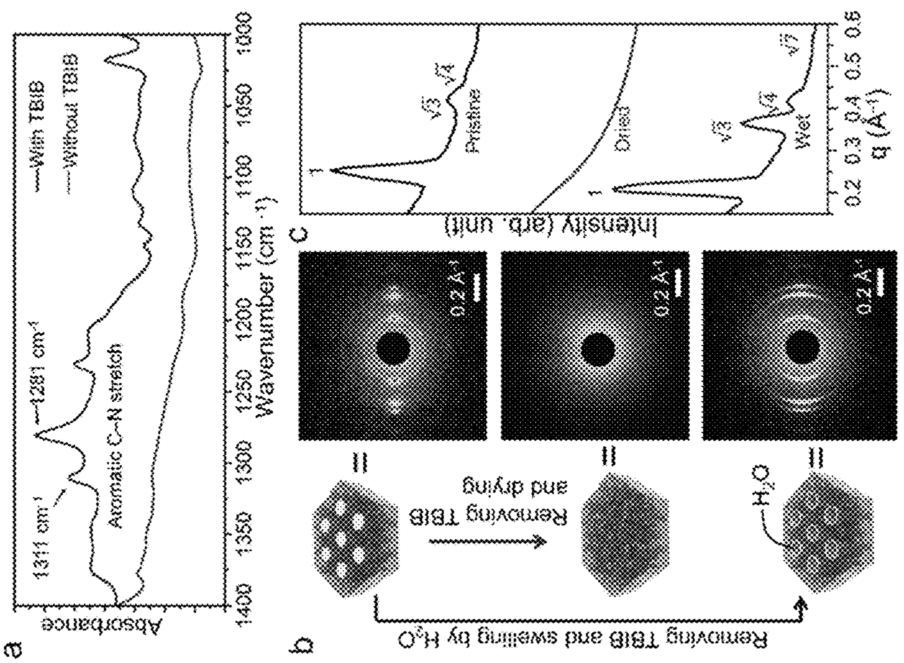
FIG. 18, comprised of FIGS. 18A-18C, depicts characterization data for the nanoporous polymers produced by TBIB removal.

Removal of the TBIB core molecule in the aligned polymer to create ordered nanopores was carried out by immersion of the magnetically aligned, crosslinked films (30 μm thick) into a 0.1 wt % NaOH solution in DMSO for 48 h, followed by rinsing in deionized water. The efficacy of TBIB removal was verified by FT-IR spectroscopy (FIG. 18A). Aromatic amines often show C—N stretching bands in the 1360-1250 $cm^{-1}$ range. The two absorbance bands at 1311 and 1281 $cm^{-1}$ found in the FT-IR spectrum of the crosslinked sample containing the TBIB template vanished after soaking in DMSO, indicating the complete removal of TBIB.

2-D SAXS characterization was utilized to verify the retention of both the columnar nanopores and their alignment in the samples after TBIB removal. Scattering was performed with X-rays incident perpendicular to the film thickness, providing a cross-sectional view. The equatorial scattering in the 2-D SAXS pattern of the pristine crosslinked polymer confirms the vertical alignment of the supramolecular columns (top panel of FIG. 18B). SAXS characterization of samples after TBIB removal showed no evidence of nanostructure if the sample was completely dried after the deionized water rinsing step (middle panel of FIG. 18B). Conversely, if the sample was not deliberately dried, SAXS data showed a complete retention of the well-ordered and aligned hexagonally packed nanostructure, as confirmed by the anisotropic 2-D SAXS pattern (bottom panel of FIG. 18B). In addition, as seen from the 1-D integrated data in FIG. 18C, the scattering intensity, compared to that of the pristine polymer (before TBIB removal), was enhanced.

The absence of scattered intensity in the dried samples is a clear indication that the pores collapsed during drying, likely due to the large Laplace pressures associated with nm-scale pores (Gopinadhan, et al., 2014, Adv. Mater., 26:5148; Cavicchi, et al., 2004, Macromol. Rapid Comm., 25:704). Such collapse is not uncommon in nanoporous polymers and it is predicted that its occurrence can be preempted if required by increasing the bulk modulus of the polymer by increasing the crosslink density of the material. The enhanced scattering intensity in the non-dried films is consistent with the expected increase in electron density contrast on replacing TBIB by water and confirms that well-aligned solvent-accessible pores were successfully produced by TBIB removal. An increase of 0.14 nm in the $d_{100}$ spacing of the water impregnated nanoporous material was observed after TBIB removal, relative to the pristine sample (2.83 vs 2.69 nm). The marginal nature of the change in d-spacing indicates that the material does not swell appreciably in water. This result suggests that the dimensions of the pores as set by TBIB are well preserved in the final nanoporous material.

Figure 19:
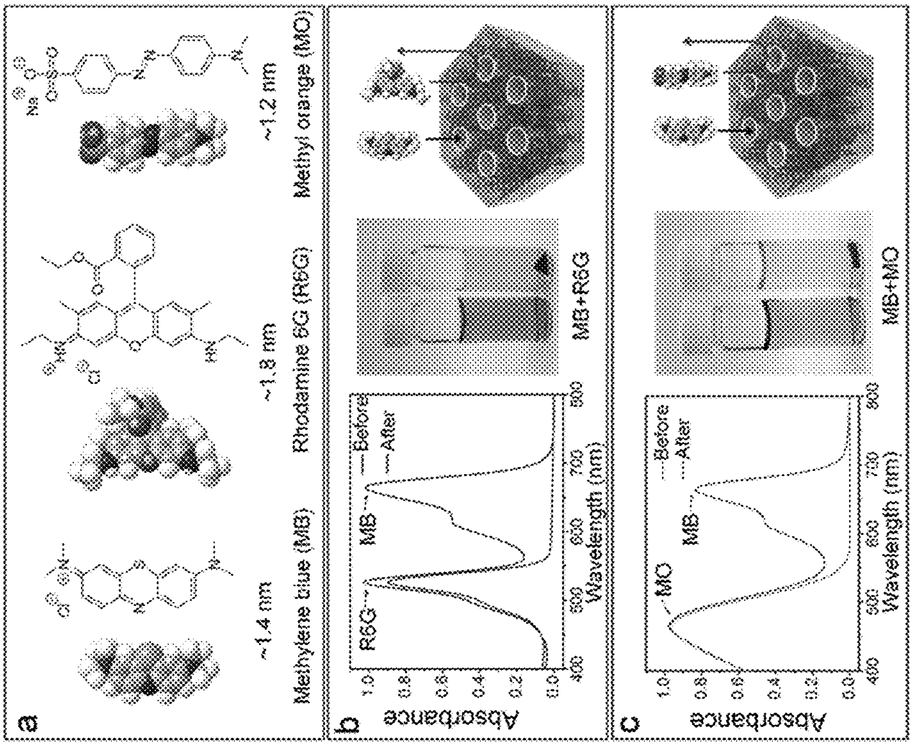
FIG. 19, comprised of FIGS. 19A-19C, depicts the adsorptive uptake of dyes of different sizes and charges.

The selectivity of the nanopores was investigated via characterization of the adsorptive uptake of molecular species in water with different sizes and charges. FIG. 19A shows the molecular structures of three dyes employed in this study: methylene blue (MB), rhodamine 6G (R6G) and methyl orange (MO). MB and R6G are both positively charged, while MO is negatively charged. The effective van der Waals sizes of these species are 1.4, 1.8 and 1.2 nm (Liang, et al., 2016, Chin. J. Polym. Sci., 34:23; de Souza Macedo, et al., 2006, J. Coll. Int. Sci., 298:515). The nanopore surfaces are expected to be negatively charged due to the presence of sodium carboxylate groups formed by the action of NaOH on the carboxylic acid headgroups of CLA during the TBIB leaching step.

FIG. 19B shows the result of the simultaneous adsorption of MB and R6G. The strong absorption bands in the UV-Vis spectrum centered at 526 nm and 664 nm belong to R6G and MB, respectively, as shown for an aqueous solution of a mixture of the dyes before contact with the nanoporous polymer. The aligned nanoporous polymer was introduced to the solution and allowed to equilibrate for 2 days. The 664 nm absorption band is completely absent in the equilibrated sample, indicating a complete depletion of MB from the solution by adsorption onto the nanopore surfaces. By contrast the intensity of the R6G band at 526 nm displays only a slight decrease, less than 10%. The net result is a change from an initially violet colored solution to a light red or pink solution with a completely blue polymer film at the bottom of the vial. R6G uptake in the 1.2-1.5 nm pores is significantly precluded by size-exclusion of the larger sized R6G (1.8 nm) relative to MB (1.4 nm). This observed selectivity is remarkable given the small difference in size between the two dye molecules.

FIG. 19C shows the result of a simultaneous uptake experiment using a mixture of MB and MO in water. The UV-Vis spectrum shows a stable absorption band centered at 465 nm for MO but complete loss of the 664 nm MB absorption band after solution equilibration with the nanoporous polymer. The color of the solution changed from green to yellow/orange after equilibration. The results point to a strong selectivity in the adsorption of MB over MO into the nanopores. Given that MO is slightly smaller than MB, this selectivity can be attributed to the difference in the charge of the species; MO is rejected from the pores due to Donnan exclusion. The absence of a meaningful decrease in the 465 nm MO band suggests that adsorption on the exterior surface of the polymer film does not occur to a substantive degree.

The ability of the polymer film to completely adsorb MB from solution is due to its large specific surface area and, presumably, the accessibility of that area. The specific surface area and areal density of sodium carboxylate groups at the pore wall can be estimated based on the structural data of the nanoporous polymers. The specific surface area $S_v$ is between roughly 470 and 870 $m^2/g$. The areal density σ of sodium carboxylate groups on the pore wall is ~4 $nm^{-2}$.

Using $S_v=670\ m^2 \cdot g^{-1}$ as a representative value for specific surface area, for the 2 mg of nanoporous polymer utilized, the available area is 1.34 $m^2$, neglecting the contribution from the external film surface area ($3\times10^{-4}$ $m^2$). The test solution contained $4.4\times10^{-7}$ moles of MB. Assuming a projected molecular area for MB of 1.35 $nm^2$ and a maximum packing fraction of 0.547 for random sequential adsorption, complete MB uptake would require approximately 0.65 $m^2$. Complete uptake would produce an MB areal density of 0.4 $nm^{-2}$, well away from the ~4 $nm^{-2}$ that would be required for charge inversion of the nanopore surface based on the estimate of the areal density of sodium carboxylate groups. Notwithstanding any uncertainties in the relevant experimental measurements and the projected molecular area, the proximity of the required area (0.65 $m^2$) and estimated available area (1.34 $m^2$) suggests that a large fraction of the pore surface is in fact solvent accessible.

The issue of accessibility was further considered in experiments which examined the relative adsorption kinetics of aligned and non-aligned material. These experiments also highlight the critical role of pore alignment in determining the transport properties and performance of nanoporous membranes. Both polymer films possessing the same thickness of 15 μm and weight of 2 mg were immersed into two 2.8 g MB water solutions with a MB weight fraction of $3.6\times10^{-6}$. The time-dependent UV-vis absorbance of the MB solutions was measured in the presence of nanoporous polymer films (FIG. 20). As expected, the polymer film with vertical nanopores displays significantly faster adsorption kinetics than that with randomly aligned nanopores. This can be seen more quantitatively by fitting the experimental data of UV-vis absorbance A vs time t using an exponential decay function, $A=A_0e^{-t/t_0}$, where $A_0$ designates initial absorbance and to is an exponential time constant that characterizes the rate of adsorption. The value of to from the non-aligned nanoporous polymer is 5.5 times larger than that of the aligned system, which demonstrates pore orientation plays a critical role in determining the adsorption kinetics. The importance of alignment in providing rapid access of species to interior spaces for adsorption increases as the dimensions of the sample increase. Moreover, nanopore alignment is known to have a dramatic effect on permeability in membranes, with improvements ranging from 10-85× reported for membranes based on aligned cylindrical pores, relative to non-aligned samples (Feng, et al., 2014, ACS Nano, 8:11977; Majewski, et al., 2010, J. Am. Chem. Soc., 132: 17516; Majewski, et al., 2013, Soft Matter, 9:7106). The ability to align the nanopores as conducted here will have important implications for realizing membranes with attractive transport properties.

In conclusion, a novel approach for fabricating polymer films with highly aligned, vertically oriented nanopores using sustainably-derived materials has been developed. This approach relies on the use of a molecular template to guide the self-assembly of polymerizable fatty acids into a hexagonally packed columnar mesophase, that yields nanopores upon removal of the templating species. The template species can be recovered from solution by crystallization and reused for subsequent fabrications. The alignment methods are highly scalable and facile production of large area thin films for membrane applications may be possible using film confinement alone, or of thicker materials by combining confinement with magnetic field alignment.

The nanoporous materials produced here demonstrate remarkable size and charge selectivity in adsorption experiments, and accessibility of the pore surfaces. The existence of highly ordered and aligned nanostructures with well-defined dimensions allows robust quantification of parameters of interest for applications of these materials, including functional group density and accessible area. These aligned nanoporous polymers will be useful in a wide range of applications from analytical chemistry to nanofiltration and lithographic pattern transfer. Work is ongoing to quantitatively determine the accessible pore surface area as well as the permeability and solute rejection characteristics of these materials as nanofiltration membranes.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

The invention claimed is:

1. A method of fabricating a polymeric film of aligned nanopores, comprising the steps of:

- depositing a mixture of at least one monomer and at least one template compound onto a surface of a first substrate to form a mesophase;
- polymerizing the mesophase to form a polymeric film;
- rinsing the polymeric film with NaOH in DMSO to remove the template compound; and
- wetting the polymeric film with water to form aligned nanopores;
- wherein the template compound is 1,3,5-tris(1H-benzo[d]imidazol-2-yl)benzene, 2-[3,5-bis(1H-benzimidazol-2-yl)cyclohexyl]-1H-benzimidazole, 2,2',2"-(1α,3α,5α-Cyclohexanetriyl)tris(1-azonia-1H-benzoimidazole), 2-[3,5-bis(6-methyl-1H-benzimidazol-2-yl)phenyl]-6-methyl-1H-benzimidazole, 2,2'-(2-((1H-benzo[d]imidazol-2-yl)methyl)propane-1,3-diyl)bis(1H-benzo[d]imidazole), N,N-bis(1H-benzimidazol-2-ylmethyl)-3-phenylpropan-1-amine, 2-[2-(1H-benzimidazol-2-ylmethyl)phenyl]-1H-benzimidazole, 2-[2,4,5-tris(1H-benzimidazol-2-yl)phenyl]-1H-benzimidazole, N,N-bis(1H-benzimidazol-2-ylmethyl)-1-phenylmethanamine, N,N-bis(1H-benzimidazol-2-ylmethyl)-2-phenylethanamine, 2-[3-[2-amino-1,3-bis(1H-benzimidazol-2-yl)propan-2-yl]phenyl]-1,3-bis(1H-benzimidazol-2-yl)propan-2-amine, 4-phenyl-2-(4-phenyl-1H-benzimidazol-2-yl)-1H-benzimidazole, 2-[[3-(1H-benzimidazol-2-ylmethyl)-1-adamantyl]methyl]-1H-benzimidazole, 6-methyl-N,N-bis(6-methyl-1H-benzimidazol-2-yl)-1H-benzimidazol-2-amine, 2-[2,4,5-tris(1H-benzimidazol-2-yl)phenyl]-1H-benzimidazole, N,N,N',N'-tetrakis(1H-benzimidazol-2-ylmethyl)propane-1,3-diamine, 2-[3-(1H-benzimidazol-2-yl)-5-[3,5-bis(1H-benzimidazol-2-yl)phenyl]phenyl]-1H-benzimidazole, N,N,N',N'-tetrakis(1H-benzimidazol-2-ylmethyl) butane-1,4-diamine, 2-[1,2-bis(1H-benzimidazol-2-yl)-2-(1,3-dihydrobenzimidazol-2-ylidene)ethylidene]benzimidazole, N,N,N',N'-tetrakis(1H-benzimidazol-2-yl)ethane-1,2-diamine, N,N,N',N'-tetrakis(1H-benzimidazol-2-yl)ethane-1,2-diamine, 2-[2-(1H-benzimidazol-2-yl)propan-2-yl]-1H-benzimidazole, or 2-[3-(1H-benzimidazol-2-yl)-5-[3,5-bis(1H-benzimidazol-2-yl)phenyl]phenyl]-1H-benzimidazole.

2. The method of claim 1, further comprising the step of applying a second substrate prior to polymerization.

3. The method of claim 2, wherein the first substrate and second substrate are glass substrates.

4. The method of claim 2, wherein the first and second substrate are coated with poly(sodium styrene sulfonate) or octadecyltrimethoxysilane.

5. The method of claim 1, wherein the mixture further comprises at least one crosslinker and at least one photoinitiator.

6. The method of claim 1, wherein the monomer is an unsaturated fatty acid or epoxidized fatty acid.

7. The method of claim 1, wherein the template compound is 1,3,5-tris(1H-benzo[d]imidazol-2-yl)benzene.

8. The method of claim 1, wherein the monomer and template compound are in the mixture in a ratio of about 3:1.

9. The method of claim 1, further comprising the steps of:

- applying a magnetic field to the mesophase;
- rotating the mesophase about the normal of the first substrate;
- heating the mesophase; and
- gradually cooling the mesophase to room temperature.

10. The method of claim 1, wherein the template compound is 2-[3,5-bis(1H-benzimidazol-2-yl)cyclohexyl]-1H-benzimidazole, 2,2',2"-(1α,3α,5α-Cyclohexanetriyl)tris(1-azonia-1H-benzoimidazole), 2-[3,5-bis(6-methyl-1H-benzimidazol-2-yl)phenyl]-6-methyl-1H-benzimidazole, 2,2'-(2-((1H-benzo[d]imidazol-2-yl)methyl)propane-1,3-diyl)bis(1H-benzo[d]imidazole), N,N-bis(1H-benzimidazol-2-ylmethyl)-3-phenylpropan-1-amine, 2-[2-(1H-benzimidazol-2-ylmethyl)phenyl]-1H-benzimidazole, 2-[2,4,5-tris(1H-benzimidazol-2-yl)phenyl]-1H-benzimidazole, N,N-bis(1H-benzimidazol-2-ylmethyl)-1-phenylmethanamine, N,N-bis(1H-benzimidazol-2-ylmethyl)-2-phenylethanamine, 2-[3-[2-amino-1,3-bis(1H-benzimidazol-2-yl)propan-2-yl]phenyl]-1,3-bis(1H-benzimidazol-2-yl)propan-2-amine, 4-phenyl-2-(4-phenyl-1H-benzimidazol-2-yl)-1H-benzimidazole, 2-[[3-(1H-benzimidazol-2-ylmethyl)-1-adamantyl]methyl]-1H-benzimidazole, 6-methyl-N,N-bis(6-methyl-1H-benzimidazol-2-yl)-1H-benzimidazol-2-amine, 2-[2,4,5-tris(1H-benzimidazol-2-yl)phenyl]-1H-benzimidazole, N,N,N',N'-tetrakis(1H-benzimidazol-2-ylmethyl)propane-1,3-diamine, 2-[3-(1H-benzimidazol-2-yl)-5-[3,5-bis(1H-benzimidazol-2-yl)phenyl]phenyl]-1H-benzimidazole, N,N,N',N'-tetrakis(1H-benzimidazol-2-ylmethyl) butane-1,4-diamine, 2-[1,2-bis(1H-benzimidazol-2-yl)-2-(1,3-dihydrobenzimidazol-2-ylidene)ethylidene]benzimidazole, N,N,N',N'-tetrakis(1H-benzimidazol-2-yl)ethane-1,2-diamine, N,N,N',N'-tetrakis(1H-benzimidazol-2-yl)ethane-1,2-diamine, 2-[2-(1H-benzimidazol-2-yl)propan-2-yl]-1H-benzimidazole, or 2-[3-(1H-benzimidazol-2-yl)-5-[3,5-bis(1H-benzimidazol-2-yl)phenyl]phenyl]-1H-benzimidazole.

* * * * *